US012756568B1

(12) United States Patent
Lee

(10) Patent No.: US 12,756,568 B1
(45) Date of Patent: Oct. 6, 2026

(54) NON-BYPASSABLE AGE-TOKEN GATING ACROSS INTEGRATION SURFACES WITH VERIFIABLE AGE-COMPLIANCE RECEIPTS

(71) Applicant: Yong Bok Lee, Sheridan, WY (US)

(72) Inventor: Yong Bok Lee, Sheridan, WY (US)

(73) Assignee: The Crown and the Cross LLC, Sheridan, WY (US)

( * ) Notice: Subject to any disclaimer, the term of this patent is extended or adjusted under 35 U.S.C. 154(b) by 0 days.

(21) Appl. No.: 19/546,307

(22) Filed: Feb. 21, 2026

Related U.S. Application Data

(60) Provisional application No. 63/928,937, filed on Dec. 2, 2025.

(51) Int. Cl.
*H04L 9/32* (2006.01)

(52) U.S. Cl.
CPC .......... *H04L 9/3213* (2013.01); *H04L 9/3218* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 8,834,251 B2 | 9/2014 | Yacenda | |
| 9,485,206 B2 | 11/2016 | Day, II et al. | |
| 10,237,280 B2 | 3/2019 | Day, II et al. | |
| 11,082,233 B2 | 8/2021 | Yang et al. | |
| 11,556,959 B2 | 1/2023 | Fournier et al. | |
| 11,922,410 B2 * | 3/2024 | Rao .................... | G06Q 20/3823 |
| 11,924,219 B1 | 3/2024 | Campbell et al. | |
| 12,013,924 B1 | 6/2024 | Hanson et al. | |
| 2011/0072039 A1 | 3/2011 | Tayloe | |
| 2012/0106805 A1 | 5/2012 | Shuster | |
| 2015/0186962 A1 | 7/2015 | Krell | |
| 2016/0210621 A1 | 7/2016 | Khan | |

(Continued)

OTHER PUBLICATIONS

Mandalawi et al. "Policy-Aware Generative AI for Safe, Auditable Data Access Governance" (Year: 2025).*

(Continued)

*Primary Examiner* — Younes Naji

(57) ABSTRACT

A computer-implemented system and method provide device-level age tokens and generate multi-jurisdiction age-compliance receipts that govern execution of age-relevant actions at one or more integration surfaces. The system obtains, from a device or user profile, an age token bound to an age tier and verification material, and validates the token under cryptographic verification or platform-authenticated integrity verification. The system assembles a context envelope including jurisdiction and a requested action category, evaluates the envelope against a multi-jurisdiction age-policy graph to determine a permit outcome selected from permit, permit-with-guardrails, require-parent, and deny, and gates the requested action in accordance with the permit outcome in a fail-closed manner. The system generates an age-compliance receipt comprising the context envelope, policy snapshot identifiers, and the permit outcome, and anchors a commitment to the receipt in an append-only log that supports inclusion proofs, enabling offline verification and audit without retaining raw sensitive content.

15 Claims, 14 Drawing Sheets

(56) References Cited

U.S. PATENT DOCUMENTS

| | | | | |
|---|---|---|---|---|
| 2016/0247135 | A1* | 8/2016 | Miller | G06Q 20/20 |
| 2017/0046716 | A1 | 2/2017 | Sheehan et al. | |
| 2017/0075938 | A1 | 3/2017 | Black et al. | |
| 2017/0359184 | A1 | 12/2017 | Camenisch et al. | |
| 2020/0259663 | A1 | 8/2020 | Firsov | |
| 2022/0005047 | A1 | 1/2022 | Maheshwari et al. | |
| 2024/0022433 | A1 | 1/2024 | Asor et al. | |
| 2024/0195629 | A1 | 6/2024 | Hanson et al. | |
| 2024/0202725 | A1* | 6/2024 | Anapliotis | G06Q 30/0607 |
| 2024/0256629 | A1 | 8/2024 | Whitney et al. | |
| 2025/0278722 | A1* | 9/2025 | Sota | G06Q 20/065 |
| 2025/0356725 | A1* | 11/2025 | Nowak | G07F 17/3225 |

OTHER PUBLICATIONS

Ariel Fox Johnson e al. U.S. Age Assurance Is Beginning to Come of Age: The Long Path Toward Protecting Children Online and Safeguarding Access to the Internet (Year: 2024).*

Ofcom(Office of Communications). Part 3 Guidance on highly effective age assurance. Apr. 24, 2025. (PDF, 26 pp.) London, UK.

Temoshok, D.; Abruzzi, C.; Choong, Y.-Y.; et al. NIST SP 800-63A-4: Identity Proofing and Enrollment. NIST, Jul. 2025.

Allen, T.; Mccoll, L.; Walters, K.; Lyon, M. Measurement of Age Assurance Technologies—Pt. 2. ICO/Ofcom report, UK, 2023.

Coppa Rule (16 CFR Part 312)—Final Rule Amendments / source notice—FTC / eCFR—Jan. 17, 2013.

Age Appropriate Design Code 2020—Explanatory Memorandum—UK Government—Jun. 11, 2020.

OpenID Connect for Identity Assurance 1.0—OpenID Foundation—Oct. 1, 2024.

Laurie, Ben; Langley, Adam; Kasper, Emilia. RFC 6962: Certificate Transparency. Internet Engineering Task Force (IETF). Jun. 2013.

Verifiable Credentials Data Model v2.0—W3C Recommendation—May 15, 2025.

Verifiable Credential Data Integrity 1.0 (Securing the Integrity of Verifiable Credential Data)—W3C Recommendation—May 15, 2025.

RFC 9162: Certificate Transparency Version 2.0—IETF (RFC)—Dec. 2021.

* cited by examiner

A-TOKEN Lifecycle

Permit-Before-Action Gating Path

Age-Gating State Machine 600

Timeouts/errors -> ERROR_FAIL_CLOSED (deny by default)

Session Permit Lifecycle 900

Any revocation -> fail-closed termination

Role-Based Receipt Views 1000

Targets may be category-abstracted for minors

Output Delivery Commitment Flow 1100

Receipt-as-Access Credential Handshake 1200

NON-BYPASSABLE AGE-TOKEN GATING ACROSS INTEGRATION SURFACES WITH VERIFIABLE AGE-COMPLIANCE RECEIPTS

CROSS-REFERENCE TO RELATED APPLICATIONS

Non-Trademark Notice. "Age-Token Compliance Rail" and "ATCR" are technical labels and shorthand used for convenience. No trademark rights are asserted herein. The scope of the invention is defined solely by the claims.

Cross-rail context (illustrative; non-limiting). In some embodiments, the disclosed Age-Token Compliance Rail operates as one governance rail within a broader Risk & Evidence operating system that can include:

- Kids AI Companion Safety Rail (K-ACSR) for child—AI companion episodes and Child Safety Receipts;
- HTI-Ready Safety Receipt Layer for clinical AI decision support safety receipts;
- Trusted Sensor Ingress Layer (TSIL) and associated medical-imaging ingress profiles (e.g., TSIL-Scan) which emit per-event Sensor Receipts (S2) and evidence bundles at sensor ingress;
- a Parent Binding Rail (PBR) that maintains a verifiable parent-child relationship graph and issues Guardian Binding Tokens and Family Binding Receipts that may be consumed as parent/guardian binding evidence by ATCR when evaluating REQUIRE_PARENT outcomes; Optional cross-rail references among ATCR receipts, S2 receipts, Child Safety Receipts, and other governance receipts are evidentiary only and, unless expressly stated otherwise, do not alter the gate predicates or permit-before-action semantics of ATCR; the claims control.

Incorporation by reference Except as may be explicitly claimed in related applications under common ownership, external documents are not incorporated by reference for essential matter. Any references to other rails, standards, or regulations in this specification are illustrative and evidentiary only; the present disclosure is self-contained and the claims control.

No admission. Identification of any regulation, framework, standard, platform, device class, or industry practice is not an admission of prior art or common general knowledge.

Evidence-only domain references. Any references to regulations, standards, guidance documents, or compliance programs are illustrative and evidentiary only and do not limit the claims. All essential material supporting the claims is provided explicitly herein; the claims control.

FIELD

The present disclosure relates generally to computer security, operating systems, and online safety, and more particularly to systems and methods for device- and OS-level age-token enforcement and multi-jurisdiction age-compliance receipts that gate access to age-restricted content and services (for example, adult websites, explicit media streams, voice-first conversational agents, screenless or low-screen companion devices, or age-limited app features) using verifiable Age Tokens and structured, tamper-evident compliance receipts, including embodiments that implement assistant capability/tool-use gating, output delivery gating, session permits, attested enforcement indicators, conformance certification, and receipt-derived proof-of-policy-compliance artifacts for use in voice-first, wearable, and screenless environments.

BACKGROUND

Governments and regulators around the world are increasingly enacting laws that require online services to verify the ages of their users before allowing access to harmful or age-restricted content, including but not limited to pornography, gambling, certain violent or self-harm-related content, and other regulated categories. These laws often impose civil penalties or liability for failure to implement "reasonable" or "effective" age-verification measures and, in some jurisdictions, explicitly call out device manufacturers, app stores, or mobile OS vendors as responsible parties.

In addition to traditional web and app based access, many age-relevant interactions now occur through voice-first and "screenless" interfaces, such as smart speakers, in-vehicle assistants, wearable devices, and AI companions embedded into operating systems. In such environments, guardians and regulators may have even less visibility into what content is being accessed or discussed, and existing logging mechanisms are rarely structured to provide verifiable evidence of compliance for audio-only or conversational episodes.

In voice-first, assistant-driven systems, age-relevant interactions often occur through capability invocation, tool calling, retrieval, plugins, agent workflows, and external API execution that can cause real-world side effects (e.g., purchases, messages, joining community spaces, or media playback) without a conventional browser navigation. In such systems, bypass-resistant age compliance benefits from gating both (i) capability invocation and tool execution, and (ii) output delivery and session continuation, rather than relying solely on URL or app-install filtering.

Agentic side effects (illustrative; non-limiting). In some embodiments, age-relevant episodes include agentic actions that cause external side effects, including purchases, payments, messages, joining spaces, sharing content, enabling features, or initiating media playback, and bypass-resistant compliance benefits from gating such actions at capability invocation and at output-commit boundaries.

In parallel, large platforms and standards bodies are exploring digital identity wallets, verifiable credentials, and "age assurance" artifacts that can attest, in a privacy-preserving way, that a user is above or below a given age threshold without exposing raw identity documents. However, most deployments to date either:

- treat age verification as a one-time account-level check;
- rely on weak signals (e.g., self-attested date of birth, credit card possession); or
- implement vendor-specific mechanisms that are difficult for regulators and parents to audit and compare.

Existing content filters and app store rating systems typically operate at the application or account layer, not at the OS or device boundary. They are often coarse-grained and do not provide a runtime, fail-closed gate that prevents connections to age-restricted destinations when an age-token policy is not satisfied. Logging facilities, where present, tend to be ad hoc and are not structured as machine-verifiable receipts that encode which age policy, jurisdiction, and token were applied when granting or denying access.

As a result, platforms face a combination of:

- Regulatory risk, because they cannot easily prove that a particular connection or purchase complied with the applicable age-verification law at that time and place;

Safety risk, because children may still access adult content when filters or settings are misconfigured; and Integration risk, because each service implements its own logic and logs, forcing regulators and auditors to interpret heterogeneous, incomplete records.

In many deployments, compliance evidence is fragmented across heterogeneous logs, vendor-specific dashboards, and non-reproducible policy states. Even where age controls exist, systems often cannot later prove-cryptographically and in a machine-verifiable way-which policy version, jurisdiction branch, token assurance level, and enforcement surface governed a particular episode. This gap is amplified in voice-first and screenless environments where outputs may be delivered without a durable, standardized audit trail.

There is therefore a need for device-level and OS-level age-compliance rails that:

1. Ingest Age Tokens (e.g., age-tier credentials or age-assurance artifacts) from trusted sources such as digital identity providers, OS-level age settings, or sensor/TSIL-backed age-assurance flows;
2. Evaluate a multi-jurisdiction policy graph for each candidate connection, app launch, or transaction;
3. Enforce permit-before-action, fail-closed semantics at OS, app store, or gateway surfaces so that no age-restricted content path bypasses the gate; and
4. Emit structured Age-Compliance Receipts that can be anchored in an append-only ledger and presented to parents, regulators, and other oversight actors as proof of policy-conformant behavior across web, app, voice, API, and, in some embodiments, real-world service access mediated by connected devices.

SUMMARY

In various embodiments, the disclosure provides Age-Token Compliance Rail (ATCR) systems and methods that sit in the control path between:

one or more Age-Token issuers (for example, OS-level age settings, identity providers, or TSIL-backed age-assurance artifacts);

Operating systems, app stores, and browsers that mediate access to content and services; and Age-restricted targets, including websites, apps, app categories, media streams, and in-app features.

In one embodiment, a system includes:

an Age-Token module that validates Age Tokens (A-TOKENS) bound to a device, user profile, and age tier;

a context capture module that constructs an age-compliance context envelope (for example, age tier, confidence, jurisdiction, device posture, requested target and category);

a policy graph engine that evaluates a Multi-Jurisdiction Age-Policy Graph to compute a permit outcome (e.g., PERMIT, PERMIT_WITH_GUARDRAILS, REQUIRE_PARENT, or DENY);

a permit decision and gating engine integrated with OS, app store, and browser surfaces to enforce a permit-before-action, fail-closed gate; and an Age-Compliance Receipt generator that produces structured, tamper-evident receipts for permitted and denied episodes.

In some embodiments, the Age-Compliance Receipt is encoded as an Age-Compliance Proof-of-Policy-Compliance artifact (Age-PoPC) that can be anchored to an append-only log and optionally linked, via evidence-only cross-rail references, to other receipts such as:

TSIL Sensor Receipts (S2) attesting to capture of age-assurance inputs;

Kids AI Companion Child Safety Receipts for specific child episodes;

HTI or SRBE safety receipts in clinical or multi-harm risk budgets.

Such cross-rail references are evidentiary only and do not alter ATCR gate predicates.

In one embodiment, ATCR provides configuration surfaces for per-jurisdiction age-policy profiles, which can specify:

age thresholds (e.g., under-13, 13-15, 16-17, 18+);

types of content or services that require which thresholds;

whether parental presence or explicit consent is required (for example, REQUIRE_PARENT); and logging and retention requirements for Age-Compliance Receipts.

In one embodiment, ATCR exposes role-based views over receipts:

a Guardian View for parents, showing per-child history of permitted and blocked episodes with redacted details and, in some embodiments, providing configuration controls for guardian preference settings (e.g., stricter curfew windows, category allow/deny overlays, or always-require-parent rules);

an Operator View for OS or app store operators, showing aggregate statistics and incident queues; and a Regulator View surfacing aggregate metrics and verifiable proofs that policies were enforced across jurisdictions, similar in spirit to how HTI surfaces safety receipts.

Various embodiments thus provide a runtime, policy-bound, receipt-emitting age-compliance layer that reduces unsafe exposure of minors, aligns with emerging age-assurance regulations, and improves the ability of platforms and regulators to prove how age policies were applied in practice. In many embodiments, the core of ATCR consists of validating Age Tokens, evaluating an age-policy graph to produce a permit outcome, enforcing permit-before-action semantics, and emitting Age-Compliance Receipts; ledger anchoring mechanisms and oversight views (for example, guardian, operator, or regulator consoles) are optional deployment patterns that consume such receipts without altering the core gating semantics.

Core vs optional embodiments (illustrative; non-limiting). In many embodiments, the core of ATCR consists of: (i) validating an Age Token, (ii) evaluating a multi-jurisdiction age-policy graph to determine a permit outcome, (iii) enforcing permit-before-action, fail-closed gating at one or more OS/app store/browser surfaces, and (iv) emitting structured Age-Compliance Receipts. Other capabilities described herein-including assistant/companion gating, session permits, policy packs, proof objects, redaction profiles, or evidence bundles—are optional embodiments that consume or enrich receipts without altering the core gating semantics; the claims control.

Non-bypassable enforcement (illustrative). In some embodiments, ATCR is integrated at one or more control surfaces such that an age-restricted path cannot complete without a permit outcome satisfying a configured permit condition, thereby reducing bypass and misconfiguration risk.

Reproducible policy state (illustrative). In some embodiments, receipts record an identifier of the age-policy graph and/or a policy snapshot reference sufficient to support later verification of the policy state applied for an episode, including jurisdiction branch selection and applied constraints.

Role-based evidence presentation (illustrative). In some embodiments, receipts and proofs are rendered into role-based views (e.g., guardian/operator/regulator) under redaction profiles that protect sensitive targets while preserving verifiable outcome evidence; such views are evidence-only and do not limit the claims.

Conformance certification (optional; illustrative). In some embodiments, conformance testing, certification, and issuance of cryptographically verifiable conformance badges for age-gating implementations are provided as optional embodiments that validate implementation behavior (e.g., fail-closed, non-bypassable predicates, and minimum receipt sets) without altering core gating semantics; the claims control.

Output commitment and streaming gating (optional; illustrative). In some embodiments, outputs are treated as deliverable actions subject to permit-before-action semantics. For example, an assistant output may be segmented into audio or text chunks and blocked at an output-commit boundary unless a permit outcome satisfies a configured permit condition. In some embodiments, the system emits an Output Delivery Receipt and/or references output-segment digests as evidence-only extensions.

Receipt-as-access credential (optional; illustrative). In some embodiments, an Age-Compliance Receipt or a derived Age-Compliance Proof-of-Policy-Compliance (Age-PoPC) is presented to a remote service as an access credential. The service verifies the proof (e.g., signature and freshness and optional ledger proofs) before delivering age-restricted content, thereby providing two-sided enforcement that reduces bypass risk even when a client device is misconfigured; the claims control.

CONVENTIONS AND DISCLAIMERS

Terminology. Unless otherwise indicated, terms such as “age token,” “Age-Token Compliance Rail,” “Age-Compliance Receipt,” “policy graph,” “guardian console,” and similar labels are technical shorthand for components and artifacts described herein. References to particular rails (for example, “TSIL,” “K-ACSR,” “HTI,” “SRBE-Rail,” “Parent Binding Rail (PBR)”) describe example interoperation patterns and are illustrative and evidentiary only; such references do not limit the scope of the present claims.

MUST/SHOULD/MAY semantics. Where terms such as “MUST,” “SHOULD,” or “MAY” are used, they are intended to follow the plain-language sense of RFC 2119/8174 and to describe recommended or permissible behaviors in certain embodiments. Unless expressly stated, these terms do not create additional claim limitations beyond those explicitly recited in the claims.

Evidence-only fields. Many fields described herein-particularly ledger anchors, governance tags, risk signals, or cross-rail references—are evidence-only, meaning they are used for audit, observability, or interoperability and do not alter core gating predicates. Such fields are expressly described as “evidence-only; the claims control.”

35 U.S.C. § 112 (f). No element, step, or limitation of the claims is intended to invoke 35 U.S.C. § 112 (f) (or pre-AIA § 112, sixth paragraph) unless the claim language expressly uses the phrases “means for” or “step for” followed by a function, without reciting sufficient structure for performing that function.

DETAILED DESCRIPTION

A. System Overview (FIG. 1)

Figure 1:
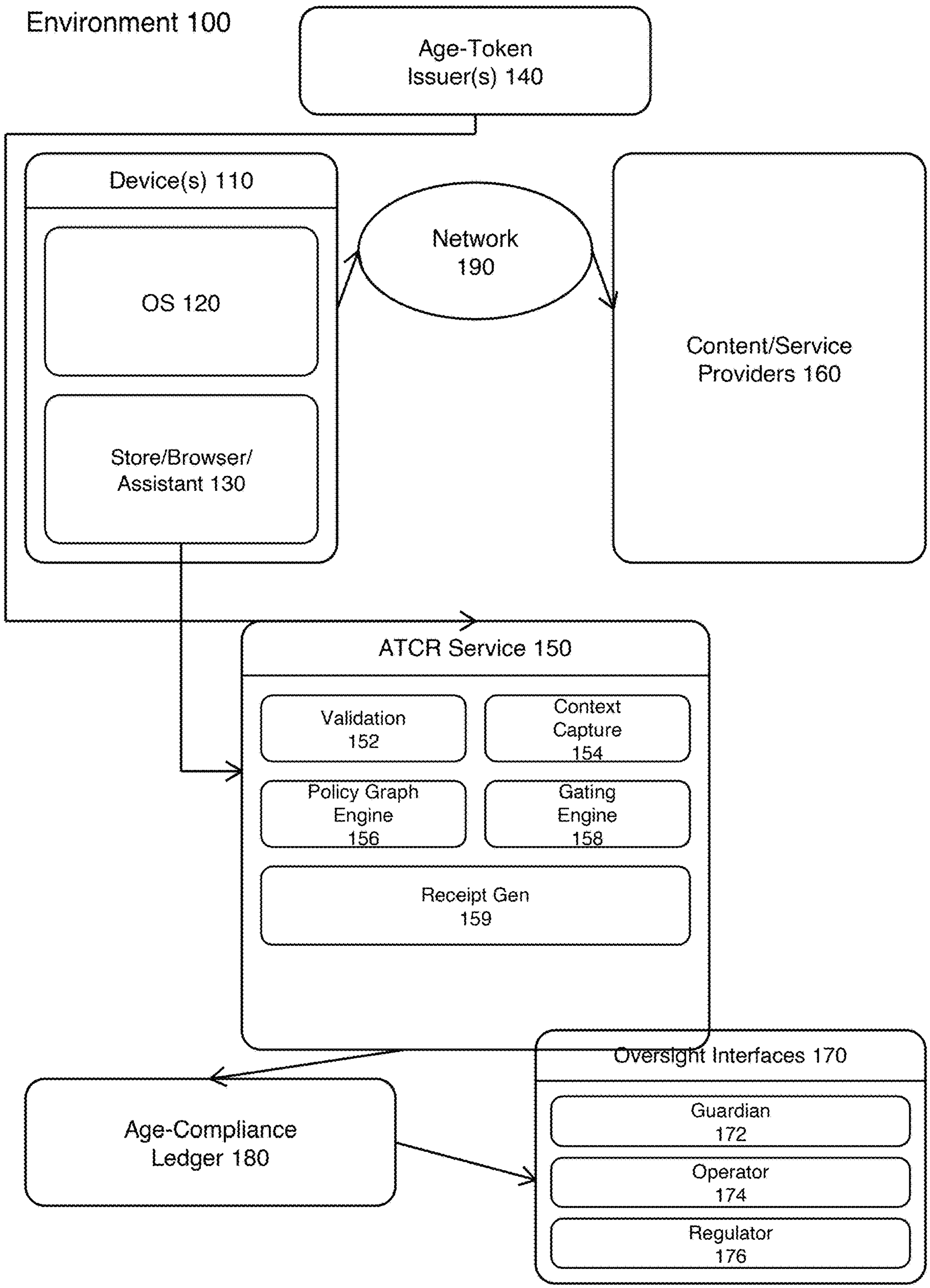
FIG. 1 is a block diagram of an example Age-Token Compliance environment including devices, OS/app stores, Age-Token issuers, the Age-Token Compliance Rail, and oversight views.

Referring to FIG. 1, an example environment 100 includes:

- one or more devices 110 (for example, smartphones, tablets, laptops, smart TVs, game consoles, smart speakers, in-vehicle infotainment systems, wearable devices, and other voice-first or low-screen companion devices);
- an operating system (OS) 120 executing on a device;
- an app store, browser stack, and assistant stack 130 (collectively “store/browser/assistant layer”);

one or more Age-Token issuers 140 (e.g., identity providers, OS-level age-assurance modules, or TSIL-backed sensors);
an Age-Token Compliance Rail (ATCR) service 150;
one or more content or service providers 160 (for example, websites, streaming services, games, adult content platforms); and
one or more oversight interfaces 170, including a Guardian Console 172, an Operator Console 174, and a Regulator Portal 176.

In some embodiments, ATCR service 150 includes:
an Age-Token validation module 152;
a context capture module 154;
a policy graph evaluation engine 156;
a permit decision and gating engine 158; and
an Age-Compliance Receipt generator 159 backed by an Age-Compliance Ledger 180 (for example, an append-only log with signed heads, similar in structure to other rail ledgers).

Devices 110 interact with content providers 160 via network 190 (e.g., the Internet). Before an app is installed, a URL is loaded, a media stream is established, or an in-app purchase is processed, the store/browser/assistant layer 130 invokes ATCR service 150 to determine whether the requested action satisfies applicable age policies.

In some embodiments, no age-restricted content path (for example, app download, HTTP(S) connection to a pornographic site, or opening of an adult category chat room) is permitted unless ATCR has issued a valid permit outcome for the specific request or session.

Non-bypassable enforcement surfaces (illustrative; non-limiting). In some embodiments, ATCR enforces permit-before-action semantics at one or more non-bypassable control surfaces in the request path, such that the age-restricted target cannot be reached without passing through ATCR. Example control surfaces include, without limitation: (i) a device or OS network stack (e.g., DNS resolution, HTTP(S) request initiation, TLS handshake initiation, or socket connect), (ii) a browser navigation pipeline prior to content rendering, (iii) an app store or package manager workflow prior to installation, update, or purchase completion, (iv) an in-app purchase or entitlement gate prior to feature unlock, (v) a media pipeline prior to stream establishment or playback start, and (vi) a voice-assistant or AI companion capability invocation surface prior to tool execution, retrieval, or output delivery.

Capability invocation and tool-use gating (audio-first). In some embodiments, a voice assistant or AI companion mediates capabilities via tool calls, action plans, plugins, agent workflows, or external API requests. ATCR may be invoked prior to executing such a tool call or action plan, and may fail-closed by blocking the call, blocking retrieval, blocking rendering, or blocking audio output when the permit outcome is REQUIRE_PARENT or DENY.

Output delivery gating. In some embodiments, permit enforcement occurs prior to delivering an output channel, including without limitation: audio playback, synthesized speech output, transcript display, or interactive session continuation.

"No bypass" invariant (illustrative). In some embodiments, an integration enforces an always-invoked, non-bypassable invariant that no transition from an "intent requested" state to an "access delivered" state occurs unless ATCR returns PERMIT or PERMIT_WITH_GUARDRAILS for the associated episode or session permit.

Evidence-only integration markers. In some embodiments, an integration records evidence-only markers indicating which control surface enforced the gate (e.g., "browser_http", "os_network_stack", "assistant_tool_gate", "app_store_install_gate"), without altering gate predicates; the claims control.

Local and remote split. In some embodiments, portions of gating logic may execute locally (on-device) while policy evaluation or receipt anchoring may execute remotely, provided that the permit-before-action semantics are preserved.

Figure 2:
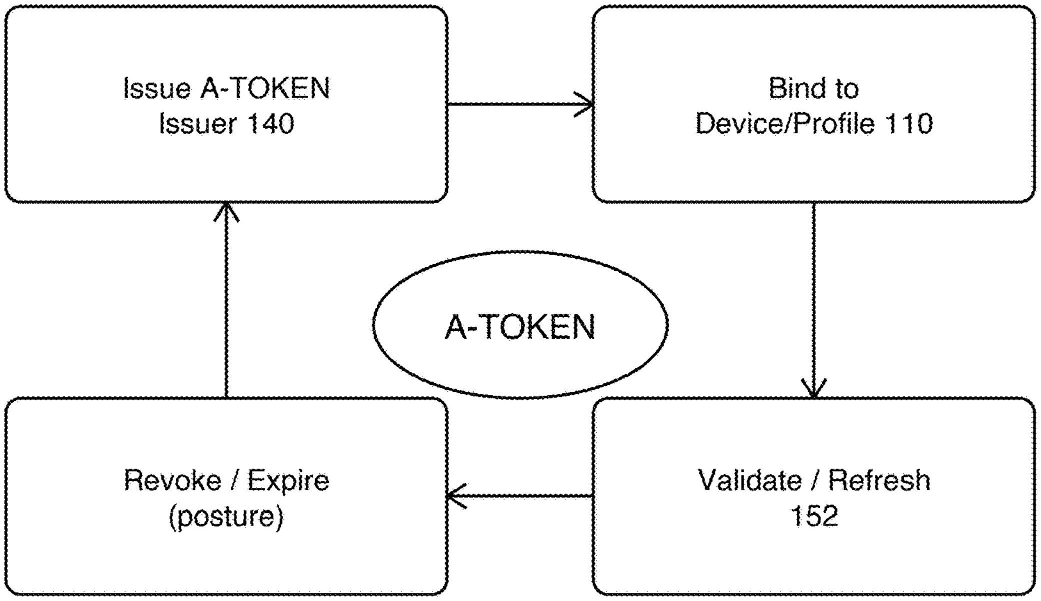
FIG. 2 is a schematic of an Age Token lifecycle, including issuance, binding to device/profile, refresh, and revocation.

B. Age Tokens and Age-Assurance Artifacts (FIG. 2)

ATCR is designed to consume Age Tokens from a variety of sources without requiring the rail itself to directly process identity documents. In some embodiments, an Age Token (A-TOKEN) is a verifiable age-assurance artifact that is verifiable under at least one of: (i) cryptographic verification (e.g., an issuer signature or proof verification), or (ii) platform-authenticated integrity verification (e.g., an OS- or app store-provided declared age-range artifact), and that encodes at least:
an age tier (for example, "under-13", "13-15", "16-17", "18+");
an optional age-assurance confidence score;
a binding to a device identifier and/or user or child profile identifier; and
an expiry and revocation posture.

Age Tokens can be produced by a trusted sensor or OS layer and consumed by child-safety or age-compliance rails as part of context envelopes.

In a representative pattern, an identity provider or OS module:
1. Performs age-assurance (for example, document scan, biometric match, or knowledge-based checks);
2. Computes an age tier and confidence score;
3. Issues an A-TOKEN signed under a provider key; and
4. Stores or exposes the A-TOKEN via OS settings, a secure element, or a TSIL-protected sensor path.

Age-Token validation module 152 obtains A-TOKENS and/or platform-authenticated age-range artifacts via local OS or app store APIs, secure elements, or remote token services and verifies:
signature validity and/or platform-authenticated integrity of the Age Token artifact;
freshness (e.g., expiry, revocation status);
appropriate scope (for example, device-bound vs. roaming profile); and
that the A-TOKEN covers the requested age threshold (e.g., 18+ for adult content).

Selective disclosure and privacy-preserving proofs (illustrative; non-limiting). In some embodiments, an A-TOKEN comprises or is derived from a verifiable credential, an anonymous credential, or a selective-disclosure token that proves an age tier (e.g., "18+") without disclosing an exact date of birth or underlying identity document.

Zero-knowledge age assertions. In some embodiments, an A-TOKEN includes a proof object (e.g., a zero-knowledge proof) attesting that a subject satisfies an age threshold under an issuer policy, where the proof can be verified by ATCR without revealing sensitive attributes beyond the age tier and optional confidence bucket.

Unlinkability and pseudonymization. In some embodiments, the subject identifier used in receipts is pseudonymous and may be rotated, salted, or scoped per relying party to reduce linkability across services, while still allowing guardian or regulator views under appropriate authorization.

Issuer diversity and key rotation. In some embodiments, A-TOKENS may be accepted from multiple issuers under an issuer trust policy, and issuer keys may be rotated with corresponding receipt fields indicating issuer key identifiers.

In some embodiments, Age Tokens may themselves be bound to Sensor Receipts (S2) emitted by TSIL at the time of age-assurance capture (for example, a liveness-protected face capture), and ATCR may reference S2 digests in Age-Compliance Receipts as evidence-only cross-rail references.

Figure 3:
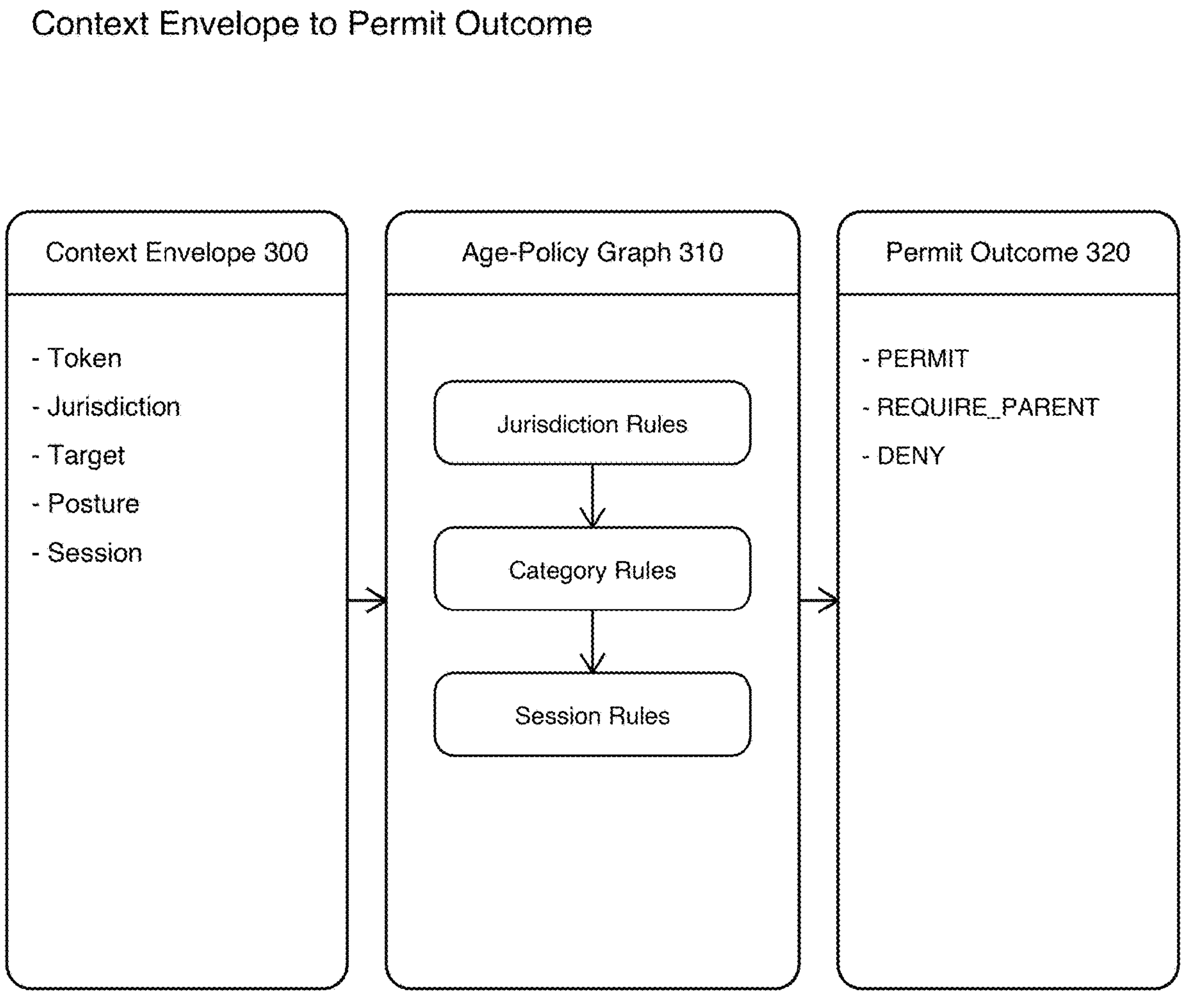
FIG. 3 is a conceptual diagram of a Multi-Jurisdiction Age-Policy Graph evaluated by ATCR.

C. Age-Compliance Context Envelope and Policy Graph (FIG. 3)

When a user attempts an age-relevant action (e.g., navigating to a URL categorized as adult, installing an app in an adult app store category, accessing an "18+ only" in-app room, or invoking an age-relevant capability on a voice assistant or AI companion, such as requesting explicit audio content or entering an adult-only conversational or community space), context capture module 154 constructs an Age-Compliance Context Envelope 300.

The context envelope may include, without limitation:

- one or more A-TOKEN descriptors (age tier, assurance confidence, issuer);
- jurisdictional context (for example, country, state, or region derived from device settings, IP/geolocation, or SIM/network information);
- one or more guardian preference settings or profile overlays (e.g., stricter curfew windows, category allow/deny sets, or always-require-parent rules);
- a service type and target category (e.g., pornographic site, gambling, explicit chat, R-rated streaming film, or teen-only game feature);
- device posture (for example, "child profile", "shared TV", "enterprise device");
- time-of-day and usage-window features (for example, curfew rules for minors); and
- a session or episode identifier, which, in some embodiments, may represent a conversational, audio-only, or multimodal episode mediated by an AI assistant or companion.

Device posture and anti-bypass indicators (illustrative; non-limiting). In some embodiments, the context envelope includes device posture indicators, including without limitation: whether a device is rooted or jailbroken, whether a secure element or trusted execution feature is available, whether app installation is restricted to trusted stores, whether a network path indicates VPN/proxy usage, or whether DNS or certificate trust settings deviate from a baseline.

Evidence-only posture fields. In some embodiments, posture indicators are recorded as evidence-only fields for audit or tuning and do not independently determine the permit outcome absent an explicit policy; the claims control.

Attested enforcement (optional). In some embodiments, the integration surface (e.g., OS network stack, browser, app store, or assistant tool gate) produces an attestation or integrity indicator indicating that the permit gate is enabled and enforcing fail-closed behavior, and such indicator may be referenced in receipts as evidence-only.

Attested enforcement indicator structure (optional; illustrative). In some embodiments, an enforcement surface produces an attested enforcement indicator that evidences that a permit-before-action gate is enabled and configured to fail-closed. The indicator may include, without limitation, one or more of: a software integrity measurement, a configuration digest for the gate, a policy pack identifier or digest, a timestamp, and a signer key identifier.

Verification and presentation (optional). In some embodiments, an operator or regulator verifies the attested enforcement indicator to confirm that a claimed non-bypassable integration surface was actively enforcing at the time of an episode. Verification artifacts may be referenced in receipts as evidence-only.

Evidence-only nature. Attested enforcement indicators and related verification artifacts are evidence-only and do not alter the permit outcome absent an explicit policy profile; the claims control.

Privileged enforcement boundary (optional; illustrative; non-limiting). In some embodiments, one or more integration surfaces enforcing permit-before-action semantics execute within a privileged boundary, including without limitation a kernel-mode component, a hypervisor intercept component, a trusted execution environment (TEE), a secure element-backed module, or device-firmware microcode, such that disabling the gate from an unprivileged context is prevented or made detectable.

Gate configuration digest binding (optional; illustrative). In some embodiments, an attested enforcement indicator is cryptographically bound to a gate-configuration digest describing at least one of: enabled enforcement surfaces, fail-closed mode configuration, policy-pack acceptance criteria, and/or a minimum receipt set, enabling third parties to verify that a claimed gate configuration was active for an episode.

Policy snapshot binding (optional; illustrative). In some embodiments, an attested enforcement indicator is additionally bound to a policy snapshot reference (e.g., policy pack identifier and/or policy digest) and a validity window, enabling auditors to verify that permit enforcement was performed under an identifiable policy state.

Gate integrity proof (optional; evidence-only). In some embodiments, the system produces a gate integrity proof comprising one or more attested enforcement indicators and associated verification artifacts indicating that at least one privileged enforcement boundary was enforcing permit-before-action, fail-closed behavior during an episode or session. Gate integrity proofs are evidence-only and do not alter permit outcomes absent an explicit policy; the claims control.

Verification outcomes and caching (optional; illustrative). In some embodiments, verification outcomes for attested enforcement indicators are cached under a freshness policy. When freshness cannot be satisfied, the system may fail-closed for designated categories or require additional approval per profile; the claims control.

Recertification triggers (optional; illustrative). In some embodiments, recertification triggers include at least one of: integration build/version change, configuration drift, policy pack change, key rotation, or conformance profile change, and a stale or revoked attested enforcement indicator causes a verification failure under a configured profile; the claims control.

Target classification sources (illustrative). In some embodiments, the target category is derived from app store metadata, content rating taxonomies, domain or URL classification feeds, service-provided labels, assistant intent taxonomies, or a combination thereof, and may be recorded in receipts as category-level evidence.

Classification confidence and uncertainty (illustrative; non-limiting). In some embodiments, target classification includes a confidence indicator (e.g., a score or bucket) and/or a provenance indicator identifying one or more sources used to determine the target category. The confidence indicator may be recorded in the context envelope and/or in an Age-Compliance Receipt as evidence-only.

Uncertainty default handling (illustrative). In some embodiments, when a target category is uncertain under a configured confidence rule, ATCR fails closed by issuing REQUIRE_PARENT or DENY (per policy profile), and the corresponding Age-Compliance Receipt records an evidence-only uncertainty indicator and an associated reason code (e.g., CLASSIFICATION_UNCERTAIN_REQUIRE_PARENT), without altering core gate predicates beyond the policy profile; the claims control.

Adversarial classification evasion (optional; illustrative; non-limiting). In some embodiments, targets and/or requests are adversarially represented to evade category classification (e.g., homograph domains, URL encoding obfuscation, dynamic redirects, alternative playback APIs, or category drift across sessions). In such embodiments, ATCR may normalize target identifiers (e.g., punycode normalization, canonical URL normalization, redirect chain capture) and may evaluate multiple classification sources and/or a confidence rule prior to determining a permit outcome.

Multi-source provenance and consensus (optional; illustrative). In some embodiments, the target category is computed using a plurality of sources (e.g., app store metadata, domain/URL feeds, service-provided labels, assistant intent taxonomies, and/or operator-curated allow/deny lists), and the context envelope and/or receipt records evidence-only provenance identifiers for at least one source used. In some embodiments, a configured consensus rule (e.g., majority vote, source-priority order, or thresholded confidence) is used, and uncertainty defaults fail-closed per policy.

Evasion-suspect indicators (optional; evidence-only). In some embodiments, the system records evidence-only indicators that a request appears to be an evasion attempt (e.g., repeated redirects, mismatch between service label and URL taxonomy, suspicious query patterns, or repeated alternate-API attempts), without altering permit outcomes absent an explicit policy profile; the claims control.

Drift and re-classification triggers (optional; illustrative). In some embodiments, when a target category changes during a session or redirect chain, or classification confidence drops below a configured threshold, the system triggers mid-session re-evaluation and may transition to REQUIRE_PARENT or DENY per policy, emitting a receipt that records an evidence-only drift indicator and associated reason code; the claims control.

Policy graph evaluation engine 156 evaluates a Multi-Jurisdiction Age-Policy Graph 310 using the context envelope. The graph may include nodes representing:

- age thresholds (e.g., under-13, 13-15, 16-17, 18+);
- content/service categories (e.g., sexual, nudity, gambling, alcohol, violent, self-harm-related, or neutral);
- jurisdiction branches, to apply different age thresholds or obligations under different legal regimes;
- parent/guardian presence requirements (e.g., co-presence, explicit permission for a particular episode); and
- logging and retention rules.

Edges in the policy graph encode conditions and transitions that determine a permit outcome 320, such as:

- PERMIT—access allowed with standard logging;
- PERMIT_WITH_GUARDRAILS—access allowed but with additional restrictions (e.g., masking thumbnails, forcing safe search on, shorter session duration, and/or, in some embodiments, presenting a neutral safety notice or resource link when a target category corresponds to self-harm-related content), without altering gate predicates;
- REQUIRE_PARENT—access requires explicit, verifiable parental approval for this episode; or
- DENY—access blocked.

In some embodiments, the policy graph is versioned and the chosen policy profile ID and version are recorded in the Age-Compliance Receipt, similar to how clinical safety receipts reference policy graph identifiers in HTI.

Signed policy packs and reproducible evaluation (illustrative; non-limiting). In some embodiments, age-policy graphs and jurisdiction branches are distributed as signed policy packs that include at least a policy profile identifier, a policy version, and one or more jurisdiction mappings. Policy packs may be cached locally or distributed via a policy service, and may be validated prior to use.

Policy snapshot references. In some embodiments, an Age-Compliance Receipt records a policy snapshot reference sufficient to enable later verification that the permit outcome was computed under a particular policy graph state, including without limitation a policy digest, signed policy pack identifier, or a snapshot hash.

Update, rollback, and safe activation. In some embodiments, policy updates are staged, activated under a safe activation protocol, and may support rollback, while receipts record which version was active for the episode.

Policy transparency log (optional; illustrative; non-limiting). In some embodiments, policy packs and/or policy snapshots (including jurisdiction mappings and age-policy graphs) are committed to a Policy Transparency Log that publishes signed heads and supports inclusion and append-only evolution proofs, enabling third parties to verify that a policy state referenced by a receipt existed at the claimed time.

Non-equivocation witness (optional; illustrative). In some embodiments, one or more independent witnesses observe and co-sign policy-log heads such that an operator cannot present materially different policy states under the same policy identifier to different relying parties without producing detectable inconsistency.

Witness co-signed heads (optional; evidence-only). In some embodiments, a policy-log head includes one or more witness co-signatures or references thereto, and receipts record evidence-only references to the head identifier(s) and/or witness co-signed head identifier(s), without altering permit outcomes; the claims control.

Conflict proof (optional; illustrative). In some embodiments, upon detection of equivocation for a policy identifier (e.g., conflicting policy digests asserted for the same policy version or effective window), a conflict proof is produced comprising identifiers of inconsistent heads, evidence of divergence, and one or more inclusion proofs demonstrating inconsistent commitments. Conflict proofs are evidence-only and do not alter permit outcomes absent an explicit policy; the claims control.

Receipt references to policy transparency (optional; evidence-only). In some embodiments, an Age-Compliance Receipt records evidence-only fields referencing at least one of: a policy pack commitment digest, a policy transparency log identifier, a signed head identifier, a witness co-signed head identifier, and/or an inclusion proof reference sufficient to support later offline verification.

Policy freshness and safe activation (optional; illustrative). In some embodiments, a policy profile specifies freshness constraints for policy commitments (e.g., maximum staleness of a signed head) and safe activation rules for policy updates, such that a stale or unverifiable policy snapshot reference causes fail-closed handling per profile; the claims control.

(See APPENDIX M for example policy transparency log objects, witness co-signatures, and conflict proofs; illustrative only.)

Figure 4:
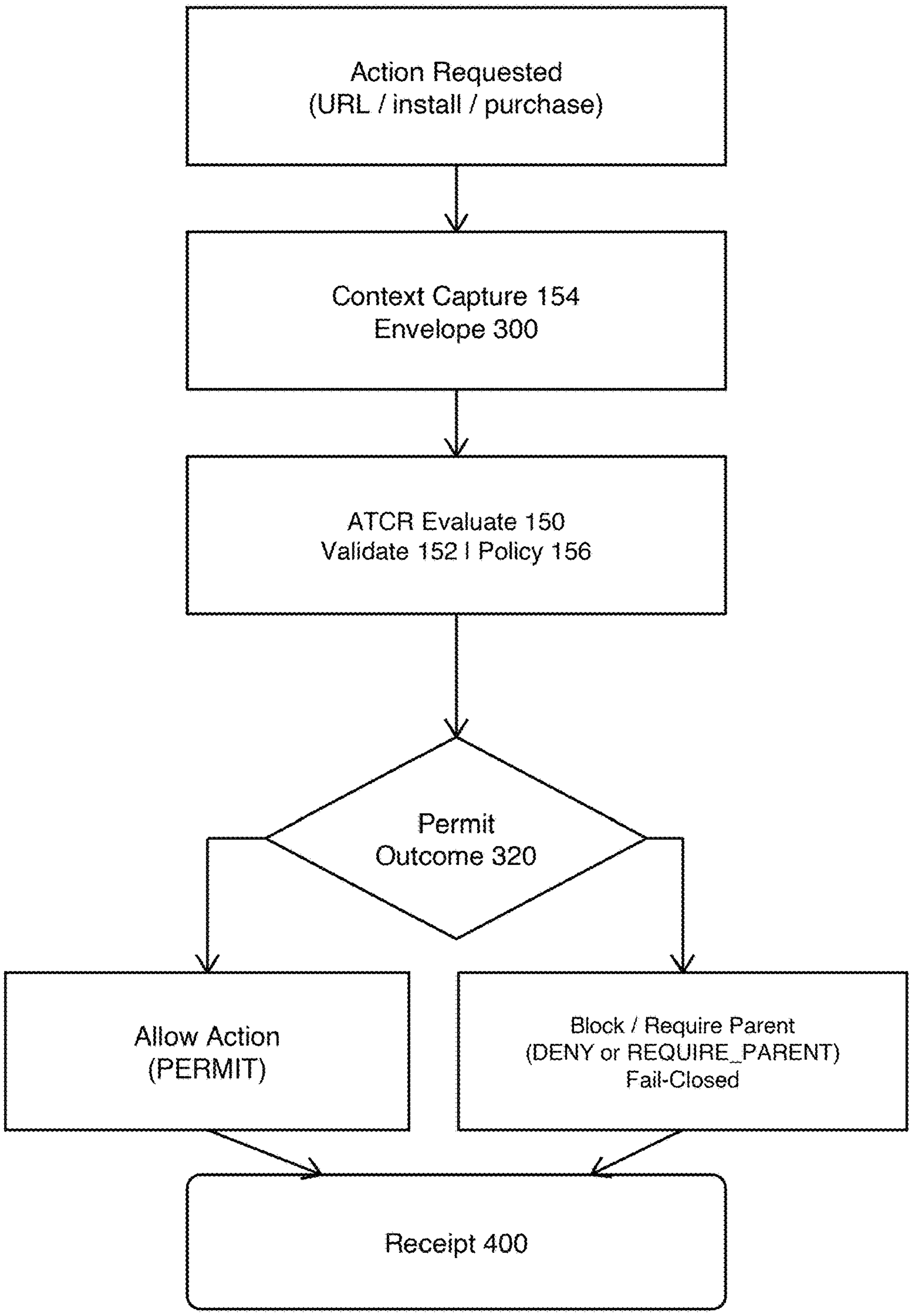
FIG. 4 is a flow diagram of a permit-before-action age-gating path for an HTTP(S) request, app installation, or in-app purchase.

D. Permit Decision and Age-Gating Path (FIG. 4)

Permit decision and gating engine 158 integrates with OS and application-layer control surfaces to enforce permit-before-action semantics.

Permit condition semantics (illustrative; non-limiting). In some embodiments, ATCR evaluates whether a returned permit outcome satisfies a configured permit condition for the requested action. A permit condition may be defined by a policy profile and may specify, for example, that a request is permitted only when the permit outcome is PERMIT or PERMIT_WITH_GUARDRAILS, and is not permitted when the permit outcome is REQUIRE_PARENT or DENY.

Outcome-to-action mapping (illustrative). In some embodiments, when the permit outcome is REQUIRE_PARENT, the requested action is prevented unless and until a guardian workflow completes successfully; when the permit outcome is DENY, the requested action is prevented; and when the permit outcome is PERMIT_WITH_GUARDRAILS, the requested action may proceed subject to one or more guardrails. These mappings are illustrative; the claims control.

Action types and side effects (optional; illustrative; non-limiting). In some embodiments, the requested action is classified as an action type comprising one or more of: navigation/access request, installation/update, purchase/payment, message/send, join/subscribe, share/publish, playback/start, feature unlock/entitlement, retrieval/tool execution, or session continuation. In such embodiments, age compliance is enforced permit-before-action for action types that cause external side effects.

Action scope binding (optional; illustrative). In some embodiments, the system binds a permit outcome to an action scope comprising at least one of: action type, target category, target hash, service identifier, session/episode identifier, and a freshness window, such that a permit outcome cannot be reused outside the intended scope.

Action receipts (optional; evidence-only). In some embodiments, the system emits an action receipt describing the action scope, permit outcome, policy snapshot reference, and anti-replay material, and anchors a commitment to the receipt in a tamper-evident evidence store under a freshness policy. Action receipts are evidence-only unless expressly recited in the claims; the claims control.

Action-scoped PoPC (optional; illustrative). In some embodiments, an action-scoped proof-of-policy-compliance token is derived from an action receipt and presented to a remote service as part of performing the side-effect action. The remote service verifies the token (e.g., signature, freshness, and policy snapshot reference) prior to performing the requested action, thereby enabling two-sided enforcement for high-risk categories; the claims control.

Fail-closed for side effects (optional; illustrative). In some embodiments, when verification fails, cannot complete under a time budget, or yields REQUIRE_PARENT or DENY, the system fails closed by preventing the side-effect action and emitting a receipt recording a structured failure code and/or reason code under the applicable profile; the claims control.

(See APPENDIX O for example action receipt and action-scoped PoPC formats and example flows; illustrative only.)

For example, in an HTTP(S) scenario:

1. A browser's network stack identifies that an outbound connection targets a URL or domain tagged as age-restricted.
2. Before establishing the connection, the browser calls ATCR with a context envelope for this request.
3. ATCR evaluates the policy graph and returns a permit outcome.
4. If the outcome is PERMIT or PERMIT_WITH_GUARDRAILS, the browser proceeds (possibly with additional client-side safeguards). If REQUIRE_PARENT or DENY, the browser fails closed, showing an appropriate message and logging the event.

In an app store scenario:

1. A child profile attempts to install an app in an adult or "mature" category.
2. The app store consults ATCR, which evaluates age tier, jurisdiction, and category.
3. The store is prevented from completing installation unless a permit outcome satisfies a configured policy, and an Age-Compliance Receipt is generated either way.

Guardian workflow and approval token (illustrative; non-limiting). In some embodiments, when the permit outcome is REQUIRE_PARENT, ATCR invokes a guardian workflow that requests an explicit approval for the specific episode or session, and issues or validates a time-bounded approval artifact (e.g., an approval token) bound to at least one of: a device/profile identifier, a session/episode identifier, a target category, and a policy snapshot reference.

Anti-replay and freshness for approvals (illustrative). In some embodiments, guardian approvals are protected against replay by incorporating a nonce, expiry, or freshness rule, and ATCR fails closed if the approval artifact is expired, reused, or fails verification. Evidence of approval freshness may be recorded as evidence-only in the Age-Compliance Receipt.

Optional parent-binding verification (illustrative). In some embodiments, the guardian workflow validates the approving adult via a Parent Binding Rail (PBR) maintaining a verifiable parent-child relationship graph, and records an evidence-only reference to a Family Binding Receipt in the Age-Compliance Receipt; the claims control.

Delegated guardian-of-record (optional; illustrative; non-limiting). In some embodiments, REQUIRE_PARENT satisfaction is permitted via a delegated guardian-of-record arrangement in which an institution, program, or authorized staff member is issued a delegation credential conferring limited approval authority for a minor profile under a defined scope and validity window.

Delegation credential (optional; illustrative). In some embodiments, a delegation credential is cryptographically verifiable and bound to at least one of: a delegator identifier, a delegatee identifier, a minor/profile scope, permitted categories or action types, a jurisdiction scope, and an expiry, and may be revoked. Delegation credential verification artifacts may be referenced in receipts as evidence-only; the claims control.

Quorum approval rule (optional; illustrative). In some embodiments, a policy profile specifies a quorum rule (e.g., m-of-n) requiring multiple approvals prior to transitioning from REQUIRE_PARENT to PERMIT for a given episode or session. Approvers may include, without limitation, a guardian, a delegated guardian-of-record, and/or an institution approval service.

Consent receipts (optional; evidence-only). In some embodiments, approvals and denials in a guardian workflow emit consent receipts describing the approval scope, decision outcome, anti-replay material, and policy snapshot reference. Consent receipts are evidentiary artifacts and do not alter core gate predicates unless expressly recited in the claims; the claims control.

Revocation and replay resistance (optional; illustrative). In some embodiments, approval artifacts and delegation credentials include anti-replay material (e.g., nonce, expiry, one-time-use flag, monotonic counter, or freshness rule), and are revoked upon defined triggers. When replay or revocation uncertainty occurs, the system fails closed or requires renewed approval per policy; the claims control.

Staff-of-record and program context (optional; illustrative). In some embodiments, delegated approvals are limited by program context (e.g., school hours, supervised sessions, specific devices, or on-premises constraints) and recorded as evidence-only scope descriptors to support audit without expanding disclosure of sensitive targets; the claims control.

(See APPENDIX N for example delegation credentials, quorum rules, and consent receipt formats; illustrative only.)

In some embodiments, permit decision and gating engine 158 can issue short-lived session permits for streaming or interactive sessions, analogous to short-lived Child Safety Permits in K-ACSR, but targeted at age compliance rather than conversational safety.

Session permit scope and limits. In some embodiments, a session permit specifies one or more limits, including without limitation: maximum session duration, maximum number of turns or segments, category scope, time-of-day window, or a requirement to re-check a token freshness or revocation posture.

Mid-session re-evaluation. In some embodiments, ATCR re-evaluates the policy graph during a session when a topic, category, tool call type, or target class changes, and may transition from PERMIT to REQUIRE_PARENT or DENY.

Revocation and termination. In some embodiments, upon token revocation, policy update, or detection of a configured failure condition, a session permit may be revoked and the assistant, browser, or media pipeline is terminated or rerouted in a fail-closed manner, and a receipt is generated indicating the revocation reason.

Heartbeats and freshness. In some embodiments, session permits are validated under a freshness rule (e.g., periodic heartbeats or maximum merge delay) and may be treated as invalid if the freshness rule is not satisfied.

The gating logic is implemented in a fail-closed mode: if ATCR is unreachable, if the Age-Token cannot be validated, or if policy evaluation yields no permit, the default behavior is to deny or require parent rather than silently allowing age-restricted access.

Cached policy evaluation (optional). In some embodiments, when a remote ATCR service is unreachable, an integration may evaluate a locally cached policy pack and locally verifiable A-TOKEN under a strict freshness rule, while still failing closed for categories requiring higher assurance or when freshness cannot be satisfied.

Figure 5:
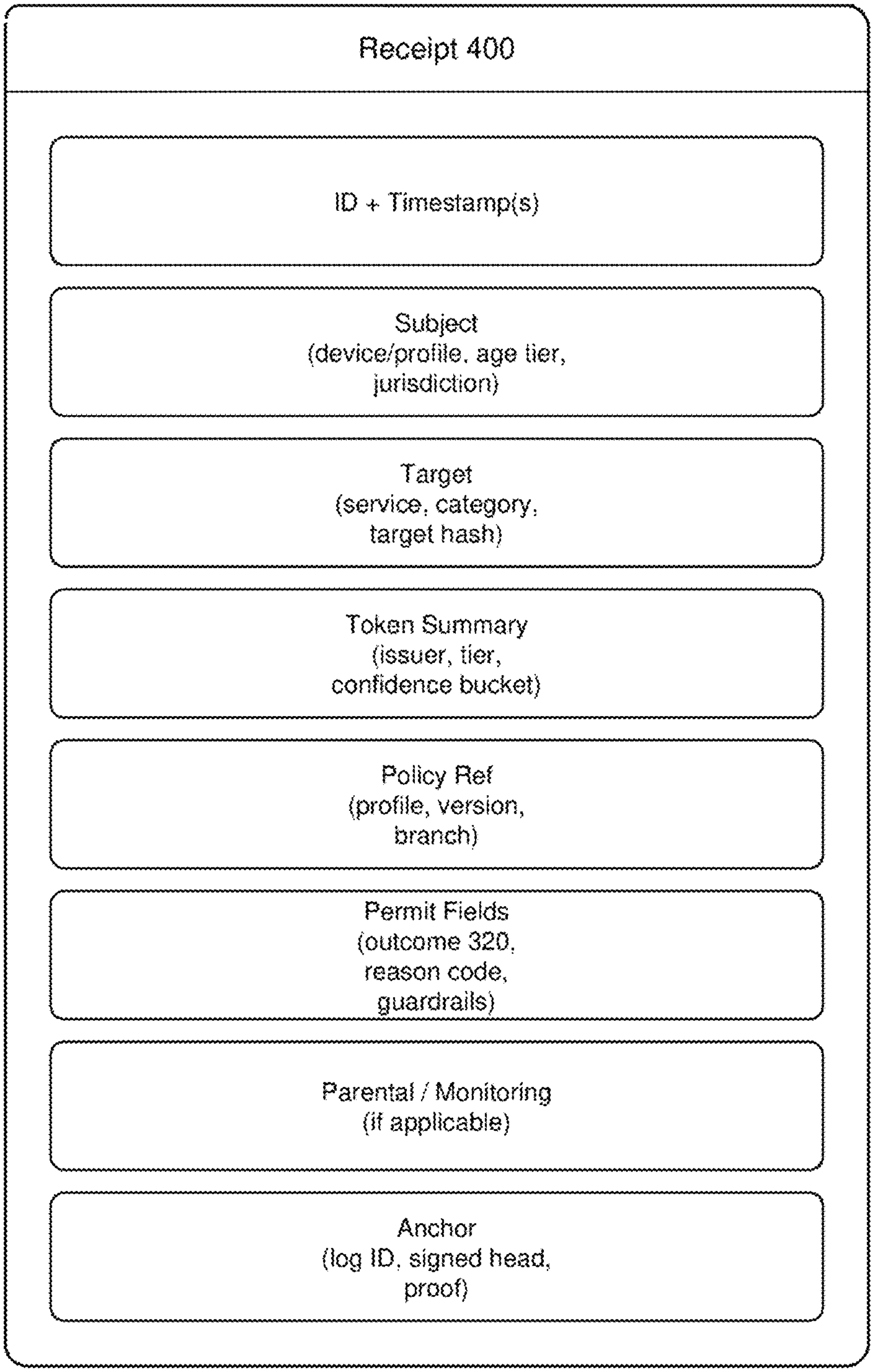
FIG. 5 is a schematic representation of an Age-Compliance Receipt schema suitable for mapping to age-assurance regulatory requirements.

E. Age-Compliance Receipt Generation and Ledger (FIG. 5)

When a permit outcome is determined, Age-Compliance Receipt generator 159 constructs an Age-Compliance Receipt 400.

An Age-Compliance Receipt may include, for example:

- receipt identifier and creation timestamp(s);
- subject fields (e.g., pseudonymous device/profile ID, age tier, jurisdiction);
- target fields (service type, category, target identifier or hash);
- Age-Token summary (issuer, age tier, confidence bucket, token type);
- policy fields (policy profile ID, version, branch, evaluation outcome);
- permit fields (permit outcome, reason code, any session limits or guardrails);
- parental involvement fields (e.g., whether explicit parental approval was used);
- monitoring fields (e.g., incident flags, curfew or time-window enforcement); and
- anchor fields for a tamper-evident log (log ID, signed head, proof type).

In some embodiments, the Age-Compliance Receipt further comprises a policy-evaluation path descriptor (e.g., traversed node or edge identifiers, applied-constraint identifiers, or a decision trace digest) as evidence-only, without altering gating predicates; the claims control.

Reason codes and explainability descriptors (illustrative; non-limiting). In some embodiments, the receipt includes a structured reason code describing why a permit outcome was issued. Example reason codes include, without limitation: UNDER_AGE_THRESHOLD, TOKEN_MISSING, TOKEN_EXPIRED, TOKEN_REVOKED, LOW_ASSURANCE_CONFIDENCE, JURISDICTION_POLICY_DENY, REQUIRE_GUARDIAN_APPROVAL, CURFEW_RESTRICTION, POLICY_EVAL_TIMEOUT_FAIL_CLOSED, and INTEGRITY_POSTURE_INSUFFICIENT.

Human-readable explanations. In some embodiments, a guardian-facing or child-facing surface renders a non-shaming explanation derived from the reason code, optionally including an appeal path or a guardian approval workflow.

Regulator mappings (evidence-only). In some embodiments, receipts include evidence-only mapping hints from reason codes to compliance reporting fields or transparency mappings, without altering gating predicates.

Minimal disclosure in explanations. In some embodiments, explanations shown to a minor omit sensitive targets and present only category-level summaries.

In some embodiments, Age-Compliance Receipts are encoded as JSON or CBOR objects and digitally signed by ATCR, similar in spirit to HTI safety receipts.

Age-Compliance Ledger 180 may be implemented as a public, consortium, or private append-only log that publishes signed heads and supports inclusion and append-only evolution proofs under a freshness policy, analogous to TSIL and TSIL-Scan logs. Although an append-only log is one convenient implementation, in other embodiments Age-Compliance Receipts may be stored in any data store capable of preserving receipt integrity under a configured policy; the claims do not require a particular ledger technology.

Immediate vs deferred anchoring (illustrative; non-limiting). In some embodiments, a policy profile designates that certain categories or episodes require immediate anchoring (e.g., high-risk categories), while other categories permit deferred anchoring (e.g., batching) consistent with a freshness policy. In some embodiments, for categories designated as requiring immediate anchoring, inability to complete anchoring within a configured window triggers fail-closed handling (e.g., DENY or REQUIRE_PARENT) and the Age-Compliance Receipt records a structured failure code;

the claims control. The Age-Compliance Receipt may record an anchor-required indicator as evidence-only.

Anchor status and deferred codes (illustrative). In some embodiments, when anchoring is deferred, an Age-Compliance Receipt records an anchor status indicator (e.g., pending/deferred/anchored) and, when applicable, an anchor-deferred failure code (e.g., ANCHOR DEFERRED) as evidence-only, without altering gate predicates; the claims control.

Proof bundle association (optional). In some embodiments, inclusion proofs and append-only evolution proofs are later retrieved and associated with a selected receipt (or digest) as a proof bundle for audit or regulator presentation under a freshness policy. Proof bundles are evidence-only; the claims control.

Receipts in Age-Compliance Ledger 180 can later be retrieved and filtered for:

- Guardian consoles, which show per-child or per-profile views with redacted targets and high-level summaries;
- Operator consoles, which display trends (for example, rate of DENY or REQUIRE_PARENT outcomes) and aid tuning; and
- Regulator portals, which receive de-identified receipts or aggregate metrics as verifiable evidence of compliance.

Receipt core vs extensions (illustrative; evidence-only). In some embodiments, an Age-Compliance Receipt core consists essentially of fields such as age tier, jurisdiction, service type or category, a policy profile identifier or snapshot reference, and a permit outcome. Additional fields (for example, parental-involvement indicators, cross-rail receipt references, monitoring indicators, or transparency-mapping hints) are recorded as non-core, evidence-only extensions for audit, reporting, or interoperability. Such extensions do not alter the age-gating predicates, fail-closed behavior, or the scope of the claims; the claims control.

Dispute and sampling (optional). In some embodiments, a guardian console supports disputes of category labels or outcomes, and an operator console supports sampling of receipts for tuning classification or policy profiles, with redaction preserved.

F. Deployment and Multi-Tenant Architecture (FIG. 6)

Figure 6:
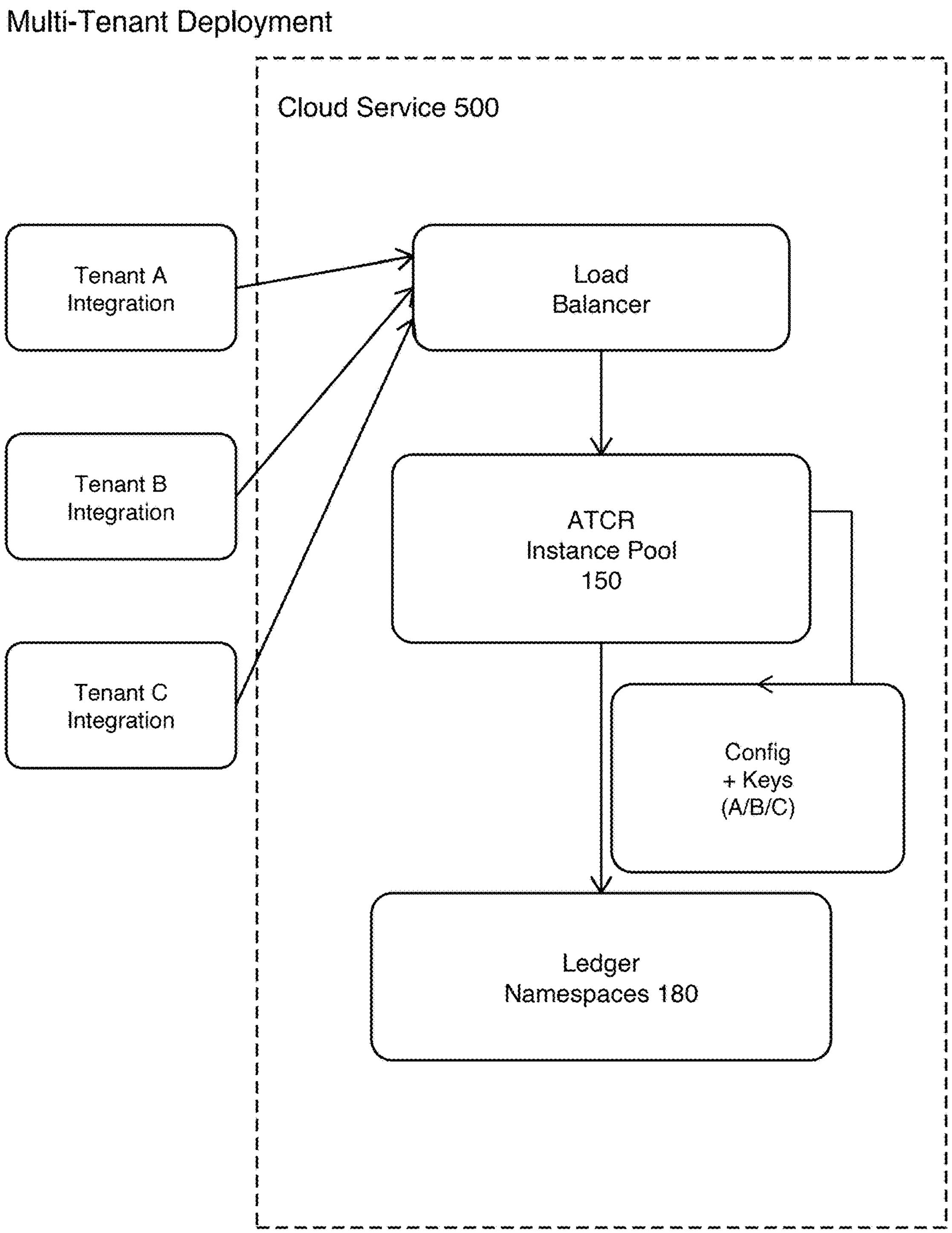
FIG. 6 is a block diagram of a multi-tenant deployment of ATCR as a cloud service supporting multiple OS, app store, and browser integrations.

Referring to FIG. 6, in some embodiments ATCR service 150 is deployed as a multi-tenant cloud service 500 supporting multiple OS and app store vendors. Each tenant may have:

- an isolated configuration store for age-policy profiles, jurisdiction mappings, and app category definitions;
- tenant-specific cryptographic keys for signing Age-Compliance Receipts; and
- physically or logically isolated Age-Compliance Ledger namespaces.

A load balancer may route requests from OS/app store integrations to stateless ATCR instances. Receipts can be batched and anchored periodically as digest sets for efficiency, similar to how other rails batch receipts into evidence bundles for audits.

G. Fail-Closed Semantics and State Machine (FIG. 7)

Figure 7:
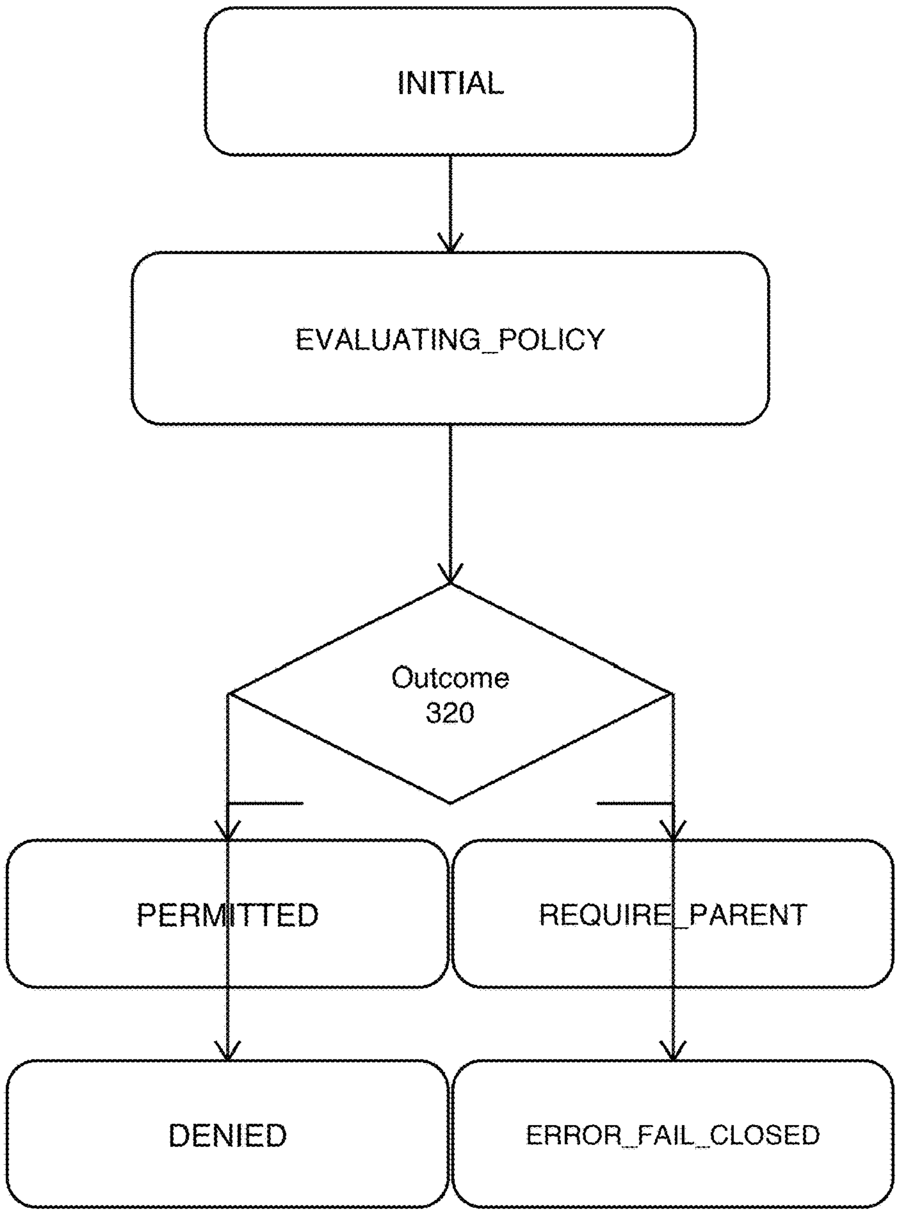
FIG. 7 is a state diagram illustrating fail-closed permit-before-action semantics enforced by ATCR.

FIG. 7 illustrates an age-gating state machine 600. States may include:

- INITIAL—awaiting age-relevant request;
- EVALUATING_POLICY—ATCR evaluates context and Age-Policy Graph;
- PERMITTED—permit outcome is PERMIT or PERMIT_WITH_GUARDRAILS;
- REQUIRE_PARENT—parental involvement workflow is triggered;
- DENIED—request blocked and optionally queued for analytics;
- ERROR_FAIL_CLOSED—ATCR cannot complete evaluation in time; default is deny.

In one embodiment, OS/app store integration enforces a simple invariant: no transition directly from INITIAL to “content delivered” state without passing through PERMITTED or REQUIRE_PARENT via ATCR.

Time-outs or errors in Age-Token validation or policy evaluation map to ERROR_FAIL_CLOSED, and the user receives an appropriate message. The Age-Compliance Receipt for such episodes is tagged with a structured failure code.

H. Non-Bypassable Enforcement Surfaces and Assistant Tool Gate (FIG. 8)

Figure 8:
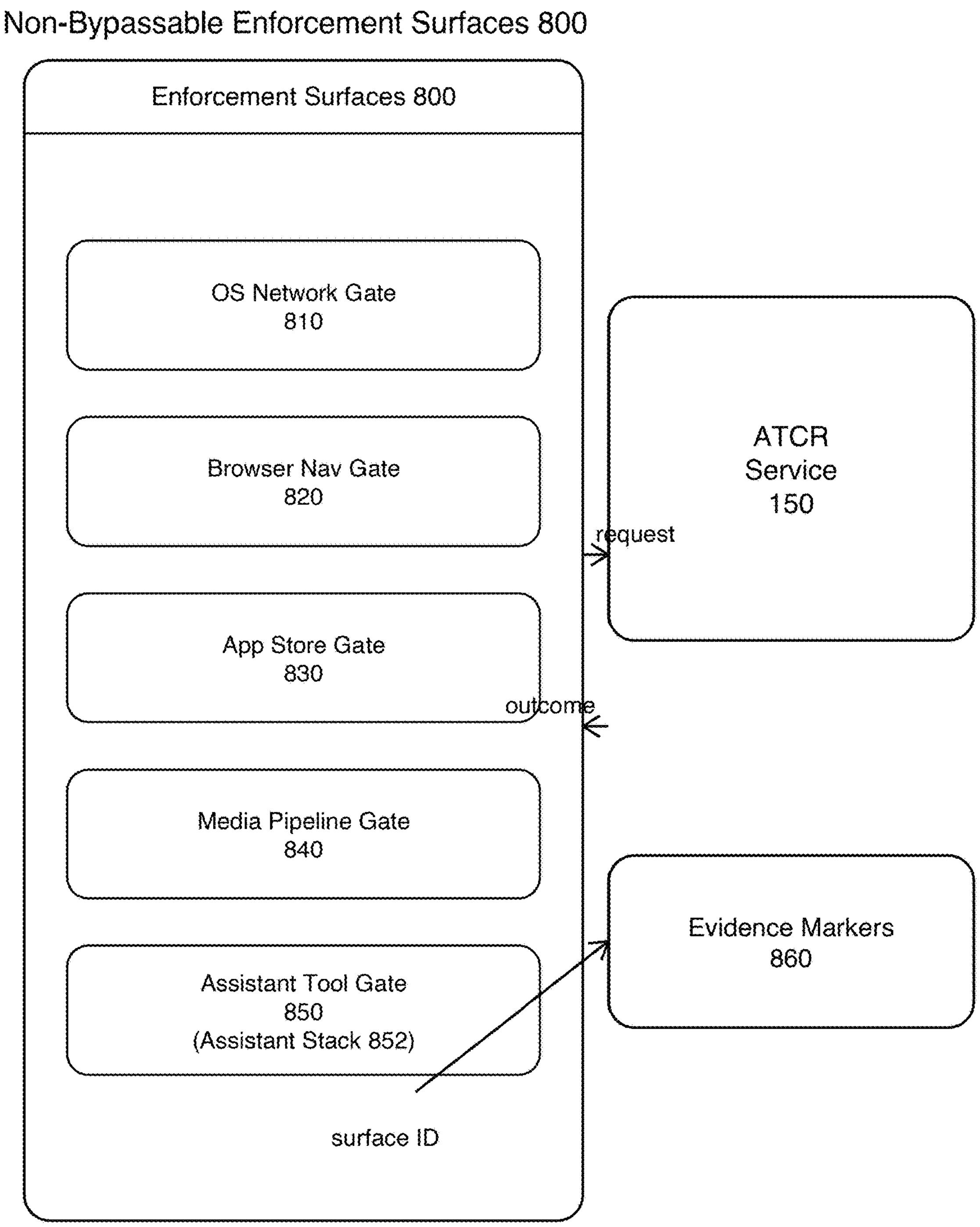
FIG. 8 is a block diagram illustrating example non-bypassable enforcement surfaces and assistant tool-use gating points for permit-before-action age compliance in an audio-first or screenless interface environment.

Referring to FIG. 8, the age-gating path may include one or more non-bypassable enforcement surfaces 800 that prevent delivery of age-restricted access unless a permit outcome is returned by ATCR. Example enforcement surfaces include an OS network-stack gate 810, a browser navigation gate 820, an app store or package manager gate 830, a media pipeline gate 840, and an assistant capability or tool-use gate 850.

In the illustrated embodiment, an assistant stack 852 mediates capabilities via tool calls, action plans, plugins, or external API requests. Prior to executing a capability invocation, the assistant tool gate 850 requests a permit outcome from ATCR service 150 using an Age-Compliance Context Envelope, and fails closed by blocking tool execution, retrieval, rendering, or audio output when the permit outcome is REQUIRE_PARENT or DENY.

FIG. 8 further illustrates that an integration may record evidence-only enforcement markers 860 indicating which surface enforced the permit-before-action invariant (e.g., “os_network_stack”, “browser_nav_gate”, “assistant_tool_gate”), without altering core gating predicates; the claims control.

I. Session Permit Lifecycle (FIG. 9)

Figure 9:
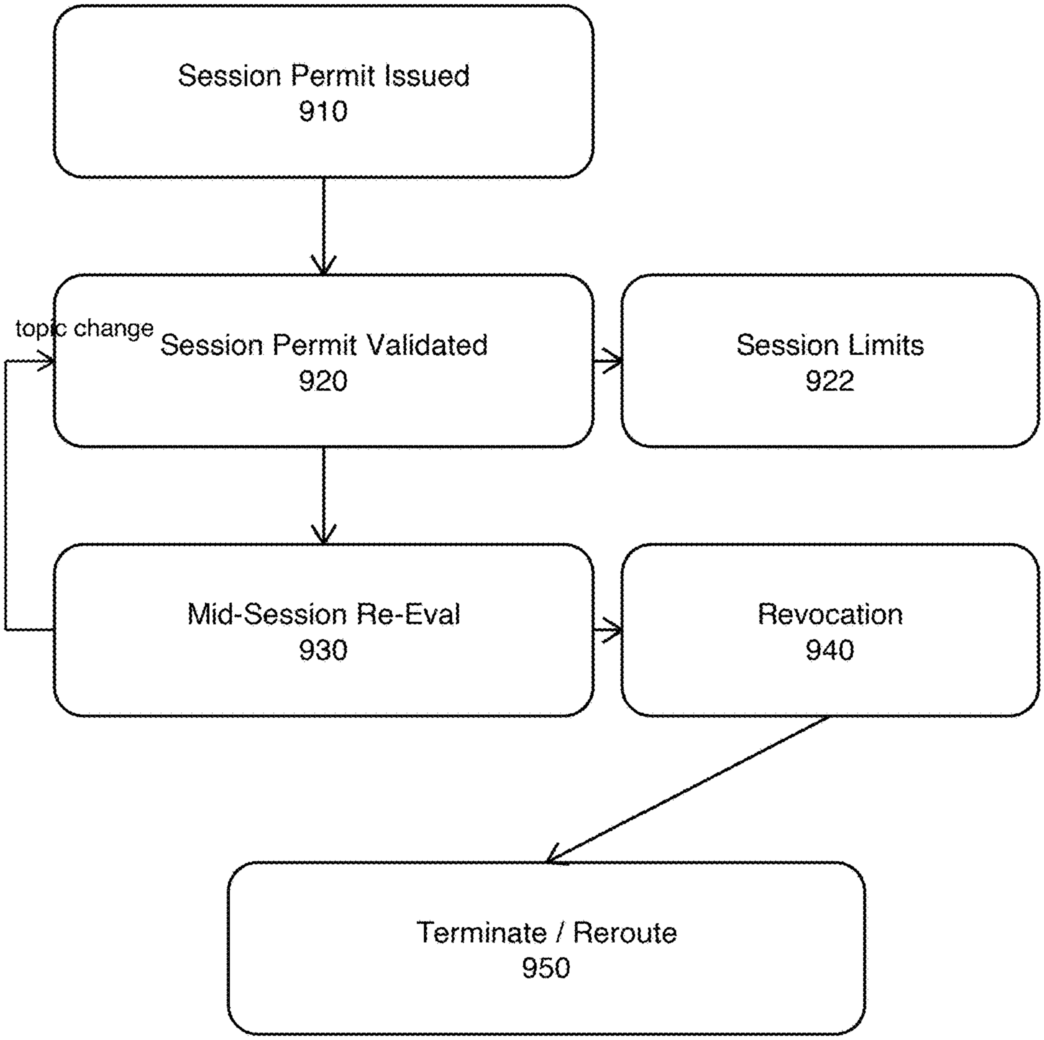
FIG. 9 is a flow diagram illustrating an example session permit lifecycle including issuance, validation across turns or segments, mid-session re-evaluation, revocation, and fail-closed termination with corresponding receipt emission.

Referring to FIG. 9, an example session permit lifecycle 900 includes issuing a session permit 910 upon a PERMIT or PERMIT_WITH_GUARDRAILS outcome, validating the session permit 920 across multiple turns or segments, and enforcing one or more session limits 922 such as a maximum duration, maximum turns, or category scope.

In some embodiments, the system performs mid-session re-evaluation 930 when a topic, category, target class, or tool-call type changes, and may transition a session from permitted to REQUIRE_PARENT or DENY based on an updated policy evaluation.

In some embodiments, the session permit is revoked 940 upon token revocation, policy update, freshness failure, or detection of a configured failure condition, and the assistant, browser, or media pipeline terminates or reroutes 950 in a fail-closed manner, emitting an Age-Compliance Receipt that records the revocation reason and state transition.

J. Role-Based Receipt Views and Redaction Profiles (FIG. 10)

Figure 10:
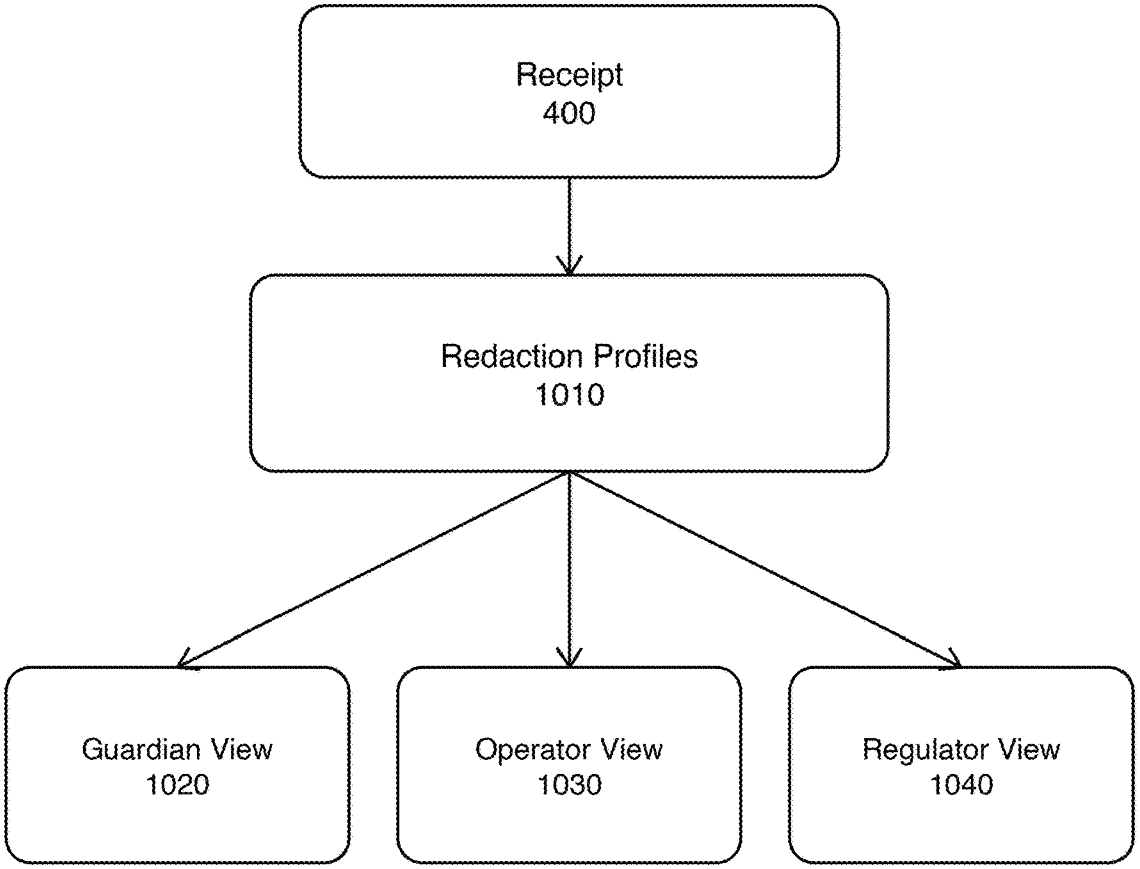
FIG. 10 is a diagram illustrating role-based receipt views and redaction profiles for presenting Age-Compliance Receipts and verifiable proofs to guardians, operators, and regulators.

Referring to FIG. 10, an Age-Compliance Receipt 400 may be rendered into role-based views 1000 using one or more redaction profiles 1010. A guardian view 1020 may present a per-child or per-profile history with sensitive targets redacted or category-abstracted, while still preserving verifiable outcome evidence. In some embodiments, the guardian view further provides configuration controls for guardian preference settings (e.g., per-category allow/deny overlays, stricter curfew windows, or always-require-parent rules) without altering core gating predicates; the claims control.

An operator view 1030 may present de-identified operational metrics and incident queues, including rates of DENY or REQUIRE_PARENT outcomes and tuning indicators, while restricting direct exposure of sensitive target identifiers.

A regulator view 1040 may provide aggregate metrics and verifiable proofs derived from ledger anchors (e.g., signed heads and inclusion proofs), and may receive de-identified receipts or evidence bundles under a reporting schema. Redaction profiles may be recorded as evidence-only indicators and do not alter gating predicates; the claims control.

K. Cross-Rail Interoperation (Illustrative; Evidence-Only)

In some deployments, ATCR cooperates with other rails:

K-ACSR may govern conversational episodes, while ATCR governs whether certain third-party websites or app categories are even reachable by a child device. ATCR receipts may carry a cross-rail reference to Child Safety Receipts when an age-restricted URL is accessed via a child companion context.

TSIL and TSIL-Kids profiles may produce age-assurance A-TOKENS bound to TSIL S2 receipts, with S2 digests referenced in ATCR receipts as part of an end-to-end chain of custody from capture→age token→age gate.

HTI or SRBE may use Age-Compliance Receipts as inputs to higher-level harm or compliance scoring in health or multi-sector safety contexts.

In some embodiments, ATCR further cooperates with a Parent Binding Rail (PBR) that maintains a verifiable parent-child relationship graph and issues Guardian Binding Tokens and Family Binding Receipts. For episodes in which the permit outcome is REQUIRE_PARENT, ATCR MAY require that a presented parent or guardian be validated via PBR and MAY record evidence-only references to corresponding Family Binding Receipts in the Age-Compliance Receipt. Such PBR references are evidentiary only and do not alter ATCR's age-gating predicates or the scope of the claims; the claims control. This pattern provides a repeatable way for platforms and regulators to distinguish between "self-asserted" parental overrides and verifiably bound parent-child approvals across devices and services.

These references are evidentiary and do not change ATCR gate semantics; the claims control.

L. Conformance Testing, Certification, and Badges (Optional)

Conformance profile (illustrative; non-limiting). In some embodiments, ATCR interoperates with a conformance certification rail configured to select or define a conformance profile that specifies required predicates for an implementation under test (IUT). A conformance profile may specify, without limitation: (i) one or more non-bypassable enforcement predicates, (ii) one or more fail-closed predicates (e.g., token invalidity, policy-evaluation timeout, or classification uncertainty), (iii) a minimum receipt set and/or minimum receipt fields to be emitted during testing, and (iv) required registry or format versions (e.g., reason-code registry version, failure-code registry version, and/or policy snapshot reference format). Conformance profiles are illustrative and do not limit the claims.

Conformance test suite and negative tests (illustrative). In some embodiments, a conformance test suite is executed against an IUT by generating synthetic age-relevant test requests spanning one or more integration surfaces (e.g., OS, browser, app store, in-app purchase/feature unlock, or OS network gateway) and observing IUT outputs. The test suite may include negative tests attempting to bypass a gate (e.g., initiating an age-restricted path without invoking an age-gating rail) and verifies that the IUT fails closed by preventing completion of the path. The test suite may further test uncertainty handling by providing ambiguous target classification inputs and verifying REQUIRE_PARENT or DENY outcomes per a configured confidence rule.

Conformance badge issuance (illustrative; non-limiting). In some embodiments, when an IUT satisfies the required predicates under a conformance profile, a cryptographically verifiable conformance badge is issued. A conformance badge may be digitally signed and may include, without limitation: a conformance profile identifier and version, an IUT build/configuration digest, a validity window, and an issuer key identifier. In some embodiments, when an IUT fails a predicate, the system records a failure indication associated with at least one failing predicate identifier, without altering core ATCR gating semantics.

Badge verification interface (optional; illustrative). In some embodiments, a badge verification interface receives a conformance badge from a relying party and returns a verification result indicating at least one of: signature validity, validity-window satisfaction, conformance profile coverage, or revocation status. In some embodiments, the badge verification interface is used by operators, partners, or procurement actors to confirm that a deployed implementation is certified under a specified conformance profile, while remaining evidence-only with respect to core gating predicates; the claims control.

Recertification triggers and revocation (optional; illustrative). In some embodiments, a previously issued conformance badge is revoked, expires, or is marked non-current upon occurrence of a recertification trigger comprising at least one of: an IUT version change, configuration drift indicator, policy pack change, key rotation, or conformance profile version change. Upon revocation or expiration, subsequent badge verification fails, and the system may require a new conformance test execution before issuance of an updated badge. Revocation status and recertification events are evidentiary and do not alter ATCR gate predicates absent an explicit policy profile; the claims control.

Conformance certificate bundle and anchoring (optional; evidence-only). In some embodiments, a conformance certificate bundle is produced comprising at least: (i) a conformance badge, (ii) a digest of conformance test results, and (iii) evidence-only identifiers of tested predicates and tested integration surfaces. At least a portion of the conformance certificate bundle, or a digest thereof, may be stored or anchored in a tamper-evident evidence store under a freshness policy to support later verification. Conformance artifacts are evidence-only and do not alter permit outcomes for runtime episodes; the claims control.

Figure 11:
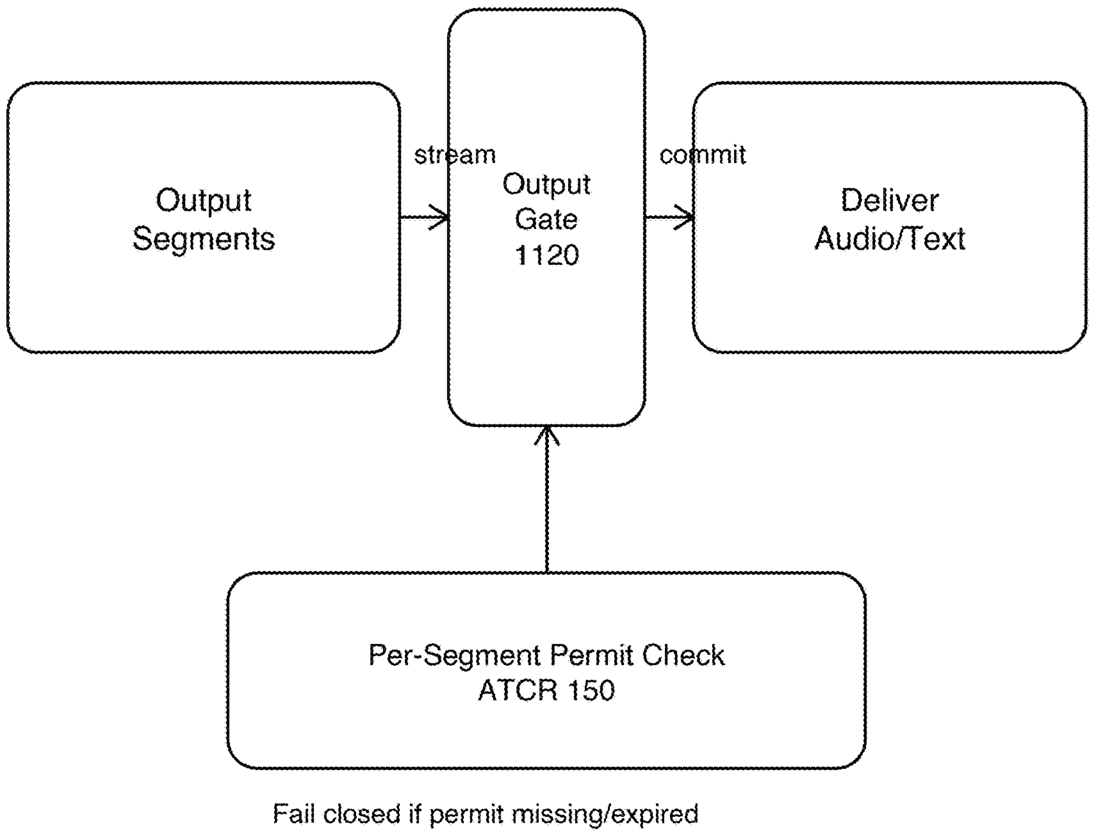
FIG. 11 is a flow diagram illustrating output delivery commitment gating for streaming or segmented assistant outputs, including per-segment permit checks and evidence capture.

M. Output Delivery Commitment and Output Receipts (FIG. 11)

Output delivery as an enforceable action (illustrative; non-limiting). In some embodiments, the act of delivering an output on a device (for example, audio playback, synthesized speech output, transcript display, haptic feedback, media playback start, or interactive session continuation) is treated as a requested action subject to permit-before-action semantics, for example within an output delivery commitment flow 1100. The output delivery gate may be distinct from a tool-use gate and may be integrated with one or more of: a media pipeline, a text-to-speech (TTS) pipeline, an audio sink, a transcript renderer, or a session manager.

Output-commit boundary for streaming (illustrative; non-limiting). In some embodiments, an assistant produces outputs as a stream of segments (for example, tokens, sentences, audio frames, or chunks). At an output-commit boundary/output gate 1120, and prior to committing a segment to an output channel, the integration evaluates a permit condition for that segment using an age-compliance context envelope that may include an output channel identifier, a target category, and one or more segment metadata fields. When evaluation fails, cannot complete within a time budget, or yields REQUIRE_PARENT or DENY, the integration fails closed by suppressing the segment and optionally terminating, rerouting, or pausing the session pending successful completion of a guardian workflow; the claims control.

Output Delivery Receipt (ODR) (optional; evidence-only). In some embodiments, the system emits an Output Delivery Receipt (ODR) describing delivery gating for an output segment or session. The ODR may be implemented as a standalone receipt type or as an evidence-only extension of an Age-Compliance Receipt. Example ODR fields include: output channel, output segment index, output-segment digest(s), an output model identifier, a permit outcome or session permit reference, and an indicator that output delivery gating was applied; ODR fields are evidence-only unless expressly recited in the claims.

Output guardrails (illustrative). In some embodiments, when the permit outcome is PERMIT_WITH_GUARDRAILS, the integration applies one or more guardrails to the output prior to delivery. Guardrails may include, without limitation: safe-mode paraphrasing, redaction of sensitive entities, category-abstracted explanations, replacement of disallowed outputs with safe alternatives, shorter session limits, or neutral safety notices. In some embodiments, a receipt records one or more guardrail identifiers as evidence-only.

Non-bypassable output invariant (illustrative). In some embodiments, an integration enforces an invariant that no output is delivered for a restricted category unless a permit outcome of PERMIT or PERMIT_WITH_GUARDRAILS (or a valid session permit issued therefrom) covers the output, including where the output is delivered via an output-commit boundary/output gate 1120. The invariant may be enforced at one or more of: an OS-level audio output API, a TTS engine boundary, a media playback control surface, or an assistant session continuation surface.

Figure 12:
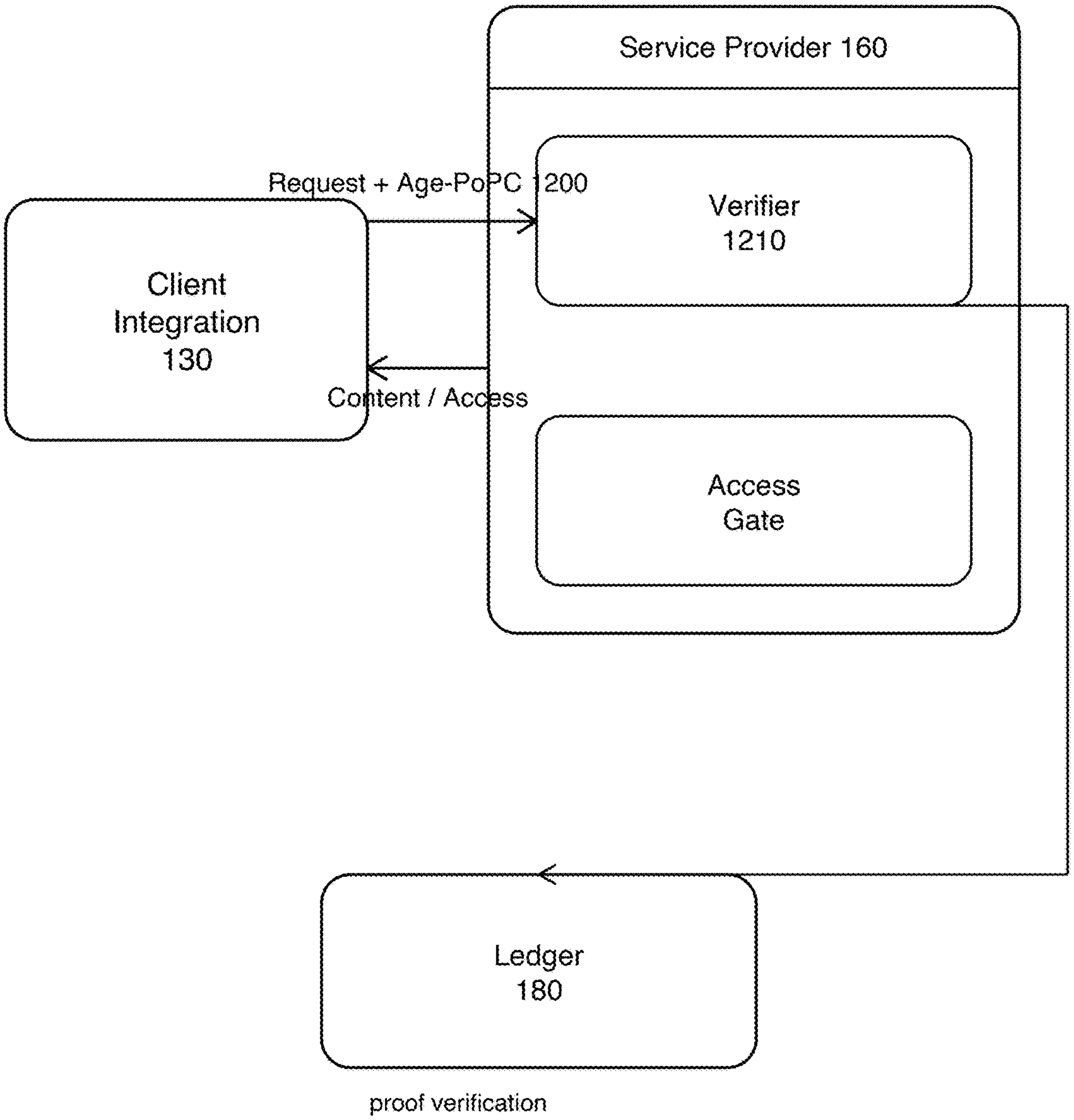
FIG. 12 is a flow diagram illustrating a receipt-as-access credential handshake in which a client integration presents an Age-PoPC to a remote service and the remote service verifies the Age-PoPC prior to delivering age-restricted content.

N. Receipt-as-Access Credential and Service-Side Verification (FIG. 12)

Two-sided enforcement overview (optional; illustrative). In some embodiments, an age-restricted service or content provider requires presentation of an Age-Compliance Proof-of-Policy-Compliance (Age-PoPC) prior to delivering restricted content, for example as part of a receipt-as-access credential handshake 1200. An Age-PoPC may be derived from an Age-Compliance Receipt and may include a signature, a freshness window, and a policy snapshot reference, thereby enabling a service to verify that an age-policy evaluation occurred on the client under an identifiable policy state; the claims control.

Presentation mechanisms (illustrative; non-limiting). In some embodiments, Age-PoPC is presented (e.g., during a receipt-as-access credential handshake 1200) via one or more of: an HTTP header, a request-body field, a WebSocket or other session handshake field, a streaming media session setup message, or an API parameter. In some embodiments, Age-PoPC is cryptographically bound to a request scope comprising at least one of: a service identifier, a target category, a target identifier hash, a session identifier, a nonce, or a validity window to reduce replay; the claims control.

Service-side verification (illustrative). In some embodiments, a service-side verifier 1210 component validates an Age-PoPC by checking at least: signature validity, issuer trust policy, expiry/freshness satisfaction, and conformance to a required policy snapshot reference format. In some embodiments, the verifier further checks one or more ledger proofs (for example, a signed head reference and an inclusion proof) when available. If verification fails, the service denies access, requests guardian involvement, or serves an age-appropriate fallback.

Privacy-preserving variants (illustrative; non-limiting). In some embodiments, Age-PoPC and/or underlying A-TOKENS use pseudonymous identifiers, scoped or rotating pseudonyms, selective disclosure, and/or zero-knowledge proofs such that the service learns only an age tier or threshold satisfaction without learning an exact date of birth or underlying identity document. Targets may be represented by hashes or category-abstracted labels to reduce sensitive disclosure.

Cached verification and offline service operation (optional). In some embodiments, a service verifies Age-PoPC using cached issuer keys, cached conformance profile identifiers, and cached policy pack digests under a freshness policy, enabling continuity during network outages. Where freshness cannot be satisfied, the service fails closed or requests a higher-friction approval.

Evidence bundling for audit (optional; evidence-only). In some embodiments, an audit bundle includes: an Age-PoPC, a corresponding Age-Compliance Receipt, an associated policy snapshot reference, and optional proof objects (e.g., signed heads, inclusion proofs, consistency proofs). Such bundles enable third parties to verify two-sided enforcement under a freshness policy; audit bundle fields are evidence-only.

Figure 13:
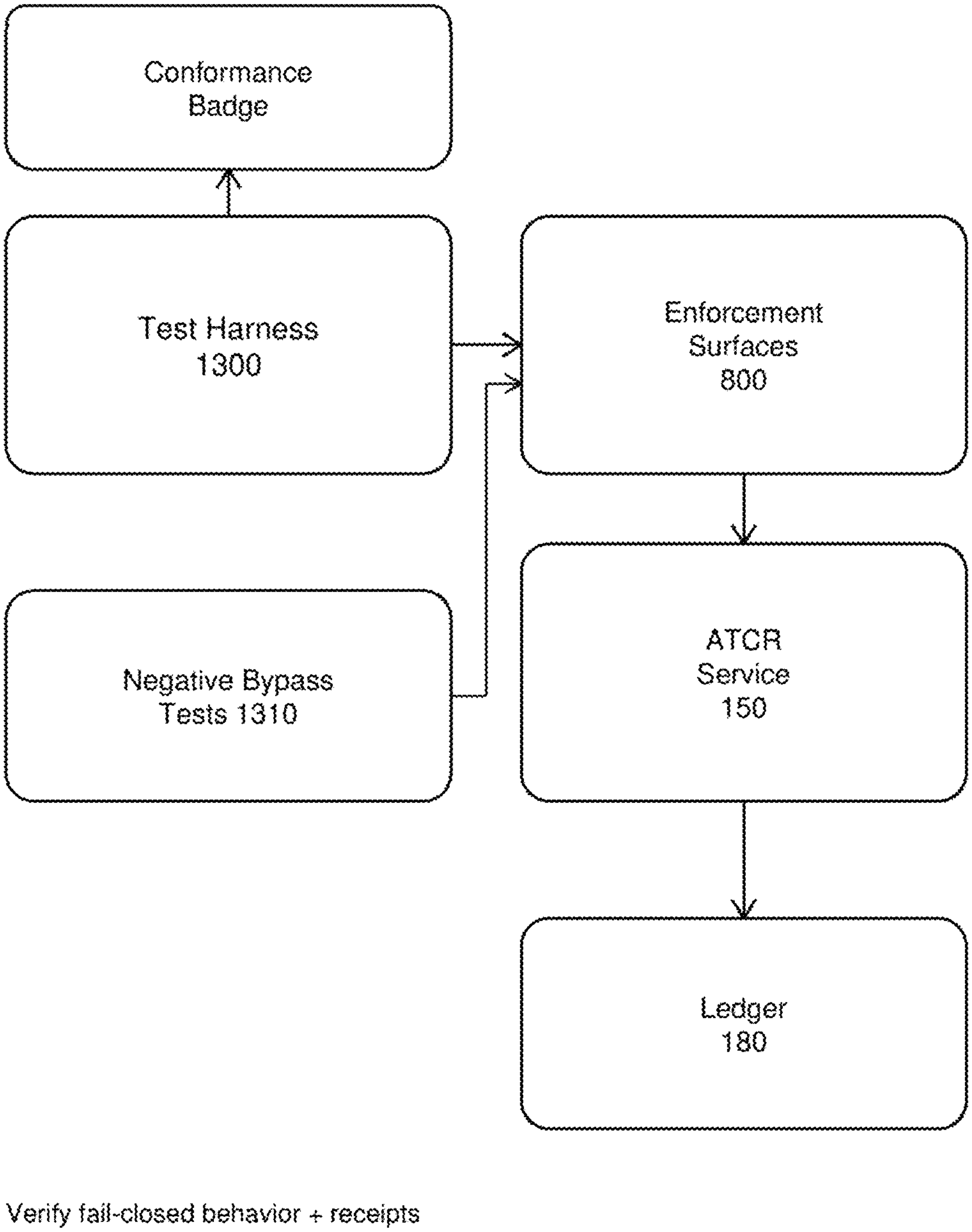
FIG. 13 is a block diagram illustrating a conformance test harness that executes negative bypass tests across enforcement surfaces, verifies fail-closed behavior, and issues a cryptographically verifiable conformance badge.

O. Conformance and Bypass-Resistance Test Harness (FIG. 13)

Conformance predicates for assistant and output gates (optional; illustrative). In some embodiments, a conformance test harness 1300 executes conformance testing under a conformance profile that specifies required predicates for one or more enforcement surfaces, including assistant tool-use gates, media pipeline gates, and output delivery gates. Required predicates may include, without limitation: (i) fail-closed behavior on token invalidity or policy evaluation timeouts, (ii) non-bypassable invariants for intent-to-access transitions, (iii) uncertainty handling for classification confidence rules, and (iv) session permit freshness validation.

Negative bypass tests (illustrative). In some embodiments, negative bypass tests 1310 are executed by the conformance test harness 1300, a conformance test suite attempts to bypass an enforcement surface by initiating a restricted tool call, retrieval, media playback, or output delivery without invoking ATCR, or by attempting to disable or route around a gate using alternate APIs. A conformant implementation prevents completion of the restricted path (fail-closed) and emits receipts recording the enforcement behavior.

Badge content and attested enforcement linkage (optional; evidence-only). In some embodiments, a conformance badge includes an implementation-under-test (IUT) build identifier, a configuration digest for enforced gates, one or more predicate identifiers, a validity window, and an issuer key identifier. In some embodiments, the badge or certificate bundle references an attested enforcement indicator digest as evidence that the certified gate configuration is active.

Continuous recertification (optional). In some embodiments, conformance is treated as continuous: badge verification is performed during deployment or periodically at runtime, and recertification triggers include IUT version changes, configuration drift, policy pack changes, key rotation, or conformance profile updates. Upon a failed verification, a system may fail-closed for designated categories or require renewed certification.

Figure 14:
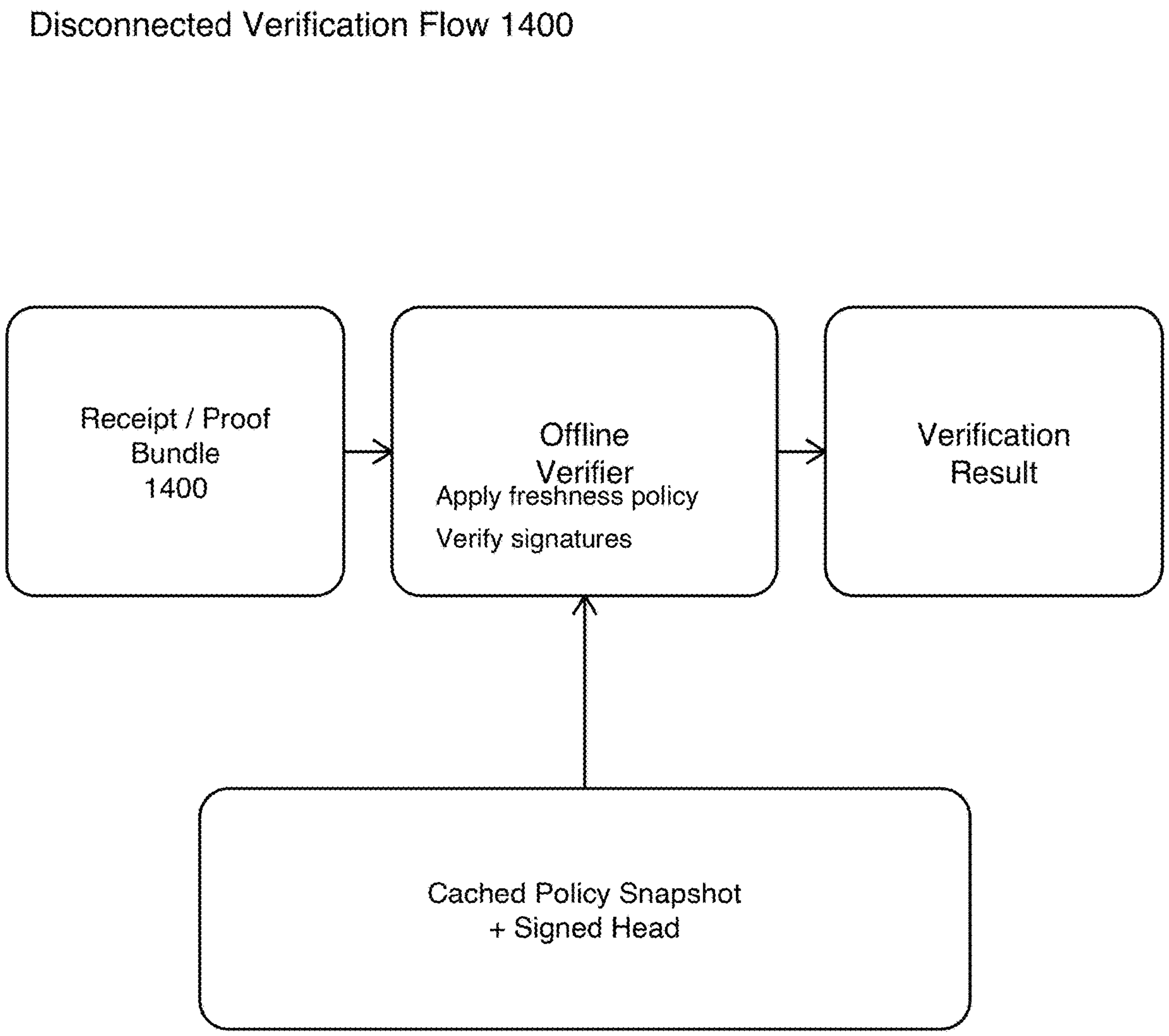
FIG. 14 is a flow diagram illustrating disconnected or offline verification of receipts and proof bundles under a freshness policy, including cached policy snapshot references.

P. Disconnected Verification and Evidence Bundles (FIG. 14)

Disconnected verification objective (illustrative; non-limiting). In some deployments, oversight actors such as guardians, institutions, auditors, or regulators verify compliance in constrained or disconnected environments, for example using a disconnected verification flow 1400. In such embodiments, receipts include sufficient signed artifacts (e.g., receipt signatures, policy snapshot references, signed head references, and optional proof bundles) to enable offline verification under a freshness policy.

Offline verifier (optional; illustrative). In some embodiments, a portable verifier application ingests an evidence bundle comprising one or more receipts and associated proof objects and verifies: signature validity, issuer trust policy satisfaction, policy snapshot reference integrity, and where available inclusion/consistency proofs against cached signed heads. Verification may be performed without contacting the ATCR service, provided that the necessary public keys and signed heads are available.

Freshness and merge delay (illustrative). In some embodiments, a freshness policy specifies a maximum staleness and/or maximum merge delay for anchoring. Receipts may encode anchor_status indicators (e.g., pending/deferred/anchored) and later attach proofs. When freshness cannot be satisfied, a verifier indicates a stale status and a policy may treat the episode as non-compliant or require escalation.

Minimal disclosure in offline presentation (illustrative). In some embodiments, role-based redaction profiles apply during offline presentation such that sensitive targets remain hashed or category-abstracted while preserving verifiable outcome evidence. Redaction indicators are evidence-only and do not alter gating predicates; the claims control.

VIII. REFERENCE NUMERALS (ILLUSTRATIVE; NON-LIMITING)

100—Age-Token Compliance environment
110—Device (phone/tablet/TV/console/smart speaker/wearable/etc.)
120—Operating system (OS)
130—App store, browser stack, and assistant stack (store/browser/assistant layer)
140—Age-Token issuer(s)
150—Age-Token Compliance Rail (ATCR) service
152—Age-Token validation module
154—Age-Compliance context capture module
156—Multi-Jurisdiction Age-Policy Graph engine
158—Permit decision and gating engine
159—Age-Compliance Receipt generator
160—Content/service providers
170—Oversight interfaces
172—Guardian Console
174—Operator Console
176—Regulator Portal
180—Age-Compliance Ledger
300—Age-Compliance context envelope
310—Age-Policy Graph
320—Permit outcome
400—Age-Compliance Receipt.
500—Multi-tenant ATCR cloud service
600—Age-gating state machine
800—Non-bypassable enforcement surfaces (FIG. 8)
810—OS network-stack gate (FIG. 8)
820—Browser navigation gate (FIG. 8)
830—App store/package manager gate (FIG. 8)
840—Media pipeline gate (FIG. 8)
850—Assistant capability/tool-use gate (FIG. 8)
852—Assistant stack (FIG. 8)
860—Evidence-only enforcement markers (FIG. 8)
1100—Output delivery commitment flow (FIG. 11)
1120—Output-commit boundary/output gate (FIG. 11)
1200—Receipt-as-access credential handshake (FIG. 12)
1210—Service-side verifier (FIG. 12)
1300—Conformance test harness (FIG. 13)
1310—Negative bypass tests (FIG. 13)
1400—Disconnected verification flow (FIG. 14)
900—Session permit lifecycle (FIG. 9)
910—Session permit issuance/mint (FIG. 9)
920—Session permit validation (FIG. 9)
930—Mid-session re-evaluation (FIG. 9)
940—Revocation (FIG. 9)
950—Termination/reroute (FIG. 9)
1000—Role-based receipt views (FIG. 10)
1010—Redaction profiles (FIG. 10)
1020—Guardian view (FIG. 10)
1030—Operator view (FIG. 10)
1040—Regulator view (FIG. 10)

IX. APPENDICES

Purpose and status (illustrative; non-limiting). The following appendices are included as part of this specification to aid clarity, interoperability, and verifiable implementation of example embodiments. The appendices provide non-limiting examples of terminology (e.g., a glossary), example data structures (e.g., receipt schemas), example policy representations (e.g., policy graph snippets), example registries (e.g., reason and failure codes), and example protocols and evidence bundles (e.g., offline verification, conformance predicates, and optional two-sided verification handshakes). Unless expressly stated otherwise, the appendices are illustrative and are not required for every implementation.

No limitation of claim scope. The appendices are provided for explanatory convenience and do not limit the scope of the invention. The scope of the invention is defined solely by the claims. Any feature, field, encoding, identifier, registry entry, protocol step, or example object described in an appendix may be added, omitted, reordered, combined, renamed, or substituted with an equivalent mechanism while remaining consistent with the disclosure.

Evidence-only nature of appendix fields. In many embodiments, appendix-described artifacts (e.g., ledger anchors, proof objects, registries, transparency mappings, or cross-rail references) are "evidence-only," meaning they support auditability, observability, conformance testing, procurement readiness, and/or interoperability, and do not alter core permit-before-action gating predicates or permit outcomes unless an embodiment explicitly defines such a dependency and/or the claims expressly recite such a dependency. Where an appendix includes an "evidence-only" marker, that marker is intended to reinforce non-limiting interpretation.

Encoding neutrality. Example encodings shown in the appendices (e.g., JSON, CBOR, or other structured formats) are illustrative. Implementations may use any suitable encoding, canonicalization, signing format, hashing algorithm, or transport mechanism. Field names, nesting, registries, and identifiers may vary by deployment while preserving the described semantics.

Consistency with the specification. To the extent any appendix appears to conflict with the main body of this specification, the main body controls. To the extent an appendix includes options, variants, or alternative flows, those alternatives are provided as illustrative embodiments and do not imply that any single option is required. References within appendices to laws, regulations, standards, or platform practices are illustrative and evidentiary only and do not limit the claims.

Self-contained disclosure; no incorporation by reference. The appendices are self-contained within this specification. External documents, standards, or third-party materials referenced by name are not incorporated by reference for essential matter. All essential material supporting the claims is provided explicitly herein; the claims control.

Continuation and modularity intent (illustrative). The appendices are structured to support modular implementations and future extensions, including optional conformance testing, optional proof bundles, optional delegated approvals, optional two-sided verification, and optional privileged enforcement attestations. Such modularity is intended to increase interoperability and design-around resistance without narrowing the scope of the claimed invention.

Appendix list (illustrative). The appendices that follow include, by way of example:

APPENDIX A—Glossary of Terms (Illustrative; Non-Limiting).

APPENDIX B—Example Age-Compliance Receipt Schema (Illustrative).

APPENDIX C—Example Age-Policy Graph Snippet (Illustrative)

APPENDIX E-Reason Codes & Failure Codes Registry (Illustrative; Evidence-Only).

APPENDIX F—Session Permit Schema (Optional; Illustrative)

APPENDIX G—Signed Policy Pack & Snapshot Reference Format (Optional; Illustrative).

APPENDIX H—Proof Objects Format (Optional; Illustrative)

APPENDIX I—Receipt-as-Access Credential Protocol (Optional; Illustrative)

APPENDIX J—Output Delivery Receipt and Output Segment Schema (Optional; Illustrative)

APPENDIX K—Conformance Predicates for Assistant Tool and Output Delivery Gates (Optional; Illustrative)

APPENDIX L—Threat Model and Bypass Taxonomy (Optional; Illustrative).

APPENDIX M—Policy Transparency Log, Non-Equivocation Witnesses, and Conflict Proofs (Optional; Illustrative)

APPENDIX N—Delegation, Quorum Approvals, and Consent Receipts (Optional; Illustrative).

APPENDIX O—Action Receipts and Action-Scoped Proof-of-Policy-Compliance (Optional; Illustrative)

APPENDIX P—Attested Enforcement Indicators and Gate Integrity Proofs (Optional; Illustrative)

APPENDIX Q—Cryptographic Agility and Post-Quantum Readiness (Optional; Illustrative).

APPENDIX R—Multi-Actor and Co-Presence Context for Shared Devices (Optional; Illustrative)

APPENDIX S—Model Capability Manifests, Capability Certificates, and Toolchain Attestation (Optional; Illustrative).

APPENDIX T—Immersive and Ambient Output Channels and Effector Gating (Optional; Illustrative).

APPENDIX U—Privacy-Preserving Compliance Proofs and Aggregated Audit (Optional; Illustrative)

APPENDIX V—Protocol and Platform Evolution (Encrypted DNS, QUIC/ECH, P2P, and On-Device AI) (Optional; Illustrative)

The ordering and naming of appendices are illustrative and may vary; the claims control.

Appendix A—Glossary of Terms (Illustrative; Non-Limiting)

[A0] This appendix is part of the specification and aids clarity; the claims control. Terms are defined for convenience; implementations may add, omit, combine, or rename terms consistent with the disclosure. Nothing herein limits the claims.

[A1] Age-Assurance Artifact—Any artifact, credential, token, or proof used to support an age-related assertion (e.g., "18+"), including without limitation verifiable credentials, anonymous credentials, selective-disclosure tokens, or other issuer-signed age assertions. The rail need not process underlying identity documents.

[A2] Age-Assurance Confidence (Score/Bucket)—A value or bucket (e.g., low/medium/high) indicating confidence or assurance strength of an age determination, optionally included in an A-TOKEN and/or recorded in receipts as evidence. Confidence may be computed by an issuer under an issuer policy.

[A3] Age-Compliance Context Envelope—A structured bundle representing salient context of an age-relevant episode, which may include one or more A-TOKEN descriptors, jurisdiction information, target/service type and category, device posture, time-of-day or usage-window features (e.g., curfew), and a session or episode identifier (including audio-only or multimodal episodes).

[A4] Age-Compliance Ledger—A tamper-evident evidence store (public, consortium, or private) used to store or anchor Age-Compliance Receipts, including implementations that are append-only and publish signed heads and support verification (e.g., inclusion and append-only evolution proofs) under a freshness policy.

[A5] Age-Compliance Ledger Namespace—A logical or physical partition of an Age-Compliance Ledger (e.g., per tenant, per jurisdiction, per product line) used to isolate receipts, keys, or reporting streams.

[A6] Age-Compliance Proof-of-Policy-Compliance (Age-PoPC)—A receipt or proof object that evidences that an age-policy evaluation occurred for an episode and that a permit outcome was enforced, optionally including ledger anchors and verification artifacts. Age-PoPC may be implemented as (or derived from) an Age-Compliance Receipt.

[A7] Age-Compliance Receipt—A structured, machine-verifiable record describing an age-relevant episode, including at least (i) an Age-Compliance Context Envelope (or subset thereof), (ii) an identifier of an age-policy graph/profile/version or a policy snapshot reference, and (iii) a permit outcome; optionally including A-TOKEN summaries, guardrails, parental involvement indicators, reason codes, failure codes, and anchor information.

[A8] Age-Policy Graph—A representation (e.g., directed graph, ruleset, decision table) encoding age-related policies as conditions and transitions across age tiers, service categories, jurisdictions, parental involvement requirements, and logging/retention rules, used to determine a permit outcome.

[A9] Age-Policy Graph Engine (Policy Graph Evaluation Engine)—A component that evaluates an Age-Policy Graph using an Age-Compliance Context Envelope to compute a permit outcome and related evaluation artifacts (e.g., applied constraints, branch identifiers).

[A10] Age-Policy Profile—A configuration profile specifying jurisdiction mappings, thresholds, categories, parental requirements, and logging/retention requirements, used to parameterize one or more Age-Policy Graphs. A profile may be versioned and identified in receipts.

[A11] Age Tier—A tiered age classification (e.g., under-13, 13-15, 16-17, 18+) used for policy evaluation and gating. Tiers are illustrative and may vary by jurisdiction or deployment.

[A12] Age Token (A-TOKEN)—A verifiable credential or artifact that attests to at least an age tier for a device or profile, the artifact being verifiable under at least one of: (i) cryptographic verification (e.g., issuer signatures and/or proof verification), or (ii) platform-authenticated integrity verification (e.g., an OS- or app store-provided declared age-range artifact), optionally including an age-assurance confidence indicator, issuer identity, expiry, and revocation posture; in some embodiments bound to a device identifier and/or profile identifier. A-TOKENS may be produced by trusted sensor, identity, OS, or app store layers and consumed by ATCR without exposing underlying identity documents.

[A13] Age Token Issuer (Issuer)—An entity or module that issues A-TOKENS, including identity providers, OS-level age modules, trusted sensors, or other trusted sources operating under an issuer policy and cryptographic keys.

[A14] Anonymous Credential—A credential format enabling proofs of attributes (e.g., age tier) with reduced linkability, potentially supporting selective disclosure and/or zero-knowledge proofs.

[A15] Append-Only Evolution Proof (Consistency Proof)—A proof demonstrating that a later ledger state extends an earlier state without deletion or modification of prior entries, supporting tamper-evident evolution.

[A16] Assistant Stack—A software stack mediating conversational or audio-first interactions, which may include ASR/TTS, tool calling, plugins, retrieval, agent workflows, or external API requests, and which may invoke ATCR prior to capability execution or output delivery.

[A17] Assistant Capability Invocation (Capability Invocation)—A request to perform an action or provide content via an assistant or companion (e.g., play media, enter a community space, perform retrieval, execute a tool call), treated in some embodiments as an age-relevant episode subject to ATCR evaluation.

[A18] Assistant Tool Gate (Capability/Tool-Use Gate)—An enforcement surface within an assistant stack that invokes ATCR before executing a tool call, action plan, retrieval, rendering, or output delivery, and fails closed when permit conditions are not satisfied.

[A19] Attested Enforcement Indicator (Attestation/Integrity Indicator)—An optional indicator or attestation that an enforcement surface (e.g., OS network stack, browser, app store, assistant tool gate) is enabled and enforcing permit-before-action and fail-closed behavior; may be referenced in receipts as evidence-only.

[A20] Cached Policy Evaluation—An optional mode in which an integration evaluates a locally cached policy pack and locally verifiable A-TOKEN under strict freshness constraints when a remote policy service is unreachable, while still failing closed when required.

[A21] Category-Abstracted Target (Category-Level Target)—A representation of a target that omits sensitive identifiers (e.g., specific URL or title) and retains only a category-level label (e.g., "adult_sexual_content"), used for redacted views and privacy-preserving reporting.

[A22] Cross-Rail Reference—An optional pointer in an Age-Compliance Receipt to one or more receipts or artifacts produced by other governance rails (e.g., Sensor Receipts (S2), Child Safety Receipts, Family Binding Receipts), used to provide end-to-end chain-of-custody evidence. Cross-rail references are evidentiary only and do not alter ATCR gate predicates; the claims control.

[A23] Curfew Restriction (Usage Window/Time Window)—A policy constraint limiting when a profile (e.g., child profile) may access certain categories or capabilities; may be represented as a context feature and/or reason code.

[A24] De-Identified Receipt—A receipt (or view thereof) with identifiers removed, hashed, tokenized, or abstracted to reduce privacy risk, while preserving verifiability of outcomes and aggregate reporting utility.

[A25] Device Posture Indicator—A context feature indicating device state relevant to bypass risk or assurance (e.g., rooted/jailbroken status, secure element availability, trusted store restriction, VPN/proxy indicators, DNS/certificate trust deviations), which may be recorded as evidence-only absent explicit policy dependence.

[A26] Evidence Bundle—A packaged set of artifacts used for audit or reporting, which may include receipts, ledger proofs, policy snapshots, and/or redacted classification artifacts. Evidence bundles are illustrative; the claims control.

[A27] Evidence—Only Field (Evidence-Only Extension)—A field recorded for audit, observability, interoperability, or reporting that does not alter core gating predicates or permit outcomes unless explicitly referenced by policy or claims; the claims control.

[A28] Fail-Closed Mode—A property whereby, upon a failure condition (e.g., token validation failure, policy evaluation timeout, inability to reach ATCR, freshness failure), the system transitions to a safe state that blocks age-restricted access by default (e.g., DENY or REQUIRE_PARENT).

[A29] Family Binding Receipt—A receipt emitted by a Parent Binding Rail (PBR) evidencing a parent-child (or guardian-minor) relationship binding or verification, which may be referenced by ATCR as evidence in REQUIRE_PARENT workflows.

[A30] Freshness Policy—A policy describing temporal validity constraints for tokens, policy packs, signed heads, session permits, or proofs (e.g., maximum age, maximum merge delay, heartbeat interval), used to reduce replay or stale-policy risks.

[A31] Guardian Binding Token—A token or credential evidencing that a specific adult is a verified parent/guardian for a child profile, used in some embodiments to validate REQUIRE_PARENT approvals.

[A32] Guardian Console (Guardian View)—An interface providing a parent/guardian view of age-relevant episodes and outcomes, typically redacted or category-abstracted, optionally enabling approvals, disputes, and configuration within safe bounds.

[A33] Inclusion Proof—A proof demonstrating that a particular receipt digest (or batch digest) is included in a ledger state represented by a signed head.

[A34] Integration Marker (Enforcement Marker)—An evidence-only indicator identifying which enforcement surface enforced the permit-before-action invariant (e.g., "browser_http", "os_network_stack", "assistant_tool_gate", "app_store_install_gate"), used for audit and debugging without altering gate predicates.

[A35] Issuer Trust Policy—A policy specifying which issuers and issuer keys are trusted for A-TOKENS, including acceptance criteria, key identifiers, and optional revocation handling.

[A36] Issuer Key Identifier (Key ID)—A field identifying an issuer signing key (or key version), enabling verification and key rotation tracking in receipts and token validation.

[A37] Jurisdiction Branch—A branch of an age-policy graph corresponding to a particular legal/regulatory regime (e.g., country/state/region), used to apply different thresholds, parental requirements, or logging/retention rules.

[A38] Non-Bypassable Enforcement Surface—A control surface in the request path that prevents reaching an age-restricted target without passing through ATCR evaluation (e.g., OS network stack gate, browser navigation gate, app store gate, media pipeline gate, assistant tool gate).

[A39] Operator Console (Operator View)—An interface for OS/app store/browser/assistant operators showing de-identified trends, incident queues, configuration health, and tuning indicators derived from receipts, without requiring exposure of sensitive targets.

[A40] Output Delivery Gating—Enforcement prior to delivering an output channel (e.g., audio playback, synthesized speech output, transcript display, interactive session continuation), such that outputs are blocked or rerouted when permit conditions are not satisfied.

[A41] Parent Binding Rail (PBR)—A governance service maintaining a verifiable parent-child relationship graph and issuing Guardian Binding Tokens and Family Binding Receipts, optionally used by ATCR to validate REQUIRE_PARENT approvals.

[A42] Permit Outcome—A decision computed by policy evaluation indicating whether an age-relevant episode is permitted, permitted with guardrails, requires explicit guardian involvement, or denied (e.g., PERMIT, PERMIT_WITH_GUARDRAILS, REQUIRE_PARENT, DENY).

[A43] Permit-Before-Action—A semantic pattern in which an age-relevant action may only be executed upon issuance of a permit outcome satisfying a configured permit condition; actions are blocked or rerouted otherwise.

[A44] Policy Digest—A cryptographic digest of a policy graph, policy pack, or snapshot, recorded to support later verification that a permit outcome was computed under a particular policy state.

[A45] Policy Evaluation Timeout Fail-Closed (Timeout Failure Code)—A failure mode in which policy evaluation does not complete within a configured time and the system fails closed, optionally recording a structured failure code in the receipt.

[A46] Policy Pack (Signed Policy Pack)—A distributable policy artifact (often signed) containing policy profile identifiers, versions, jurisdiction mappings, and/or graph data used for evaluation; may be cached and validated prior to use.

[A47] Policy Snapshot Reference—A reference sufficient to enable later verification of policy state used for a given episode, including without limitation a policy pack ID, snapshot hash, policy digest, or signed policy identifier.

[A48] Redaction Profile—A profile describing how receipts are transformed into role-based views (e.g., what identifiers are redacted, hashed, or abstracted), used to tailor guardian/operator/regulator outputs while preserving verifiability.

[A49] Regulator Portal (Regulator View)—An interface presenting aggregate compliance metrics and verifiable proofs (e.g., signed heads, inclusion proofs) derived from Age-Compliance Ledgers and/or de-identified receipts, for auditors or regulators.

[A50] Revocation Posture—Information indicating whether a token, key, or session permit is revoked or potentially invalid (e.g., via revocation lists, expiry checks, or freshness rules), used to prevent stale or compromised authorization.

[A51] Reason Code—A structured code describing why a permit outcome was issued (e.g., UNDER_AGE_THRESHOLD, TOKEN_MISSING, TOKEN_EXPIRED, TOKEN_REVOKED, LOW_ASSURANCE_CONFIDENCE, JURISDICTION_POLICY_DENY, REQUIRE_GUARDIAN_APPROVAL, CURFEW_RESTRICTION, POLICY_EVAL_TIMEOUT_FAIL_CLOSED, INTEGRITY_POSTURE_INSUFFICIENT). Reason codes aid explainability and audit and do not limit claims.

[A52] Role-Based Receipt View—A rendering of receipt information for a particular role (guardian/operator/regulator) under a redaction profile, which may include category-level summaries, outcome histories, aggregate metrics, and proof objects.

[A53] Selective Disclosure Token—A token enabling selective revelation of attributes (e.g., age tier) while withholding underlying sensitive information (e.g., exact DOB), optionally derived from verifiable credentials or anonymous credentials.

[A54] Sensor Receipt (S2)—A receipt emitted by a trusted sensor ingress layer (e.g., TSIL) attesting to capture events relevant to age assurance (e.g., liveness-protected capture), which may be referenced by ATCR as evidence-only.

[A55] Session Permit—A short-lived, session-bound permit issued for streaming or interactive sessions, specifying one or more session limits (e.g., maximum duration, maximum turns, category scope) and required before continuing content delivery across turns/segments.

[A56] Session Limit—A constraint specified in a session permit (e.g., time, turns, scope, freshness checks) that is enforced during a session and may trigger re-evaluation, revocation, or termination when exceeded or violated.

[A57] Signed Head (STH/Signed Ledger Head)—A signed representation of a ledger state (e.g., a root, checkpoint, or head ID) used to verify receipt anchoring and to support inclusion and append-only evolution proofs.

[A58] Structured Failure Code—A structured code recorded when failures occur (e.g., token validation failure, policy evaluation timeout, ledger anchoring issues), supporting fail-closed auditability without altering claim scope.

[A59] Target Category—A category label assigned to a target or requested capability (e.g., "adult_sexual_content", "gambling", "explicit_chat", "self_harm_related"), used for policy evaluation and receipt reporting.

[A60] Target Classification Source—A source of category assignment, including app store metadata, domain/URL classification feeds, rating taxonomies, service-provided labels, or assistant intent taxonomies; classification sources may be recorded as evidence-only.

[A61] Target Identifier Hash (Target Hash)—A hashed or digested identifier representing a target (e.g., URL hash, app/package hash, content ID hash) used to reduce direct exposure of sensitive targets while enabling correlation and audit.

[A62] Tenant (Multi-Tenant Deployment)—A logical customer, operator, or deployment instance within a multi-tenant ATCR service, typically associated with isolated configuration stores, keys, and ledger namespaces.

[A63] Unlinkability—A property whereby identifiers or proofs are constructed to reduce the ability to link the same user/device across different services or relying parties, while still allowing authorized oversight views under appropriate policies.

[A64] Verifiable Credential (VC)—A cryptographically verifiable credential format that can encode age tier assertions (among other attributes), optionally supporting selective disclosure and issuer policies.

[A65] Zero-Knowledge Proof (ZK Proof)—A proof object enabling verification of an age threshold (e.g., "18+") without revealing underlying sensitive attributes beyond what is necessary (e.g., age tier and optional confidence bucket), subject to issuer and verifier policies.

[A66] Approval Token—A time-bounded approval artifact issued, minted, or validated upon an explicit guardian approval for an episode, optionally cryptographically bound to an episode scope (e.g., device/profile hash, session/episode identifier, target category or service type, and/or a policy snapshot reference). Approval Tokens may include anti-replay material (e.g., nonce, expiry) and may be validated prior to enabling an age-relevant action.

[A67] Consent Receipt—A structured record describing a guardian approval decision for an episode, which may include pseudonymous minor and guardian identifiers, an episode scope description, an approval outcome, optional reason codes, and optional policy snapshot references. Consent Receipts are evidentiary artifacts and do not alter gate predicates unless explicitly recited in claims; the claims control.

[A68] Guardian-of-Record—A parent or guardian identified as authorized to approve a minor's age-relevant episode, determined in some embodiments using a verifiable parent-child relationship graph (e.g., via PBR).

[A69] Anti-Replay Material—Data used to prevent reuse of an approval artifact outside its intended context, including without limitation a nonce, expiry timestamp, monotonic counter, freshness rule, or one-time-use flag.

[A70] Revocation Artifact—A token, record, or status entry indicating that a previously granted approval is invalidated, such that subsequent validation attempts fail, optionally accompanied by a revocation Consent Receipt.

[A71] Implementation Under Test (IUT)—An implementation of an age-gating integration surface and/or an age-gating rail that is evaluated under a conformance test suite and conformance profile.

[A72] Conformance Profile—A profile specifying required predicates and required artifacts for conformance testing of an IUT, optionally including minimum receipt sets, required registry versions, and required snapshot reference formats.

[A73] Required Predicate—A condition to be verified during conformance testing, including without limitation a non-bypassable enforcement predicate, a fail-closed predicate, an uncertainty-handling predicate, or a minimum-receipt predicate.

[A74] Conformance Test Suite—A set of tests, including negative tests, executed against an IUT to verify required predicates under a conformance profile.

[A75] Conformance Badge—A cryptographically verifiable certificate or badge issued upon a pass result under a conformance profile, optionally digitally signed and including an IUT digest and a validity window.

[A76] Badge Verification Interface—An interface or service that verifies a conformance badge, including signature validity, validity window, conformance coverage, and revocation status.

[A77] Recertification Trigger—An event that causes a conformance badge to be revoked, expired, or marked non-current and/or requires re-testing, including without limitation an IUT version change, configuration drift, policy pack change, key rotation, or conformance profile version change.

[A78] Conformance Certificate Bundle—A package comprising a conformance badge and a digest of conformance test results and/or identifiers of tested predicates and surfaces, optionally anchorable in a tamper-evident evidence store as evidence-only.

[A79] Output-Commit Boundary—A boundary (e.g., token chunk, sentence, audio frame group, or segment) at which an output is committed to an output channel (e.g., audio sink, display renderer). In some embodiments, ATCR gating is evaluated at an output-commit boundary; the claims control.

[A80] Output Delivery Receipt (ODR)—A receipt describing output delivery gating for an output segment or session, optionally including output channel identifiers and output segment digests; ODR fields are evidence-only unless expressly recited in the claims.

[A81] Output Segment Digest—A cryptographic digest of an output segment (e.g., text chunk digest or audio frame digest) recorded as evidence for what would have been delivered, optionally under redaction; the claims control.

[A82] Receipt-as-Access Credential—A use of an Age-Compliance Receipt or derived Age-PoPC as a credential presented to a remote service to evidence that an age-policy evaluation occurred under an identifiable policy state; the claims control.

[A83] Age-PoPC Presentation Token (PoPC Token)—A token or proof object derived from a receipt and presented to a relying party, optionally bound to request scope and freshness constraints.

[A84] Service-Side Verifier—A verification component operated by a service provider that validates an Age-PoPC prior to delivering age-restricted content.

[A85] Conformance Predicate Registry—A registry of predicate identifiers and required behaviors used by a conformance profile to test non-bypassable and fail-closed properties across enforcement surfaces; illustrative only.

[A86] Policy Transparency Log—A tamper-evident log used to commit policy packs and/or policy snapshots, publishing signed heads and supporting inclusion and append-only evolution proofs for later verification; illustrative only.

[A87] Non-Equivocation Witness—An independent observer that co-signs or attests to policy-log heads such that an operator cannot present inconsistent policy states without detection; illustrative only.

[A88] Conflict Proof—An evidentiary artifact indicating inconsistency among policy commitments (e.g., conflicting policy digests asserted for the same identifier/version/effective window), optionally including head references and inclusion proofs; evidence-only.

[A89] Delegation Credential—A cryptographically verifiable credential delegating limited approval authority for REQUIRE_PARENT workflows under a constrained scope and validity window, optionally revocable; evidence-only.

[A90] Quorum Approval Rule—A policy rule requiring multiple approvals (m-of-n) prior to satisfying REQUIRE_PARENT for an episode or session; illustrative only.

[A91] Action Receipt—A receipt describing a side-effect action scope and binding a permit outcome to that scope under a freshness window, enabling audit and (optionally) action-scoped PoPC derivation; evidence-only unless claimed.

[A92] Action-Scoped PoPC—A proof token derived from an action receipt and bound to a request scope (service/target/action/nonce/expiry), presented to a remote service for two-sided enforcement; evidence-only unless claimed.

[A93] Gate Configuration Digest—A digest describing an enforcement surface configuration (e.g., enabled gates, fail-closed mode, policy acceptance criteria, minimum receipt set), optionally bound to an attested enforcement indicator; evidence-only.

[A94] Gate Integrity Proof—A bundle comprising one or more attested enforcement indicators and verification artifacts evidencing that a privileged enforcement boundary was enforcing permit-before-action, fail-closed semantics for an episode; evidence-only.

[A95] Witness Co—Signed Head-A log head accompanied by one or more witness co-signatures or references thereto, used to reduce equivocation risk; evidence-only.

Appendix B—Example Age-Compliance Receipt Schema (Illustrative)

(This appendix is illustrative and non-limiting. The claims control. Field names, nesting, encodings, and identifiers may be added, omitted, or renamed while remaining within the scope of the disclosure. A "core" subset may be sufficient for compliance evidence; other fields may be evidence-only extensions.)

{
"schema_version": "ATCR-Receipt-1.1",
"receipt_type": "age_compliance_receipt",
"receipt_id": "acr-2026-01-02-000123",
"registry_versions": {
"reason_codes_registry": "ATCR-ReasonRegistry-1.0",
"failure_codes_registry": "ATCR-FailureRegistry-1.0",
"session_permit_schema": "ATCR-SessionPermit-1.0",
"policy_pack_format": "ATCR-PolicyPack-1.0",
"proof_objects_format": "ATCR-Proofs-1.0",
"redaction_profiles_registry": "ATCR-RedactionProfiles-1.0"
},
"timestamps": {
"request_timestamp": "2026-01-02T14:32:01Z",
"decision_timestamp": "2026-01-02T14:32:05Z",
"receipt_issued_at": "2026-01-02T14:32:06Z",
"anchor_timestamp": "2026-01-02T14:35:00Z"
},
"core": {
"subject_pseudonym": {
"device_id_hash": "DEV_81ff9d . . . ",
"profile_id_hash": "P_3af9c1 . . . ",
"profile_type": "child_profile",
"pseudonym_scope": "tenant_scoped",
"pseudonym_rotation_hint": "rotatable"
},
"age_assertion_summary": {
"age_tier": "13-15",
"assurance_confidence_bucket": "high",
"jurisdiction": "US-MO"
},
"target_summary": {
"service_type": "web",
"category": "adult_sexual_content",
"target_id_hash": "URL_flc29a . . . ",
"classification_source": "domain_classification_feed"
},
"policy_reference": {
"policy_pack_id": "ppk-ATCR-US-Adult-1.0",
"policy_profile_id": "ATCR-Core-Adult/US-MO",
"policy_version": "1.0.3",
"jurisdiction_branch": "US-MO",
"policy_digest": "PGD_9c1ab2 . . . ",
"policy_pack_signature_ref": {
"signer_id": "ATCR_OPERATOR",
"key_id": "kid-2026-01",
"signature_hash": "SIG_ppk_3311 . . . "
}
},
"permit": {
"permit_outcome": "DENY",
"reason_code": "UNDER_AGE_THRESHOLD",
"failure_code": null,
"fail_closed_applied": true
}
},
"token_evidence": {
"token_type": "A-TOKEN",
"issuer id": "IDP_EXAMPLE",
"issuer_key_id": "kid-2026-01",
"age_tier": "13-15",
"confidence_bucket": "high",
"issued at": "2025-11-30T18:10:00Z",
"expires_at": "2026-11-30T18:10:00Z",
"revocation": {
"revocation_checked_at": "2026-01-02T14:32:04Z",
"revocation_state": "not_revoked",
"revocation_source_hint": "issuer_status_endpoint"
},
"privacy_preserving_proof": {
"proof_type": "vc_or_selective_disclosure_or_zk",
"proof_object_hash": "PROOF 34ab . . . "
}
},
"context": {
"platform": {
"platform_id": "mobile_os_vX",
"os_family": "mobile_or_desktop_or_embedded",
"client_app_id": "ExampleBrowser_or_Assistant", “tenant_id”: “tenantA”
},
“episode_identifiers”: {
“session_id_hash”: “S_11b3cf . . . ”,
“episode_id_hash”: “E_7a19d2 . . . ”
},
“jurisdiction_source”: {
“jurisdiction”: “US-MO”,
“source_hint”: “device_settings_or_network_or_geo”,
“confidence_bucket”: “medium_or_high”
},
“time_window”: {
“time_of_day_bucket”: “late_evening”,
“usage_window”: “outside_child_curfew”,
“curfew_enforced”: true
},
“device_posture”: {
“rooted_or_jailbroken”: false,
“secure_element_available”: true,
“trusted_store_only”: true,
“vpn_or_proxy_detected”: false,
“dns_or_cert_trust_deviation”: false
},
“assistant_context”: {
“assistant_present”: false,
“assistant_mode”: “none_or_voice_assistant_or_companion”,
“capability_invocation_type”: “none_or_playback_or_tool_call_or_enter_space”,
“tool_call_type”: “none_or_retrieval_or_plugin_or_action plan”,
“output_channel”: “none_or_audio_or_text_or multimodal”
},
“policy_evaluation”: {
“evaluation_outcome”: “DENY”,
“constraints_applied”: [
“block_minor_access_to_adult_content”
],
“guardrails_applied”: [ ],
“required_threshold”: “18+”,
“logging_and_retention”: {
“receipt_required”: true,
“anchor_required”: true,
“retention_policy_id”: “ret-ATCR-US-MO-Adult-1”
},
“evidence_refs”: [
“log://atcr/policy_eval/2026/01/02/evt-983141”
]
},
“enforcement_evidence”: {
“non_bypassable_surface”: “browser_nav_gate_or_os_network_stack_or_assistant_tool_gate”,
“integration_marker”: “browser_http”,
“no_bypass_invariant”: “enforced_optional”,
“output_delivery_gated”: true,
“attested_enforcement_indicator”: {
“present”: “optional”,
“attestation_hash”: “ATTEST 1b2c . . . ”
“enforcement_markers”: [
“os_network_stack”,
“browser_nav_gate”]
“require_parent”: {
“parental_workflow_invoked”: false,
“guardian_binding_verified”: false,
“guardian_binding_token_ref”: null,
“family_binding_receipt_refs”: [ ]
},
“session_permit”: {
“session_permit_issued”: false,
“session_permit_ref”: null,
“session_permit_object”: null,
“mid_session_re_evaluation”: {
“enabled”: “optional”,
“trigger_hint”: “topic_or_category_or_tool_call_change”
}
},
“anchor_and_proofs”: {
“ledger”: {
“ledger_id”: “log: ATCR-US”,
“namespace”: “tenantA/us”,
“signed_head_id”: “sth: 2026 Jan. 2-001”
},
“receipt_digest”: {
“digest_alg”: “sha256_or_other”,
“receipt_digest”: “RCPD_18f3 . . . ”
},
“proof_bundle”: {
“bundle_id”: “pb-2026-01-02-0009”,
“linked_receipt_id”: “acr-2026-01-02-000123”,
“signed_head”: {
“ledger_id”: “log: ATCR-US”,
“namespace”: “tenantA/us”,
“head_id”: “sth: 2026 Jan. 2-001”,
“head_timestamp”: “2026-01-02T14:35:00Z”,
“root_hash”: “ROOT_aa91 . . . ”,
“key_id”: “kid-2026-01”,
“signature_hash”: “SIG_sth_22aa . . . ”
},
“inclusion_proof”: {
“proof_type”: “hash_tree_or_other”,
“leaf_digest”: “RCPD_18f3 . . . ”,
“path_hashes”: [“H1 . . . ”, “H2 . . . ”, “H3 . . . ”],
“computed_root_hash”: “ROOT_aa91 . . . ”
},
“consistency_proof”: {
“proof_type”: “append_only_or_other”,
“older_head_id”: “sth: 2026-01-01-120”,
“newer_head_id”: “sth: 2026-01-02-001”,
“proof_payload_hash”: “H_con_55be . . . ”
},
“freshness”: {
“max_staleness_seconds”: 300,
“verified at”: “2026-01-02T14:36:00Z”
}
},
“anchor_status”: “anchored_or_pending_or_deferred”,
“anchor_deferred_reason”: null
},
“cross_rail”: {
“evidence_only”: true,
“sensor_receipt_refs”: [“s2: age-assurance-2025-11-30-00042”],
“child_safety_receipt_refs”: [ ],
“family_binding_receipt_refs”: [ ],
“profile”: “atcr_kids_mode/1.0”
},
“redaction_and_views”: {
“redaction_profile_id”: “rp-guardian-v1”,
“role_view_hints”: [“guardian”, “operator”, “regulator”],
“category_abstracted_target”: true
},
“monitoring”: {
“episode_risk_bucket”: “high_risk_content_for_minor”, "incident_flags": ["attempted_adult_access_by_minor"],
"sampling_tag": "optional",
"dispute_status": "none_or_pending_or_resolved"
},
"transparency_mapping": {
"age_inputs_ref": ["token_evidence.age_tier", "token_evidence.confidence_bucket"],
"jurisdiction_ref": ["core.age_assertion_summary.jurisdiction",
"core.policy_reference.jurisdiction_branch"],
"guardrails_ref": ["policy_evaluation.guardrails_applied", "core.permit.permit_outcome"],
"reason_code_ref": ["core.permit.reason_code", "core.permit.failure_code"],
"monitoring_indicators_ref": ["monitoring.incident_flags",
"context.time_window.curfew_enforced"],
"proofs_ref": ["anchor_and_proofs.ledger.signed_head_id",
"anchor_and_proofs.proof_bundle.inclusion_proof.computed_root_hash"]
},
"extensions": {
"vendor_private": { },
"site_specific": { },
"future_reserved": { }
}
}

Appendix C—Example Age-Policy Graph Snippet (Apex; Abbreviated; Illustrative)

(Illustrative only. Nodes, conditions, thresholds, and actions may vary by jurisdiction and deployment. The claims control. The snippet below shows one representative way to express a multi-jurisdiction graph with fail-closed semantics, REQUIRE_PARENT workflows, logging/retention, and optional session permits.)

Policy Pack Metadata (Illustrative)
  policy_pack_id: ppk-ATCR-US-Adult-1.0
  policy_profile_id: ATCR-Core-Adult/US-MO
  policy_version: 1.0.3
  policy_digest: PGD_9c1ab2 . . .
  signature: (optional) issuer/operator signature over pack
Node: Select_Jurisdiction_Branch
  Purpose: route to jurisdiction-specific obligations
  Condition: subject.jurisdiction E {US-MO, US-TX, EU, UK, OTHER}
  Action: set jurisdiction_branch; goto validate_token
Node: Validate Token
  Purpose: fail-closed when A-TOKEN is missing/invalid/stale
  Evaluation (illustrative):
  if token missing→permit_outcome=DENY, reason_code=TOKEN_MISSING
  else if token expired→DENY, reason_code=TOKEN_EXPIRED
  else if token revoked→DENY, reason_code=TOKEN_REVOKED
  else if confidence<policy minimum→REQUIRE_PARENT or DENY per branch, reason_code=LOW_ASSURANCE_CONFIDENCE
  else→goto classify_target
Node: Classify_Target
  Purpose: normalize target category from one or more sources
  Inputs: app store metadata, domain/URL classification, service label, assistant intent taxonomy
  Action: set target.category and classification_source; goto posture_guard_optional
Node: Posture_Guard_Optional
  Purpose: optional anti-bypass gating based on device posture indicators
  Condition: posture indicates {rooted/jailbroken, vpn/proxy, trust deviation} AND policy requires high-integrity mode
  Action (illustrative):
  REQUIRE_PARENT with reason_code=INTEGRITY_POSTURE_INSUFFICIENT
  or DENY per jurisdiction branch
  Else: goto category_rules
Node: Category_Rules
  Purpose: apply category-specific thresholds and obligations
  Branch examples (illustrative):
  if target.category==adult_sexual_content→goto adult_content_threshold
  else if target.category==gambling→goto teen_gambling_controls
  else if target.category==self_harm_related→goto self_harm_controls_optional
  else→goto logging_requirements
Node: Adult_Content_Threshold
  Purpose: prevent minors from accessing adult sexual content
  Evaluation:
  if token.age_tier!="18+"→DENY, reason_code=UNDER_AGE_THRESHOLD
  else→goto logging_requirements
Node: Teen Gambling_Controls
  Purpose: impose higher friction for gambling access for teens
  Evaluation:
  if token.age_tier in {"16-17"}→REQUIRE_PARENT, reason_code=REQUIRE_GUARDIAN_APPROVAL, goto guardian_workflow
  else if token.age_tier!="18+"→DENY, reason_code=UNDER_AGE_THRESHOLD
  else→goto logging_requirements
Node: Self_Harm_Controls_Optional
  Purpose: optional neutral safety notice/redirect logic (non-shaming)
  Evaluation (illustrative):
  if profile_type==child_profile AND category==self_harm_related:
  PERMIT_WITH_GUARDRAILS or DENY per policy,
  apply guardrail: present_neutral_safety_notice_or_resource_link
  set reason_code=JURISDICTION_POLICY_DENY or GUARDRAIL_APPLIED
  goto logging_requirements
Node: Child_Curfew
  Purpose: enforce time-window limits for minors
  Condition: profile_type==child_profile AND time_of_day∈restricted_window
  Action: REQUIRE_PARENT or DENY per policy, reason_code=CURFEW_RESTRICTION
  Next: goto guardian_workflow if REQUIRE_PARENT else goto logging_requirements
Node: Guardian_Workflow
  Purpose: REQUIRE_PARENT approvals with verifiable binding (optional PBR)

Action (illustrative):
request guardian approval
optionally verify guardian via PBR (guardian binding token/family binding receipt)
if verified and approved→proceed to logging_requirements
else→DENY,
reason_code=REQUIRE_GUARDIAN_APPROVAL
Node: Logging_Requirements
Purpose: enforce heightened logging/retention and anchoring rules
Action (illustrative):
mark receipt_required=true
mark anchor_required=true for high-risk categories (e.g., adult content)
set retention period per jurisdiction branch
goto session_permit_optional
Node: Session_Permit_Optional
Purpose: optional session permit minting for streaming/multi-turn sessions (audio-first)
Evaluation (illustrative):
if request is streaming or interactive session:
mint session permit with limits (max_duration, max_turns, category_scope, freshness heartbeat)
set session_re_eval_triggers={topic_change, category_change, tool_call_change}
goto return_outcome
Node: Return_Outcome
Output: PERMIT/PERMIT_WITH_GUARDRAILS/REQUIRE_PARENT/DENY
Receipt: record policy_snapshot_ref (policy_pack_id/digest), branch, reason_code/failure_code, applied guardrails, and anchor obligations.
Node: Fail_Closed Defaults
Purpose: guarantee safe default on timeout/unreachable
Condition: policy evaluation timeout OR token validation cannot complete OR ATCR unreachable
Action: DENY or REQUIRE_PARENT (per configuration),
failure_code=POLICY_EVAL_TIMEOUT_FAIL_CLOSED

Appendix E—Reason Codes & Failure Codes Registry (Standardized; Communication/Evidence-Only)

(Communication-only; evidentiary and non-limiting. This appendix aids consistent reporting, audit, and user-facing explanations. It does not alter gate predicates, permit outcomes, or fail-closed semantics, unless explicitly recited in the claims. Implementations may add, omit, rename, merge, or map codes differently; the claims control.)

E.0 Registry Preamble

[E1] Purpose. This registry provides example standardized reason codes and failure codes that may be recorded in Age-Compliance Receipts and used to render guardian/operator/regulator views. Standardization may improve auditability, comparability across vendors, and commercial adoption.

[E2] Non-limiting nature. Codes are illustrative. A deployment may: (i) use a subset; (ii) define additional codes; (iii) map multiple internal errors to a single standardized code; or (iv) encode codes as enums, strings, numeric IDs, or structured objects.

[E3] Receipt field usage (illustrative). In some embodiments, receipts may record:

permit.reason_code—primary policy reason for an outcome (human-facing, non-shaming).

permit.failure_code—structured failure condition (technical; may be rendered with a neutral explanation).

policy.constraints_applied/policy.guardrails_applied—evidence-only applied constraints/guardrails.

enforcement.fail_closed_applied—evidence-only boolean indicator.

[E4] Severity and disclosure. In some embodiments, codes may be associated with:

Severity: INFO/WARN/BLOCK

Disclosure level: CHILD_SAFE/GUARDIAN_ONLY/OPERATOR_ONLY/REGULATOR_ONLY

Such metadata is evidence-only and does not change gate predicates.

E.1 Reason Codes (Illustrative)

(Reason codes explain why an outcome (PERMIT/PERMIT_WITH_GUARDRAILS/REQUIRE_PARENT/DENY) was issued under policy. Reason codes are not required to be exhaustive.)

[E5] UNDER_AGE_THRESHOLD—The subject's age tier does not satisfy a required threshold for the category/target.

Typical outcomes: DENY or REQUIRE_PARENT

Suggested child-safe explanation: "This content isn't available for your age."

[E6] TOKEN_MISSING—No acceptable A-TOKEN was available for evaluation.

Typical outcomes: DENY or REQUIRE_PARENT (fail-closed)

[E7] TOKEN_EXPIRED—A presented A-TOKEN is expired under token freshness rules.

Typical outcomes: DENY or REQUIRE_PARENT (fail-closed)

[E8] TOKEN_REVOKED—A presented A-TOKEN is revoked or flagged invalid.

Typical outcomes: DENY or REQUIRE_PARENT (fail-closed)

[E9] TOKEN_INVALID_SIGNATURE—A presented A-TOKEN fails cryptographic verification.

Typical outcomes: DENY or REQUIRE_PARENT (fail-closed)

[E10] TOKEN_SCOPE_MISMATCH—A presented A-TOKEN is not valid for the requesting scope (e.g., wrong device/profile binding, wrong relying-party scope).

Typical outcomes: DENY or REQUIRE_PARENT

[E11] LOW_ASSURANCE_CONFIDENCE—Confidence/assurance does not meet a policy minimum for the requested category or jurisdiction.

Typical outcomes: REQUIRE_PARENT or DENY

[E12] JURISDICTION_POLICY_DENY—A jurisdiction branch prohibits the requested category/target regardless of age tier, or requires additional obligations not satisfied.

Typical outcomes: DENY or REQUIRE_PARENT

[E13] CATEGORY_RESTRICTED—The requested category is restricted for the profile/device posture or policy profile (e.g., enterprise device, child profile restrictions).

Typical outcomes: DENY or REQUIRE_PARENT

[E14] REQUIRE_GUARDIAN_APPROVAL—Policy requires explicit guardian approval for this episode/session.

Typical outcomes: REQUIRE_PARENT

[E15] CURFEW_RESTRICTION—Time-window/curfew policy restriction applies.

Typical outcomes: REQUIRE_PARENT or DENY

[E16] INTEGRITY_POSTURE_INSUFFICIENT—Device posture indicates elevated bypass risk (e.g., rooted/jailbroken, trust deviations) and policy requires higher integrity.

Typical outcomes: REQUIRE_PARENT or DENY

[E17] CLASSIFICATION_UNCERTAIN_REQUIRE_PARENT (optional)—Target classification confidence is insufficient, and policy requires guardian involvement when uncertain.

Typical outcomes: REQUIRE_PARENT (preferred) or DENY (strict)

[E18] GUARDRAIL_APPLIED (informational)—Outcome permitted but guardrails were applied (e.g., safe-mode, reduced duration, neutral safety notice).

Typical outcomes: PERMIT_WITH_GUARDRAILS

Note: In some embodiments, guardrails are more precisely described via guardrails_applied while this code remains informational.

E.2 Failure Codes (Illustrative)

(Failure codes indicate how evaluation/enforcement encountered a failure condition. Failure codes are typically technical, but may be rendered to guardians in a neutral way. Failure codes do not alter core semantics unless explicitly recited in the claims; fail-closed remains the default behavior.)

[E19] POLICY_EVAL_TIMEOUT_FAIL_CLOSED—Policy evaluation exceeded a configured timeout; system failed closed.

Typical outcomes: DENY or REQUIRE_PARENT

[E20] ATCR_UNREACHABLE FAIL_CLOSED—ATCR service could not be reached; system failed closed.

Typical outcomes: DENY or REQUIRE_PARENT

[E21] TOKEN_SERVICE_UNREACHABLE_FAIL_CLOSED—Token retrieval or revocation status check could not complete under policy; system failed closed.

Typical outcomes: DENY or REQUIRE_PARENT

[E22] POLICY_PACK_INVALID_SIGNATURE_FAIL_CLOSED—Signed policy pack verification failed; system failed closed.

Typical outcomes: DENY or REQUIRE_PARENT

[E23] POLICY_PACK_STALE_FAIL_CLOSED—Policy pack is stale under freshness rules; system failed closed.

Typical outcomes: DENY or REQUIRE_PARENT

[E24] JURISDICTION_UNRESOLVED_FAIL_CLOSED—Jurisdiction could not be resolved under a configured rule; system failed closed.

Typical outcomes: DENY or REQUIRE_PARENT

[E25] RECEIPT_SIGNING_ERROR (evidence-only)—Receipt signing encountered an error; gating still occurred, and a fallback record may be emitted.

Typical outcomes: No change to permit outcome

Recommended handling: mark receipt_integrity_status=degraded (evidence-only)

[E26] ANCHOR_DEFERRED (evidence-only)—Anchoring to a ledger was deferred (e.g., batching), while receipt generation occurred.

Typical outcomes: No change to permit outcome

Recommended handling: record anchor_status=pending and anchor later per policy.

[E27] DEVICE_CLOCK_SKEW (optional)—Device clock deviates beyond tolerance impacting freshness checks; system may fail-closed.

Typical outcomes: REQUIRE_PARENT or DENY depending on configuration

[E28] SESSION_PERMIT_HEARTBEAT_MISSED_FAIL_CLOSED—Session permit heartbeat/freshness validation failed; session terminated or rerouted fail-closed.

Typical outcomes: DENY or REQUIRE_PARENT for continuation

E.3 Standard Message Keys (Optional; Non-Shaming)

(Illustrative message keys may be mapped to localized strings. These are communication-only and do not affect claim scope.)

[E29] Message keys (examples).

MSG_UNDER_AGE→"This isn't available for your age."

MSG_NEED_GUARDIAN→"A parent/guardian needs to approve this."

MSG_TRY_LATER→"We couldn't verify age right now. Please try again or ask a guardian."

MSG_SAFE_MODE→"We're using safer settings for this content."

[E30] Disclosure guidance (examples).

CHILD_SAFE: Avoid revealing specific targets; show category-level summary.

GUARDIAN_ONLY: May include additional context and appeal controls.

OPERATOR/REGULATOR: May include technical details and proof references.

E.4 Extensibility and Versioning

[E31] Registry versioning. In some embodiments, a receipt may record reason_registry_version and failure_registry_version identifiers.

[E32] Vendor extension namespace. Implementations may define vendor-private codes under a namespace (e.g., VENDOR_X.*) while still mapping to standard codes for reporting.

Appendix F—Session Permit Schema (Audio-First; Optional; Illustrative)

(Optional and non-limiting. This appendix describes example session permit structures for streaming or multi-turn interactive sessions, including audio-first assistants/companions. Session permits may be omitted entirely. Where used, session permits are an example mechanism to enforce permit-before-action semantics across multiple turns/segments; the claims control.)

F.0 Session Permit Preamble

[F1] Purpose. Session permits may allow a PERMIT or PERMIT_WITH_GUARDRAILS outcome to be enforced across a multi-turn or streaming session while maintaining fail-closed behavior, mid-session re-evaluation, and revocation.

[F2] Relationship to receipts. In some embodiments, a session permit is referenced by an Age-Compliance Receipt, and session lifecycle events (issue/validate/revoke/terminate) may themselves emit receipts or event records.

[F3] Non-limiting encoding. Session permits may be encoded as JSON/CBOR, JWT-like tokens, capability tokens, or other credential formats, optionally signed and/or bound to device/profile/session identifiers.

F.1 Session Permit Fields (Illustrative)

[F4] Core fields (example).
permit_schema_version
session_permit_id
issued_at, expires_at
bound_to: device/profile/session/episode pseudonyms or hashes
policy_snapshot_ref: policy_pack_id+policy_digest (optional)
category_scope: allowed categories/targets (optional)
permit_outcome_basis: PERMIT or PERMIT_WITH_GUARDRAILS (informational)
limits: duration/turns/segments/tool-calls/playback limits
freshness: heartbeat interval, max staleness
re_eval_triggers: topic/category/tool-call changes
revocation: revocable flag+revocation state+revocation check hints
guardrails: safe-mode, time-window, redaction hints
signature: signer_id, key_id, signature bytes/hash (optional)
[F5] Session permit lifecycle events (example).
ISSUED
VALIDATED
RE_EVALUATED
REVOKED
EXPIRED
TERMINATED_FAIL_CLOSED F.2 Example Session Permit Object (Illustrative)

{
"permit_schema_version": "ATCR-SessionPermit-1.0",
"session_permit_type": "interactive_or_streaming",
"session_permit_id": "sp-2026-01-02-00077",
"issued_at": "2026-01-02T14:32:06Z",
"expires_at": "2026-01-02T15:02:06Z",
"bound_to": {
"device_id_hash": "DEV_81ff9d . . . ",
"profile_id_hash": "P_3af9c1 . . . ",
"session_id_hash": "S_11b3cf . . . ",
"episode_id_hash": "E_7a19d2 . . . ",
"pseudonym_scope": "tenant_scoped"
},
"policy_snapshot_ref": {
"policy_pack_id": "ppk-ATCR-US-Adult-1.0",
"policy_digest": "PGD_9c1ab2 . . . ",
"policy_version": "1.0.3",
"jurisdiction_branch": "US-MO"
},
"category_scope": {
"allowed_categories": ["neutral", "teen_only_game_feature"],
"blocked_categories": ["adult_sexual_content", "gambling"],
"target_hash_allowlist": [ ],
"target_hash_blocklist": [ ]
},
"limits": {"max_duration_seconds": 1800,
"max turns": 60,
"max_segments": 120,
"max_tool_calls": 20,
"max_playback_seconds": 900
},
"freshness": {
"heartbeat_seconds": 120,
"max staleness_seconds": 300,
"revocation_check_interval_seconds": 300
},
"re_eval_triggers": {
"on_topic_or_category_change": true,
"on_tool_call_type_change": true,
"on_target_class_change": true,
"on_time_window_boundary": true
},
"guardrails": {
"safe_mode": "optional",
"shorter_session_enforced": true,
"neutral_safety_notice_enabled": "optional"
},
"revocation": {
"revocable": true,
"revocation_state": "not_revoked",
"revocation_source_hint": "issuer_or_operator_status_endpoint"
},
"evidence_only": {"enforcement_surface": "assistant_tool_gate_or_media_pipeline_gate",
"integration_marker": "assistant_tool_gate",
"issued_by_component": "ATCR_service_150"
},
"signature": {
"signer_id": "ATCR_TENANT_A",
"key_id": "kid-2026-01",
"signature_hash": "SIG_sp_aa12 . . . "
}
}

F.3 Session Permit Event Record (Optional)

(Illustrative. Event records may be emitted for audit/troubleshooting and may be referenced by receipts. These records are evidence-only.)
[F6] Example event record fields.
event_type: ISSUED/VALIDATED/RE EVALUATED/REVOKED/EXPIRED/TERMINATED_FAIL_CLOSED
event_timestamp
session_permit_id
event_reason_code (optional)
linked_receipt_id (optional)

F.4 Safety and Fail-Closed Behavior

[F7] Fail-closed session continuation. In some embodiments, if a session permit cannot be validated, freshness constraints are not satisfied, revocation state is uncertain, or re-evaluation yields REQUIRE_PARENT or DENY, the session is terminated or rerouted in a fail-closed manner and a receipt records the transition.

[F8] Omission allowed. Implementations may omit session permits entirely and still practice the claimed invention where claims do not require session permits.

Appendix G—Signed Policy Pack & Snapshot Reference Format (Optional; Illustrative)

(Optional; evidence-only and non-limiting. This appendix provides an example format for distributing signed policy packs and recording reproducible policy snapshot references in receipts. Policy pack mechanisms are illustrative; the claims control.)

G.0 Policy Pack Overview

[G1] Policy pack purpose. A signed policy pack may define age thresholds, jurisdiction mappings, category taxonomy versions, retention/logging obligations, and guardrail defaults.

G.1 Example Policy Pack Metadata (Illustrative)

```
{
"policy_pack_id": "ppk-ATCR-US-Adult-1.0",
"policy_profile_id": "ATCR-Core-Adult/US-MO",
"policy_version": "1.0.3",
"created_at": "2026-01-01T00:00:00Z",
"valid_from": "2026-01-01T00:00:00Z",
"valid_to": "2026-06-30T23:59:59Z",
"jurisdiction_coverage": ["US-MO", "US-TX", "OTHER"],
"category_taxonomy_id": "tax-ATCR-1",
"graph_format": "graph_or_ruleset_or_table",
"policy_digest": "PGD_9c1ab2 . . . "
"pack_digest": "PPD_77c0e1 . . . ",
"logging_and_retention": {
"retention_policy_id": "ret-ATCR-US-MO-Adult-1",
"anchor_required_for_categories": ["adult_sexual_content", "gambling"]
},
"signature": {
"signer_id": "ATCR_OPERATOR",
"key_id": "kid-2026-01",
"signature_hash": "SIG_ppk_3311 . . . "
}
}
```

G.2 Snapshot Reference (What Receipts Store)

[G2] Snapshot reference fields (illustrative). A receipt may store:

policy_pack_id
policy_version
policy_digest (or pack_digest)
jurisdiction_branch
key_id/signature_hash (optional)
activation_epoch or effective_window (optional)

(These fields are evidence-only identifiers to support reproducible verification; they do not alter gate predicates.)

Appendix H—Proof Objects Format (Signed Head/Inclusion/Consistency) (Optional; Illustrative)

(Optional; evidence-only and non-limiting. This appendix provides example proof object formats for tamper-evident logs/ledgers. Ledger technology is not required unless recited in the claims. Proof objects may be stored inline, stored out-of-band, or referenced by hash.)

H.0 Proof Bundle Overview

[H1] Purpose. Proof bundles may allow third parties (guardian/operator/regulator) to verify that (i) a receipt digest is included in a ledger state and (ii) ledger states evolve append-only under signed heads.

H.1 Signed Head Object (Illustrative)

```
{
"signed_head": {
"ledger_id": "log: ATCR-US",
"namespace": "tenantA/us",
"head_id": "sth: 2026-01-02-001",
"head_timestamp": "2026-01-02T14:35:00Z",
"root_hash": "ROOT_aa91 . . . ",
"key_id": "kid-2026-01",
"signature_hash": "SIG_sth_22aa . . . "
}
}
```

H.2 Inclusion Proof (Illustrative)

```
{
"inclusion_proof": {
"proof_type": "hash_tree_or_other",
"leaf_digest": "RCPD_18f3 . . . ",
"path_hashes": ["H1 . . . ", "H2 . . . ", "H3 . . . "],
"computed_root_hash": "ROOT_aa91 . . . "
}
}
```

H.3 Consistency/Append-Only Proof (Illustrative)

```
{
"consistency_proof": {
"proof_type": "append_only_or_other",
"older_head_id": "sth: 2026-01-01-120",
"newer_head_id": "sth: 2026-01-02-001",
"proof_payload_hash": "H_con_55be . . . "
}
}
```

H.4 Proof Bundle Container (Illustrative)

```
{
"proof_bundle": {
"bundle_id": "pb-2026-01-02-0009",
"linked_receipt_id": "acr-2026-01-02-000123",
"receipt_digest": "RCPD_18f3 . . . ",
"signed_head_ref": "sth: 2026-01-02-001",
"includes": ["signed_head", "inclusion_proof", "consistency_proof"],
"freshness": {
"max_staleness_seconds": 300,
"verified at": "2026-01-02T14:36:00Z"
}
}
}
```

[H2] Evidence-only nature. Proof objects provide verifiability for audit/reporting and do not change the permit outcome for the original episode; the claims control.

Appendix I—Receipt-as-Access Credential Protocol (Two-Sided Enforcement) (Optional; Illustrative)

(Optional; illustrative; non-limiting. This appendix describes example protocols by which a client integration presents an Age-PoPC to a remote service and the remote service verifies the Age-PoPC prior to delivering age-restricted content. The claims control.)

I.1 Protocol Overview (Illustrative)

In one representative embodiment, a client device or integration surface performs permit-before-action evaluation using ATCR and produces an Age-PoPC derived from an Age-Compliance Receipt. The client then presents the Age-PoPC to a remote service as part of an access request. The remote service validates the Age-PoPC (directly or via a verifier service) and fails closed when verification fails.

I.2 Example Message Flow (Non-Limiting)

1. Client identifies a candidate age-relevant request targeting a service and constructs an Age-Compliance Context Envelope.
2. Client invokes ATCR to obtain a permit outcome and an Age-Compliance Receipt (and optionally a session permit).
3. Client derives an Age-PoPC Presentation Token (PoPC Token) from the receipt, optionally binding the token to request scope (service ID, target hash, category, session ID, nonce, validity window).
4. Client sends an access request to the service, including the PoPC Token (e.g., in an HTTP header or handshake field).
5. Service verifies the PoPC Token: signature validity, issuer trust policy, freshness/expiry, and policy snapshot reference; optionally verifies ledger proofs if provided.
6. If verification succeeds, service delivers age-restricted content; otherwise, service denies, requests guardian involvement, or serves an age-appropriate fallback.

I.3 Example HTTP Header Presentation (Illustrative)

The following is one illustrative example; field names and encodings may vary:

Header: Age-PoPC: <base64url(PoPC_Token)>

Header: Age-PoPC-Scope: <service_id>|<category>|<target_hash>|<nonce>|<exp>

Header: Age-PoPC-Policy: <policy_pack_id>|<policy_digest>|<jurisdiction_branch>

I.4 Anti-Replay and Freshness (Illustrative)

In some embodiments, the PoPC Token includes anti-replay material (e.g., nonce, one-time-use flag, monotonic counter, and/or expiry timestamp). In some embodiments, the remote service enforces a maximum age for a PoPC Token and fails closed when freshness cannot be satisfied.

I.5 Privacy-Preserving Variants (Illustrative)

In some embodiments, the PoPC Token reveals only an age tier or threshold satisfaction and uses pseudonymous identifiers or selective disclosure so that the service does not learn underlying identity documents or exact dates of birth. In some embodiments, targets are represented as hashes or category-abstracted labels.

Appendix J—Output Delivery Receipt and Output Segment Schema (Optional; Illustrative)

(Optional; illustrative; non-limiting. This appendix provides one example of output delivery evidence fields that may be recorded as a standalone Output Delivery Receipt (ODR) or as an evidence-only extension of an Age-Compliance Receipt. The claims control.)

J.1 Example ODR Object (Illustrative)

```
{
  “schema_version”: “ATCR-ODR-1.0”,
  “receipt_type”: “output_delivery_receipt”,
  “odr id”: “odr-2026-01-02-00077”,
  “linked_age_receipt_id”: “acr-2026-01-02-000123”,
  “output_channel”: “audio_or_text_or_multimodal”,
  “output_model_id”: “tts_engine_or_llm_build_id”,
  “segment”: {
    “segment_index”: 3,
    “segment_digest_alg”: “sha256_or_other”,
    “segment_digest”: “ODRD_aa91 . . . ”
  },
  “permit_basis”: }
    “permit_outcome”: “PERMIT_or_PERMIT-_WITH_ GUARDRAILS_or_DENY”,
    “session_permit_ref”: “sp-2026-01-02-00077_or null”
  },
  “delivery_gate”: {
    “output_commit_boundary_enforced”: true,
    “output_delivery_gated”: true,
    “guardrails_applied”: [“safe_mode_paraphrase”, “redact_entities”]
  },
  “timestamps”: {
    “segment_generated_at”: “2026-01-02T14:32:06Z”,
    “segment_delivered_at”: “2026-01-02T14:32:07Z”
  },
  “signature”: {
    “signer_id”: “ATCR_TENANT_A”,
    “key_id”: “kid-2026-01”,
    “signature_hash”: “SIG_odr_11aa . . . ”
  },
  “evidence_only”: true
}
```

J.2 Notes (Illustrative)

In some embodiments, segment digests are computed over redacted or normalized outputs to reduce sensitive disclosure. In some embodiments, the ODR is anchored to an append-only evidence store similar to other receipts; anchoring is evidence-only unless recited in the claims.

Appendix K—Conformance Predicates for Assistant Tool and Output Delivery Gates (Optional; Illustrative)

(Optional; illustrative; non-limiting. This appendix provides example conformance predicates and negative tests for assistant tool gates and output delivery gates. Predicates and tests are illustrative and do not limit the claims.)

K.1 Example Predicate Identifiers (Illustrative)

PRED_NO_BYPASS_INTENT_TO_ACCESS—No transition from intent requested to access delivered without a permit outcome satisfying a permit condition.

PRED_FAIL_CLOSED_TOKEN_INVALID—Token missing/expired/revoked/invalid signature causes DENY or REQUIRE_PARENT per profile.

PRED_FAIL_CLOSED_TIMEOUT—Policy evaluation timeout causes fail-closed behavior.

PRED_OUTPUT_GATED—Output delivery is gated at an output-commit boundary for restricted categories.

PRED_TOOL_CALL_GATED—Tool calls and capability invocations are gated prior to execution.

PRED_SESSION_PERMIT_FRESHNESS—Session continuation fails closed when session permit freshness checks fail.

PRED_ATTESTED_ENFORCEMENT_PRESENT—Where required by profile, an attested enforcement indicator is present and verifiable.

K.2 Example Negative Tests (Illustrative)

Attempt to initiate restricted media playback via alternate API without invoking ATCR; expect block+receipt.

Attempt to deliver TTS output for restricted category after disabling tool gate; expect output gate to block at commit boundary.

Attempt to reuse a PoPC Token outside its validity window or scope; expect service-side verification to fail-closed.

Attempt to bypass by toggling network proxy/VPN or DNS trust deviation when profile requires high-integrity mode; expect REQUIRE_PARENT or DENY per policy.

K.3 Certification Artifacts (Optional; Evidence-Only)

In some embodiments, a certificate bundle includes a conformance badge, a digest of executed tests, and identifiers of tested surfaces and predicates. Such artifacts may be anchored as evidence-only under a freshness policy.

Appendix L—Threat Model and Bypass Taxonomy (Optional; Illustrative)

(Optional; illustrative; non-limiting. This appendix describes example threat models, bypass classes, and negative-test families relevant to permit-before-action, fail-closed age gating in voice-first and screenless systems. The claims control.)

L.1 Threat Model Objectives (Illustrative)

In some embodiments, ATCR implementations are evaluated against bypass-resistance objectives that include, without limitation:

Non-bypassable and always-invoked enforcement: restricted paths cannot complete without invoking ATCR and satisfying a permit condition.

Fail-closed safety defaults: token invalidity, policy-evaluation timeout, stale policy state, or uncertainty conditions default to REQUIRE_PARENT or DENY under a configured profile. Auditability: an Age-Compliance Receipt records sufficient context and policy snapshot references to support later third-party verification under a freshness policy.

Output safety in voice-first systems: outputs (including streaming segments) are treated as deliverable actions and are gated prior to output commitment.

L.2 Example Bypass Classes (Illustrative; Non-Limiting)

Example bypass classes include, without limitation:

Alternate integration paths: using an un-gated API surface (e.g., alternate network stack, alternate playback API, or side-loaded client) to reach a restricted target without invoking ATCR. Tool-chain injection: invoking tools, plugins, action plans, or retrieval via a path that skips an assistant tool gate.

Output-only bypass: delivering disallowed content via a TTS/audio sink or transcript renderer without passing a permit check at an output-commit boundary.

State desynchronization: attempting to use stale A-TOKENS, stale policy packs, or stale session permits outside a freshness window.

Replay and scope abuse: reusing approvals or Age-PoPC artifacts outside their bound scope (service, category, target hash, nonce, or validity window).

Posture degradation: attempting restricted access from a rooted/jailbroken device or under VPN/proxy/trust-deviation conditions when a profile requires higher integrity.

L.3 Mapping to Conformance Predicates (Illustrative)

In some embodiments, bypass-resistance is validated by conformance predicates (see Appendix K), including without limitation:

PRED_NO_BYPASS_INTENT_TO_ACCESS
PRED_FAIL_CLOSED_TOKEN_INVALID
PRED_FAIL_CLOSED_TIMEOUT
PRED_TOOL_CALL_GATED
PRED_OUTPUT_GATED
PRED_SESSION_PERMIT_FRESHNESS
PRED_ATTESTED_ENFORCEMENT_PRESENT (where required by profile)

L.4 Example Negative-Test Families (Illustrative)

Example negative-test families include:

Attempt to initiate restricted network access or media playback via an alternate API without invoking ATCR; expect block and receipt emission.

Attempt to execute a restricted tool call or retrieval operation via an agent workflow that bypasses the assistant tool gate; expect fail-closed suppression and receipt emission.

Attempt to deliver restricted TTS output by writing directly to an audio sink; expect the output delivery gate to block at an output-commit boundary.

Attempt to continue a session after session-permit expiry or heartbeat miss; expect fail-closed termination and a receipt indicating revocation/expiry.

Attempt to replay a guardian approval or PoPC token outside scope or outside freshness; expect verification failure and deny/escalation.

Appendix M—Policy Transparency Log, Non-Equivocation Witnesses, and Conflict Proofs (Optional; Illustrative)

(Optional; illustrative; non-limiting. This appendix provides example objects and flows for transparent policy commitment, witness co-signatures, and conflict proofs. Field names, encodings, and cryptographic schemes are illustrative. These mechanisms are evidence-only unless expressly recited in the claims; the claims control.)

M.0 Overview (Illustrative)

In some embodiments, policy packs and/or policy snapshots are committed to a Policy Transparency Log. The log publishes signed heads (and optionally witness co-signed heads) supporting inclusion and append-only evolution proofs. These artifacts enable third parties to verify that a receipt's policy snapshot reference corresponds to a committed policy state.

M.1 Example Policy Pack Commitment Object (Illustrative)

{
“object_type”: “policy_pack_commitment”,
“policy_pack_id”: “ppk-ATCR-US-Adult-1.0”,
“policy_version”: “1.0.3”,
“effective_window”: {“valid_from”: “2026-01-01T00:00:00Z”, “valid to”: “2026-06-30T23:59:59Z”},
“policy_digest”: “PGD_9c1ab2 . . . ”,
“pack_digest”: “PPD_77c0e1 . . . ”,
“jurisdiction_coverage”: [“US-MO”, “US-TX”, “OTHER”],
“category_taxonomy_id”: “tax-ATCR-1”,
“operator_signature ¢: {“signer_id”: “ATCR_OPERATOR”, “key_id”: “kid-2026-01”,
“signature_hash”: “SIG_ppk_3311 . . . ”}
}

M.2 Example Signed Policy-Log Head (Illustrative)

{
“object_type”: “policy_log_signed_head”,
“policy_log_id”: “log: ATCR-POLICY”,
“namespace”: “global”,
“head_id”: “plh: 2026 Jan. 2-001”,
“head_timestamp”: “2026-01-02T00:00:00Z”,
“root_hash”: “ROOT_pol_aa91 . . . ”,
“key_id”: “kid-pol-2026-01”,
“signature_hash”: “SIG_plh_22aa . . . ”
}

M.3 Witness Co-Signature and Witness Co-Signed Head (Illustrative)

{
“object_type”: “witness_cosignature”,
“policy_log_id”: “log: ATCR-POLICY”,
“head_id”: “plh: 2026-01-02-001”,
“witness_id”: “WITNESS_A”,
“witness_key_id”: “kid-wit-a-2026-01”,
“witness_signature_hash”: “SIG_wit_a_99bb . . . ”
}
{
“object_type”: “witness_cosigned_head”,
“policy_log_id”: “log: ATCR-POLICY”,
“head_id”: “plh: 2026-01-02-001”,
“witness_set”: [“WITNESS_A”, “WITNESS_B”],
“cosignature_refs”: [“SIG_wit_a_99bb . . . ”, “SIG_wit_b_88cc . . . ”]
}

M.4 Inclusion Proof and Append-Only Evolution Proof (Illustrative)

{
“object_type”: “policy_log_inclusion_proof”,
“head_id”: “plh: 2026-01-02-001”,
“leaf_digest”: “PPD_77c0e1 . . . ”,
“proof_type”: “hash_tree_or_other”,
“path_hashes”: [“H1 . . . ”, “H2 . . . ”, “H3 . . . ”],
“computed_root_hash”: “ROOT_pol_aa91 . . . ”
}
{
“object_type”: “policy_log_consistency_proof”,
“older_head_id”: “plh: 2026-01-01-120”,
“newer_head_id”: “plh: 2026-01-02-001”,
“proof_type”: “append_only_or_other”,
“proof_payload_hash”: “H_con_pol_55be . . . ”
}

M.5 Conflict Proof (Equivocation Detection) (Illustrative)

A conflict proof may evidence that two policy states were asserted under a shared policy identifier/version/effective window but commit to different digests.

{
“object_type”: “policy_conflict_proof”,
“policy_pack_id”: “ppk-ATCR-US-Adult-1.0”,
“policy_version”: “1.0.3”,
“asserted_effective_window”: {“valid_from”: “2026-01-01T00:00:00Z”, “valid_to”: “2026-06-30T23:59:59Z”},
“conflicting_policy_digests”: [“PGD_9c1ab2 . . . ”, “PGD_deadbe . . . ”],
“head_refs”: [“plh: 2026 Jan. 2-001”, “plh: 2026 Jan. 2-002”],
“inclusion proofs”: [
{“head_id”: “plh: 2026 Jan. 2-001”, “leaf_digest”: “PPD_77c0e1 . . . ”, “proof_ref”: “ip:plh: . . . : 001”},
{“head_id”: “plh: 2026 Jan. 2-002”, “leaf_digest”: “PPD_9911aa . . . ”, “proof_ref”: “ip:plh: . . . : 002”}],
“witness_cosigned_head_refs”: [“wch:plh: 2026-01-02-001”, “wch:plh:2026-01-02-002”],
“notes”: “Illustrative conflict proof; encodings and divergence evidence may vary.”
}

M.6 Receipt References (Illustrative; Evidence-Only)

In some embodiments, an Age-Compliance Receipt records:

policy_reference.policy_pack_id, policy_reference.policy_digest policy_transparency.policy_log_id, policy_transparency.head_id policy_transparency.witness_cosigned_head_ref (optional)

policy_transparency.inclusion_proof_ref (optional)

These are evidence-only unless expressly recited in the claims; the claims control.

Appendix N—Delegation, Quorum Approvals, and Consent Receipts (Optional; Illustrative)

(Optional; illustrative; non-limiting. This appendix provides examples of delegation credentials, quorum rules, and consent receipts for REQUIRE_PARENT workflows. These artifacts are evidence-only unless expressly recited in the claims; the claims control.)

N.0 Overview (Illustrative)

In some embodiments, approvals are provided not only by a parent/guardian but also by delegated guardian-of-record entities (e.g., a school program or authorized staff) under constrained scopes. Policies may require a quorum (m-of-n) of approvals.

N.1 Delegation Credential (Illustrative)

{
“object_type”: “delegation_credential”,
“delegation_id”: “del-2026-01-02-0009”,
“delegator”: {“entity_type”: “guardian_or_institution”, “id_hash”: “G_aa12 . . . ”},
“delegatee”: {“entity_type”: “staff_or_program”, “id_hash”: “D_bb34 . . . ”},
“scope”: {
“profile_id_hash”: “P_3af9c1 . . . ”,
“jurisdictions”: [“US-MO”],
“permitted_action_types”: [“playback_start”, “join_space”, “retrieval_tool_execution”],
“permitted_categories”: [“teen_only_game_feature”, “neutral”],
“blocked_categories”: [“adult_sexual_content”, “gambling”]
},
“validity”: {“issued_at”: “2026-01-02T00:00:00Z”, “expires_at”: “2026-06-30T23:59:59Z”},
“revocation”: {“revocable”: true, “revocation_state”: “not_revoked”, “revocation_ref”: null},
“anti_replay”: {“nonce”: “N_77aa . . . ”, “one_time_use”: false},
“signature”: {“signer_id”: “DELEGATOR”, “key_id”: “kid-del-2026-01”, “signature_hash”: “SIG_del_55cc . . . ”},
“evidence_only”: true
}

N.2 Quorum Approval Rule (Illustrative)

{
“object_type”: “quorum_rule”,
“rule_id”: “qr-ATCR-RequireParent-1.0”,
“m_of_n”: {“m”: 2, “n”: 3},
“eligible_approver_roles”: [“guardian”, “delegated_guardian_of_record”, “institution_approval_service”],
“validity_window_seconds”: 900,
“notes”: “Illustrative; policies may vary by jurisdiction and category.”
}

N.3 Consent Receipt (Illustrative; Evidence-Only)

{
“object_type”: “consent_receipt”,
“consent_receipt_id”: “cr-2026-01-02-0042”,
“profile_id_hash”: “P_3af9c1 . . . ”,
“approver_id_hash”: “G_aa12 . . . ”,
“approver_role”: “guardian_or_delegated_guardian_of_record”,
“approval_outcome”: “approve_or_deny”,
“approval_scope”: {
“episode_id_hash”: “E_7a19d2 . . . ”,
“session_id_hash”: “S_11b3cf . . . ”,
“action_type”: “join_space”,
“target_category”: “teen_only_game_feature”,
“policy_snapshot_ref”: {“policy_pack_id”: “ppk-ATCR-US-Teen-1.0”, “policy_digest”: “PGD 1122 . . . ”}
},
“anti_replay”: {“nonce”: “N_88dd . . . ”, “expires_at”: “2026-01-02T14:47:06Z”},
“reason_code”: “REQUIRE_GUARDIAN_APPROVAL”,
“signature”: {“signer_id”: “APPROVER”, “key_id”: “kid-cr-2026-01”, “signature_hash”: “SIG_cr_aa11 . . . ”},
“evidence_only”: true
}

N.4 Quorum Aggregation (Illustrative)

{
“object_type”: “quorum_approval_bundle”,
“bundle_id”: “qab-2026-01-02-0003”,
“rule_ref”: “qr-ATCR-RequireParent-1.0”,
“consent_receipt_refs”: [“cr-2026-01-02-0042”, “cr-2026-01-02-0043”],
“computed_quorum_satisfied”: true,
“quorum_satisfied_at”: “2026-01-02T14:32:06Z”,
“evidence_only”: true
}

N.5 Revocation Artifact (Illustrative)

{
“object_type”: “revocation_artifact”,
“revocation_id”: “rev-2026-02-01-0011”,
“revoked_object_ref”: “del-2026-01-02-0009”,
“revocation_reason”: “program_end_or_scope_change_or_security_incident”,
“revoked_at”: “2026-02-01T00:00:00Z”,
“signature”: {“signer_id”: “DELEGATOR”, “key_id”: “kid-rev-2026-02”, “signature_hash”: “SIG_rev_33aa . . . ”},
“evidence_only”: true
}

Appendix O—Action Receipts and Action-Scoped PoPC (Optional; Illustrative)

(Optional; illustrative; non-limiting. This appendix provides example action receipts and action-scoped proof-of-policy-compliance tokens for agentic side effects. These artifacts are evidence-only unless expressly recited in the claims; the claims control.)

O.0 Overview (Illustrative)

In some embodiments, ATCR treats certain agentic actions as side-effect actions requiring permit-before-action gating and generates action-scoped receipts that bind a permit outcome to an action scope and freshness window.

O.1 Action Scope Object (Illustrative)

{
“object_type”: “action_scope”,
“action_type”: “purchase_payment_or_message_send_ or_join_space_or_playback_start”,
“service_id”: “svc_example”,
“target_category”:
“adult_sexual_content_or_gambling_or_explicit_chat_or_self_harm_related”,
“target_id_hash”: “TGT aa91 . . . ”
“episode_id_hash”: “E_7a19d2 . . . ”, "session_id_hash": "S_11b3cf . . . "
"freshness": {"expires_at": "2026-01-02T14:33:06Z", "nonce": "N_12ff . . . "}
}

O.2 Action Receipt (Illustrative; Evidence-Only)

{
"object_type": "action_receipt",
"action_receipt_id": "ar-2026-01-02-0099",
"profile_id_hash": "P_3af9c1 . . . ",
"jurisdiction": "US-MO",
"action_scope": {"ref": "action_scope", "digest": "ASD_55aa . . . "},
"policy_snapshot_ref": {"policy_pack_id": "ppk-ATCR-US-Adult-1.0", "policy_digest": "PGD_9c1ab2 . . . "},
"permit_outcome":
"PERMIT or_PERMIT_WITH_GUARDRAILS_or_REQUIRE_PARENT_or_DENY", "reason code":
"UNDER_AGE_THRESHOLD_or_REQUIRE_GUARDIAN_APPROVAL_or_OTHER",
"fail_closed_applied": true,
"anti_replay": {"nonce": "N_12ff . . . ", "expires_at": "2026-01-02T14:33:06Z"},
"signature": {"signer_id": "ATCR_TENANT_A", "key_id": "kid-2026-01", "signature_hash": "SIG_ar_77bb . . . "},
"evidence_only": true
}

O.3 Action-Scoped PoPC Token (Illustrative)

{
"object_type": "action_popc_token",
"token_id": "apopc-2026-01-02-0007",
"derived_from_action_receipt_id": "ar-2026-01-02-0099",
"bound_scope": {
"service_id": "svc_example",
"target_id_hash": "TGT_aa91 . . . ",
"action_type": "purchase_payment",
"nonce": "N_12ff . . . ",
"expires_at": "2026-01-02T14:33:06Z"
},
"policy_snapshot_ref": {"policy_pack_id": "ppk-ATCR-US-Adult-1.0", "policy_digest": "PGD_9c1ab2 . . . "},
"signature": {"signer_id": "ATCR_TENANT_A", "key_id": "kid-2026-01", "signature_hash": "SIG_apopc_11cc . . . "},
"privacy": {"pseudonymous_profile": true, "category_abstracted": true},
"evidence_only": true
}

O.4 Example Flow: Remote Service Verification (Illustrative)

1. Client constructs an action scope for a side-effect action (purchase, join, message, share).
2. Client invokes ATCR and receives a permit outcome and an action receipt.
3. Client derives an action-scoped PoPC token bound to service/target/action/nonce/expiry.
4. Client presents the token to the remote service (header/handshake/body).
5. Service verifies signature, freshness, issuer trust policy, and policy snapshot ref.
6. If verification fails→service fails closed (deny/require guardian/fallback).
7. Optionally, service logs evidence-only verification outcomes for audit.

Appendix P—Attested Enforcement Indicators and Gate Integrity Proofs (Optional; Illustrative)

(Optional; illustrative; non-limiting. This appendix provides example attested enforcement indicators and verification artifacts for privileged enforcement surfaces. These are evidence-only unless expressly recited in the claims; the claims control.)

P.0 Overview (Illustrative)

In some embodiments, an enforcement surface produces an attested enforcement indicator (AEI) evidencing that permit-before-action, fail-closed gating is enabled and bound to a gate configuration digest and/or a policy snapshot reference.

P.1 Example AEI Object (Illustrative)

{
"object_type": "attested_enforcement_indicator",
"aei_id": "aei-2026-01-02-0005",
"enforcement surface":
"os_network_stack_or_browser_nav_gate_or_assistant_tool_gate_or_output_delivery_gate",
"privileged_boundary": "kernel_mode_or_hypervisor_or_tee_or_secure_element",
"build id": "build-ATCR-surface-1.2.0",
"gate_config_digest": "GCD_aa91 . . . ",
"policy_binding": {"policy_pack_id": "ppk-ATCR-US-Adult-1.0", "policy_digest": "PGD 9c1ab2 . . . "},
"timestamp": "2026-01-02T14:32:06Z",
"validity_window": {"not_before": "2026-01-02T14:32:06Z", "not after": "2026-01-02T14:42:06Z"},
"measurement": {"measurement_type": "tee_or_firmware_measurement", "measurement hash": "MEAS_55bb . . . "},
"attestation_statement": {"format": "vendor_attestation_or_other", "statement hash": "ATS_11aa . . . "},
"signature": {"signer_id": "SURFACE_ATTESTOR", "key_id": "kid-att-2026-01",
"signature_hash": "SIG_aei_22cc . . . "},
"evidence_only": true
}

P.2 Verification Artifact (Illustrative; Evidence-Only)

}
"object_type": "attestation_verification_artifact",
"artifact id": "ava-2026-01-02-0002",
"aei ref": "aei-2026-01-02-0005",
"verification_result": "valid_or_invalid_or_stale",
"checked at": "2026-01-02T14:33:00Z",
"freshness": {"max_staleness_seconds": 300, "stale": false},
"notes": "Illustrative verification artifact.",
"evidence_only": true

}

P.3 Gate Integrity Proof Bundle (Illustrative)

{
“object_type”: “gate_integrity_proof_bundle”,
“bundle_id”: “gip-2026-01-02-0001”,
“episode_id_hash”: “E_7a19d2 . . . ”,
“surface_refs”: [“assistant_tool_gate”, “output_delivery_gate”],
“aei_refs”: [“aei-2026-01-02-0005”, “aei-2026-01-02-0006”],
“verification_artifact_refs”: [“ava-2026-01-02-0002”, “ava-2026-01-02-0003”],
“policy_binding”: {“policy_pack_id”: “ppk-ATCR-US-Adult-1.0”, “policy_digest”: “PGD_9c1ab2 . . . ”},
“evidence_only”: true
}

P.4 Optional Fail-Closed Policies Tied to Verification (Illustrative)

In some embodiments, profiles specify that for selected high-risk categories, a stale or invalid AEI verification result triggers REQUIRE_PARENT or DENY, while for lower-risk categories the AEI is collected as evidence-only without altering permit outcomes; the claims control.

Appendix Q—Cryptographic Agility and Post-Quantum Readiness (Optional; Illustrative)

(Optional; illustrative; non-limiting. This appendix provides example embodiments for algorithm-agile verification of A-TOKENS, receipts, policy-pack signatures, signed heads, and proof bundles, including illustrative post-quantum readiness. Cryptographic suites, migration rules, and failure codes are illustrative. These mechanisms are evidence-only unless expressly recited in the claims; the claims control.)

Q.0 Purpose (Illustrative)

In some embodiments, long-horizon compliance evidence remains verifiable across cryptographic migrations by recording cryptosuite identifiers and algorithm-deprecation policies, while preserving permit-before-action and fail-closed semantics; the claims control.

Q.1 Cryptosuite Identifiers (Illustrative)

In some embodiments, an A-TOKEN, an Age-Compliance Receipt, a policy-pack signature, a signed head, and/or a proof bundle records a cryptosuite identifier describing at least: (i) a signature algorithm, (ii) a hash function, (iii) canonicalization rules for the signed bytes, and (iv) an encoding profile, enabling verifiers to apply policy-based acceptance and migration rules; the claims control.

Q.2 Algorithm Agility and Deprecation (Illustrative)

In some embodiments, an issuer trust policy specifies accepted cryptosuites and a deprecation schedule (including effective windows and grace periods). When a cryptosuite is deprecated, unsupported, or outside an effective window, the system (i) fails closed for designated categories or profiles, or (ii) triggers REQUIRE_PARENT under a configured profile, and records a structured failure code (e.g., CRYPTO_UNSUPPORTED_FAIL_CLOSED) as evidence; the claims control.

Q.3 Hybrid and Post-Quantum Variants (Illustrative)

In some embodiments, a token or receipt is protected by a hybrid signature comprising a classical component and a post-quantum component. Verification may require satisfaction of at least one configured rule (e.g., both valid; post-quantum component valid; or classical valid within an effective window) depending on profile and time; the claims control.

Q.4 Key Rotation and Re-Signing or Wrapping (Illustrative; Evidence-Only)

In some embodiments, a migration protocol re-signs or wraps an existing receipt digest under a later key while preserving a commitment to the original receipt digest (and, in some embodiments, the original receipt payload unchanged). Migration artifacts (e.g., wrapper objects, re-signature records, or re-anchoring pointers) are evidence-only unless expressly recited in the claims; the claims control.

Appendix R—Multi-Actor and Co-Presence Context for Shared Devices (Optional; Illustrative)

(Optional; illustrative; non-limiting. This appendix provides example embodiments for incorporating multi-actor identification and guardian co-presence signals into context envelopes, permit evaluation, and session re-evaluation for shared or ambient devices (e.g., smart speakers, TVs, vehicles, AR glasses). Signals and derivations are illustrative. These mechanisms are evidence-only unless expressly recited in the claims; the claims control.)

R.0 Purpose (Illustrative)

In some embodiments, shared devices have multiple concurrent or alternating users and benefit from context envelopes that encode actor descriptors and guardian co-presence signals, enabling permit outcomes and mid-session re-evaluation without requiring exposure of raw biometric material to the rail; the claims control.

R.1 Actor Descriptor (Illustrative)

In some embodiments, the age-compliance context envelope includes an actor descriptor comprising an actor pseudonym, an actor role (e.g., child/teen/adult/unknown), and an actor confidence indicator. Actor descriptors may be derived from one or more signals such as supervised account selection, device proximity, wearable pairing, voice matching, face/biometric matching, and/or other signals, without requiring storage or transmission of raw biometric material to the rail; the claims control.

R.2 Co-Presence and Guardian-Present Signals (Illustrative)

In some embodiments, the context envelope includes a co-presence indicator evidencing that a verified guardian is present during an episode (e.g., via a guardian device proximity token, wearable credential, or verified presence attestation), enabling satisfaction of REQUIRE_PARENT under a configured profile without transmitting raw biometric material to the rail; the claims control.

R.3 Actor-Switch Triggers and Mid-Session Re-Evaluation (Illustrative)

In some embodiments, a session permit specifies that a change in actor descriptor (or a drop below a confidence threshold) is a re-evaluation trigger. Upon an actor change or confidence drop, the system re-evaluates the age-policy graph and may revoke the session permit and fail closed before further output delivery or action execution; the claims control.

R.4 Privacy (Illustrative)

In some embodiments, actor identifiers are pseudonymous, rotatable, and scoped (e.g., per-tenant or per-household) to reduce linkability across relying parties, while preserving authorized guardian-view auditability under a configured authorization policy; the claims control.

Appendix S—Model Capability Manifests, Capability Certificates, and Toolchain Attestation (Optional; Illustrative)

(Optional; illustrative; non-limiting. This appendix provides example embodiments for representing assistant/model/tool capabilities as signed manifests or capability certificates that can be used as policy inputs and recorded in receipts, including optional toolchain attestation and conformance checks. These mechanisms are evidence-only unless expressly recited in the claims; the claims control.)

S.0 Purpose (Illustrative)

In some embodiments, assistants, agents, and multimodal models evolve by enabling new modalities and toolchains, and compliance benefits from recording which capabilities were enabled at an episode and binding policy evaluation to those capabilities; the claims control.

S.1 Capability Manifest (Illustrative)

In some embodiments, an assistant stack provides a capability manifest describing enabled modalities (text/image/audio/video), enabled tool classes (retrieval, messaging, purchase, community-join, device control), memory/personalization modes, and external connector scopes. The manifest may be signed or attested and represented by a digest in the age-compliance context envelope; the claims control.

S.2 Policy Binding to Capabilities (Illustrative)

In some embodiments, the age-policy graph includes capability rules such that particular tool classes or modalities require higher assurance, REQUIRE_PARENT, shorter session permits, additional guardrails, or denial for selected minor tiers. By way of example, a profile may deny image generation for a child tier while permitting text tutoring with guardrails; the claims control.

S.3 Receipt Evidence (Illustrative; Evidence-Only)

In some embodiments, an Age-Compliance Receipt records a capability-manifest digest and, optionally, an evidence-only enforcement indicator for a toolchain or capability gate, enabling later verification of which model/tool capabilities were enabled during an episode; the claims control.

S.4 Conformance Testing (Illustrative)

In some embodiments, conformance predicates include verifying that when a capability is disabled by policy, the assistant cannot invoke the corresponding tool class via an alternate path, and that output delivery gating prevents delivery of restricted outputs despite prompt-based attempts to bypass tool gating; the claims control.

Appendix T—Immersive and Ambient Output Channels and Effector Gating (Optional; Illustrative)

(Optional; illustrative; non-limiting. This appendix provides example embodiments extending output delivery gating and requested-action gating to immersive outputs and physical effectors (e.g., AR/VR objects, spatial audio, haptics, robotics, toys, vehicles). These mechanisms are evidence-only unless expressly recited in the claims; the claims control.)

T.0 Purpose (Illustrative)

In some embodiments, child interactions occur in immersive and ambient environments, and output delivery gating and permit-before-action semantics extend to immersive objects and physical effectors with explicit output-commit boundaries; the claims control.

T.1 Expanded Output Channels (Illustrative)

In some embodiments, output channels include not only text and audio, but also rendered AR objects, VR scene elements, avatar gestures, haptic patterns, and multi-sensory cues. An output-commit boundary may be defined per frame, per object, per scene update, per segment, and/or per actuator command; the claims control.

T.2 Effector Actions (Illustrative)

In some embodiments, requested actions include actuator or device-control commands (e.g., controlling connected toys, home devices, robots, vehicles, or printers). Such actions are gated permit-before-action using the same permit outcomes, with action scopes bound to effector type, command class, nonces, and freshness windows to reduce replay; the claims control.

T.3 Safe Transformations (Illustrative; Evidence-Only)

In some embodiments, PERMIT_WITH_GUARDRAILS includes transforming an output to an age-appropriate representation (e.g., masking explicit visual regions, substituting neutral language, suppressing disallowed avatar gestures) while emitting evidence-only guardrail identifiers in receipts and/or output delivery receipts; the claims control.

T.4 Safety Sandbox Mode (Illustrative)

In some embodiments, a child profile is restricted to a sandboxed set of safe effectors and safe connectors, where attempts to access non-sandboxed effectors fail closed and are recorded as incidents for guardian review under authorization; the claims control.

Appendix U—Privacy-Preserving Compliance Proofs and Aggregated Audit (Optional; Illustrative)

(Optional; illustrative; non-limiting. This appendix provides example embodiments for proving age-policy conformance while minimizing disclosure of sensitive targets or child data, including aggregated reporting and privacy-preserving proof objects. Proof techniques are illustrative. These mechanisms are evidence-only unless expressly recited in the claims; the claims control.)

U.0 Purpose (Illustrative)

In some embodiments, compliance evidence is verifiable while minimizing disclosure of sensitive targets, identities, and child data, including embodiments that support aggregated reporting and role-based redaction profiles; the claims control.

U.1 Minimal-Disclosure Receipts and Proofs (Illustrative)

In some embodiments, a receipt stores targets as hashes and/or category-abstracted labels, and a verifier can confirm permit outcomes and policy snapshot references without learning a raw URL, title, conversation content, or other sensitive identifiers. De-identified receipt views may preserve inclusion and consistency proof verifiability under a freshness policy; the claims control.

U.2 Privacy-Preserving Compliance Proof Objects (Lite; Illustrative; Non-Limiting)

In some embodiments, an Age-Compliance Proof-of-Policy-Compliance (Age-PoPC) includes (or is accompanied by) a proof object or attestation evidence that demonstrates, under a policy snapshot reference comprising at least a policy pack identifier and a policy digest, that a permit outcome was computed and enforced for an episode and that a subject satisfies a configured threshold (e.g., an age tier bucket or age-above-threshold predicate), while revealing only a configured disclosure set. By way of example, the proof object may be implemented using selective disclosure, commitments, threshold proofs, signature-based attestations, and/or (in some embodiments) zero-knowledge proofs, without requiring any particular proof system; the claims control.

In some embodiments, the Age-PoPC is associated with an Age-Compliance Receipt (or a digest of the Age-Compliance Receipt) that is stored or anchored in an Age-Compliance Ledger under a freshness policy, and verification includes retrieving an inclusion proof and a consistency proof under a signed head within a freshness policy window; the claims control.

In some embodiments, the configured disclosure set includes only a jurisdiction branch identifier, a permit outcome, and an age tier bucket, optionally alongside the policy snapshot reference and the signed head, while withholding raw identifiers such as URL, content, transcript, or exact age; the claims control.

U.3 Aggregated Reporting (Illustrative; Evidence-Only)

In some embodiments, an operator produces periodic aggregates derived from receipts (e.g., counts of DENY/REQUIRE_PARENT by category and jurisdiction) under de-identification and/or differential-privacy noise rules, while retaining the ability to produce verifiable sample receipts and proof bundles under authorization for audit or regulator review; the claims control.

U.4 Query-Limited Guardian Views (Illustrative)

In some embodiments, guardian consoles enforce query limits and redaction profiles (e.g., time-window filters, category filters, or minimum-aggregation thresholds) to reduce over-collection and to present non-shaming explanations suitable for minors, while preserving verifiability of outcomes under authorization; the claims control.

Appendix V—Protocol and Platform Evolution (Encrypted DNS, QUIC/ECH, P2P, and On-Device AI) (Optional; Illustrative)

(Optional; illustrative; non-limiting. This appendix provides example embodiments ensuring permit-before-action and fail-closed behavior remains enforceable despite protocol and platform evolution, including encrypted metadata, decentralized identifiers, and on-device/offline assistants. These mechanisms are evidence-only unless expressly recited in the claims; the claims control.)

V.0 Purpose (Illustrative)

In some embodiments, protocol evolution reduces visible metadata (e.g., encrypted name resolution and encrypted handshakes) and increases decentralization (e.g., P2P and federated services), and compliance remains enforceable by gating at invariant boundaries (e.g., connect, capability invoke, output commit) and recording structured uncertainty evidence; the claims control.

V.1 Encrypted DNS and Resolver Paths (Illustrative)

In some embodiments, the integration surface enforces gating at or before name-resolution boundaries for DoH/DoT/DoQ and records, as evidence, which resolver path was used. When a target cannot be classified with configured confidence due to encryption, obfuscation, or insufficient metadata, the system fails closed (REQUIRE_PARENT or DENY per profile) and records a structured uncertainty reason code as evidence; the claims control.

V.2 QUIC/HTTP3 And Encrypted Handshakes (Illustrative)

In some embodiments, gating intercepts connection establishment at a socket/connect boundary for TCP, QUIC, and/or other transports and binds a permit outcome to a transport/session identifier under a freshness window. In some embodiments, a policy profile requires service-side verification via Age-PoPC when client-side visibility is reduced by encrypted handshake metadata (including ECH), and failures trigger configured fail-closed behavior; the claims control.

V.3 Decentralized and Federated Services (Illustrative)

In some embodiments, targets are represented as content identifiers, room identifiers, community identifiers, public keys, or other non-URL identifiers. A target summary and action scope may include such identifiers (or hashes thereof) and category labels, enabling gating and receipt emission for join, subscribe, fetch, stream, or message actions even when content is content-addressed or routed via relays; the claims control.

V.4 On-Device Models and Offline Operation (Illustrative)

In some embodiments, when an assistant executes on-device (offline or intermittently connected), policy packs and issuer keys are cached under a strict freshness policy. Where freshness cannot be satisfied for designated categories, the system fails closed or requires guardian involvement. Receipts may be generated locally and anchored later, with anchor status recorded as evidence-only; the claims control.

The invention claimed is:

1. A system comprising one or more processors and memory storing instructions that, when executed, cause the system to implement an Age-Token Compliance Rail configured to:

(a) obtain and validate an Age Token (A-TOKEN) associated with a device or user profile, the A-TOKEN attesting to at least an age tier and being verifiable under at least one of: (i) cryptographic verification, or (ii) platform-authenticated integrity verification;

(b) construct an age-compliance context envelope for a candidate age-relevant episode associated with a requested action, the age-compliance context envelope comprising at least a subset of: (i) one or more descriptors of the A-TOKEN, including the age tier and an age-assurance confidence indicator; (ii) jurisdiction information associated with the device or the user profile; and (iii) a target description comprising at least a service type and a content or category label;

(c) evaluate a multi-jurisdiction age-policy graph using the age-compliance context envelope to determine a permit outcome for the episode, the permit outcome having a permit-outcome value selected from: PERMIT, PERMIT_WITH_GUARDRAILS, REQUIRE_PARENT, or DENY;

(d) gate execution of the requested action at one or more integration surfaces associated with performance of the requested action based on the permit outcome, comprising: (i) when the permit outcome is DENY, preventing the requested action from proceeding; (ii) when the permit outcome is REQUIRE_PARENT, preventing the requested action from proceeding unless and until successful completion of a parent or guardian workflow; and (iii) when the permit outcome is PERMIT or PERMIT_WITH_GUARDRAILS, allowing the requested action to proceed and, optionally, enforcing one or more guardrails associated with the permit outcome;

(e) generate a structured Age-Compliance Receipt for the episode, the Age-Compliance Receipt comprising data representing at least: (i) the age-compliance context envelope; (ii) an identifier of the age-policy graph or a snapshot thereof; and (iii) the permit outcome; and (f) store or anchor at least a portion of the Age-Compliance Receipt or a digest thereof in an Age-Compliance Ledger comprising a tamper-evident evidence store under a freshness policy, wherein the Age-Compliance Receipt is later verifiable as evidence of age-policy conformance for the episode.

2. The system of claim 1, wherein the A-TOKEN is bound to at least one of: (i) a device identifier, and (ii) a profile identifier, and further encodes an age-assurance confidence indicator, and wherein the age-policy graph evaluation is configured to require a higher confidence indicator for higher-risk content or services.

3. The system of claim 1, wherein the age-policy graph comprises nodes representing one or more of: age tiers, content or service categories, jurisdiction branches, parent or guardian presence requirements, curfew or usage-window rules, target-classification confidence rules, and device posture rules, and wherein the Age-Compliance Receipt further comprises an indication of a path traversed through the age-policy graph and an evidence-only indicator of at least one of a classification confidence evaluation or a device posture evaluation applied for the episode.

4. The system of claim 1, wherein the gating execution of the requested action comprises intercepting an outbound network request to an age-restricted domain or URL and, when the permit outcome is DENY or REQUIRE_PARENT, preventing establishment of a network connection and returning an informative denial or escalation message.

5. The system of claim 1, wherein the gating execution of the requested action comprises intercepting an app store installation or purchase request associated with an age-restricted app category and, when the permit outcome is DENY or REQUIRE_PARENT, blocking installation or purchase pending successful completion of a parent or guardian approval workflow.

6. The system of claim 1, wherein the instructions further cause the system to operate in a fail-closed mode in which, when the Age Token cannot be validated or when a policy evaluation cannot be completed within a time budget, the requested action is denied by default and the Age-Compliance Receipt records a structured failure code, and wherein when anchoring cannot be completed within a configured window, the system (i) denies by default for episodes or categories designated by a policy profile as requiring immediate anchoring, and (ii) otherwise records an anchor-deferred failure code and an anchor status indicator in the Age-Compliance Receipt while permitting deferred anchoring consistent with the freshness policy.

7. The system of claim 1, wherein the Age-Compliance Receipt comprises one or more cross-rail references to external governance receipts produced by other safety rails, the other safety rails comprising at least one of:

(i) a trusted sensor ingress rail that emits Sensor Receipts describing age-assurance capture events;

(ii) a child-safety rail that emits Child Safety Receipts for child-artificial intelligence (AI) companion episodes; or (iii) a safety receipt layer that emits structured safety receipts for AI-assisted decision support episodes;

wherein the cross-rail references are evidentiary only and are excluded from determining the permit outcome and excluded from the gating predicates enforced by the Age-Token Compliance Rail.

8. The system of claim 1, further comprising a Guardian Console configured to retrieve Age-Compliance Receipts from the Age-Compliance Ledger and to render per-child or per-profile views comprising at least: a pseudonymous identifier, a summary of permit outcomes over time, and high-level descriptions of denied or escalated episodes.

9. The system of claim 1, wherein the Age-Compliance Receipt comprises anchor fields including at least (i) a ledger identifier and (ii) a signed head reference, and wherein an inclusion proof and a consistency proof for the Age-Compliance Receipt or the digest thereof are later retrievable for verification under the freshness policy.

10. The system of claim 1, wherein the one or more integration surfaces enforce a non-bypassable, always-invoked gating requirement that prohibits completion of an age-restricted network, installation, purchase, feature-unlock, assistant capability invocation, tool execution, retrieval, media-playback, or output-delivery path without invocation of the Age-Token Compliance Rail and a permit outcome of PERMIT or PERMIT_WITH_GUARDRAILS for the path.

11. The system of claim 1, wherein, when the target description corresponds to a self-harm-related category and a profile type indicates a minor, the gating prevents the requested action from proceeding or requires REQUIRE_PARENT, and a denial or redirect message optionally includes a neutral safety notice or a crisis-resource reference, and the Age-Compliance Receipt records an evidence-only indicator that the neutral safety notice or the crisis-resource reference was presented.

12. The system of claim 1, wherein the age-compliance context envelope further includes a child-profile indicator and one or more parental preference settings, and wherein the age-policy graph includes nodes that enforce child-specific constraints, the child specific constraints comprise topic limits, stricter curfew windows, or REQUIRE_PARENT outcomes for certain content types.

13. The system of claim 1, wherein the instructions further cause the system to validate a signed policy pack used to evaluate the age-policy graph, and wherein the Age-Compliance Receipt records a policy snapshot reference comprising at least a policy pack identifier and a policy digest.

14. The system of claim 1, wherein the Age-Compliance Receipt comprises a receipt core including at least age tier, jurisdiction, target category or service type, a policy graph identifier or snapshot reference, and the permit outcome, and further comprises on e or more evidence-only extensions that are excluded from determining the permit outcome and excluded from the gating predicates.

15. The system of claim 1, wherein the gating execution of the requested action includes the one or more integration surfaces at one or more of:

(i) a browser networking stack or browser navigation pipeline;

(ii) an app store or package-manager purchase, installation, update, or entitlement application programming interface (API);

(iii) an in-app purchase or feature unlock API;

(iv) an operating system (OS) level content filter or an OS-level network gateway including a virtual private network (VPN) gateway;

(v) an assistant capability invocation surface or assistant tool-use gate configured to gate a tool call, action plan, agent workflow, or retrieval operation; or (vi) a media pipeline gate or an output delivery gate configured to gate audio playback or synthesized speech output; and wherein the one or more integration surfaces are configured such that no age-restricted content path to an external service is completed without a permit outcome of PERMIT or PERMIT_WITH_GUARDRAILS; and wherein, for streaming or segmented outputs, the output delivery gate is configured to enforce permit evaluation at an output-commit boundary, wherein an output segment is committed to an output channel only when the permit outcome is PERMIT or PERMIT_WITH_GUARDRAILS or when a valid session permit issued based on the permit outcome covers the output segment.

* * * * *